US008656957B2

(12) United States Patent
Babinsky et al.

(10) Patent No.: US 8,656,957 B2
(45) Date of Patent: Feb. 25, 2014

(54) VORTEX GENERATORS TO CONTROL BOUNDARY LAYER INTERACTIONS

(75) Inventors: Holger Babinsky, Linton (GB); Eric Loth, Champaign, IL (US); Sang Lee, Savoy, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 522 days.

(21) Appl. No.: 12/895,781

(22) Filed: Sep. 30, 2010

(65) Prior Publication Data

US 2012/0018021 A1 Jan. 26, 2012

Related U.S. Application Data

(60) Provisional application No. 61/277,878, filed on Sep. 30, 2009.

(51) Int. Cl.
*B64C 23/06* (2006.01)
*B64C 21/10* (2006.01)

(52) U.S. Cl.
USPC ...... 137/809; 244/130; 244/199.1; 244/200.1

(58) Field of Classification Search
USPC .................... 137/808, 809; 296/180.1–180.5; 244/130, 199.1, 200, 200.1
See application file for complete search history.

(56) References Cited

U.S. PATENT DOCUMENTS

| | | | | |
|---|---|---|---|---|
| 2,800,291 | A * | 7/1957 | Stephens ........................ | 244/200 |
| 4,655,419 | A | 4/1987 | van der Hoeven | |
| 5,058,837 | A | 10/1991 | Wheeler | |
| 5,598,990 | A | 2/1997 | Farokhi et al. | |
| 8,528,601 | B2 * | 9/2013 | Dahm et al. .................. | 137/809 |

OTHER PUBLICATIONS

Chohen, S.G., and Motalleb, F., Sub Boundary-Layer Vortex Generators for the Control of Shock Induced Separation, *The Aeronautical Journal*, Apr. 2006, pp. 215-226, Department of Engineering, Queen Mary University of London, London, United Kingdom.

Ashill, P.R., Fulker, J.L., and Hackett, K.C., A Review of Recent Developments in Flow Control, *The Aeronautical Journal*, May 2005, pp. 205-231, QunetiQ, Bedford, United Kingdom.

* cited by examiner

*Primary Examiner* — Craig Schneider
(74) *Attorney, Agent, or Firm* — Brinks Gilson & Lione

(57) ABSTRACT

Devices for generating streamwise vorticity in a boundary includes various forms of vortex generators. One form of a split-ramp vortex generator includes a first ramp element and a second ramp element with front ends and back ends, ramp surfaces extending between the front ends and the back ends, and vertical surfaces extending between the front ends and the back ends adjacent the ramp surfaces. A flow channel is between the first ramp element and the second ramp element. The back ends of the ramp elements have a height greater than a height of the front ends, and the front ends of the ramp elements have a width greater than a width of the back ends.

13 Claims, 40 Drawing Sheets

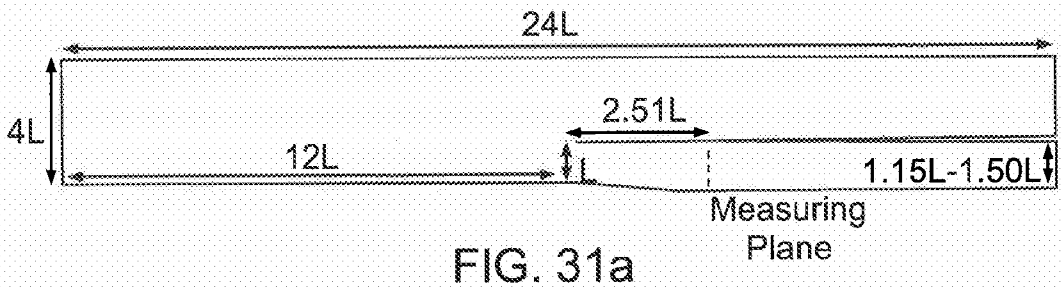
FIG. 31a
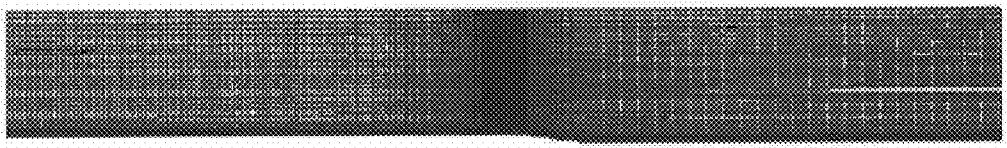
FIG. 31b
FIG. 32a
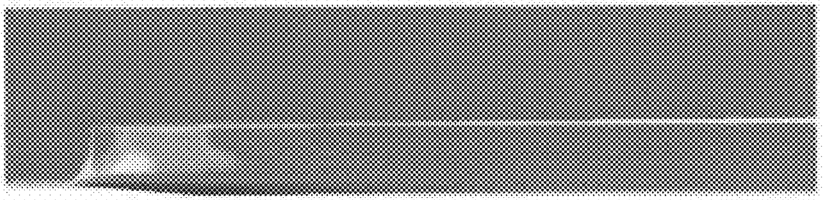
FIG. 32b
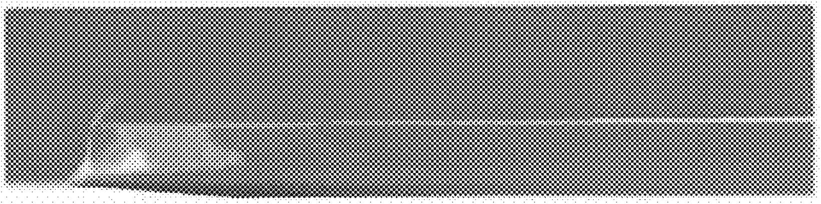
FIG. 32c
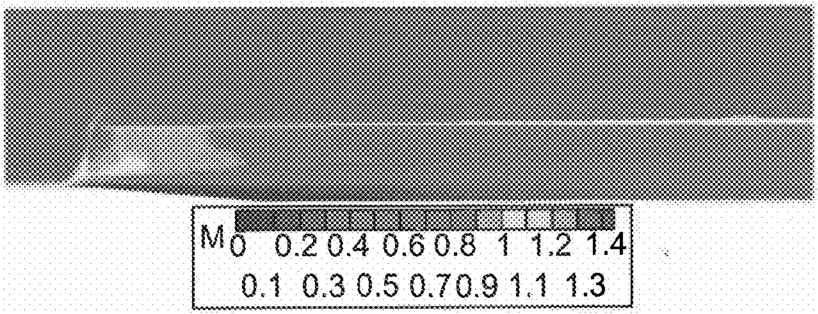

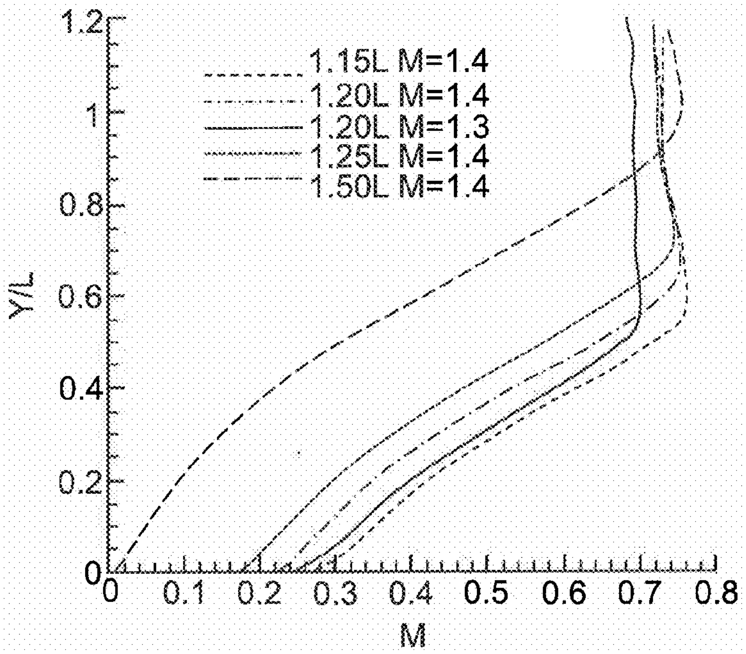
FIG. 33
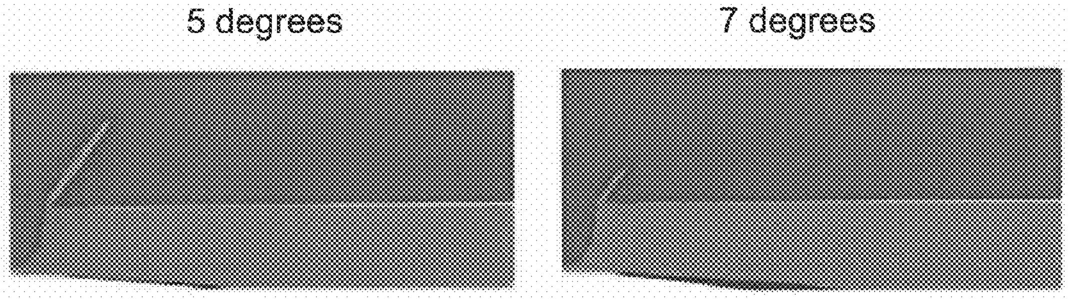
FIG. 34a
FIG. 34b
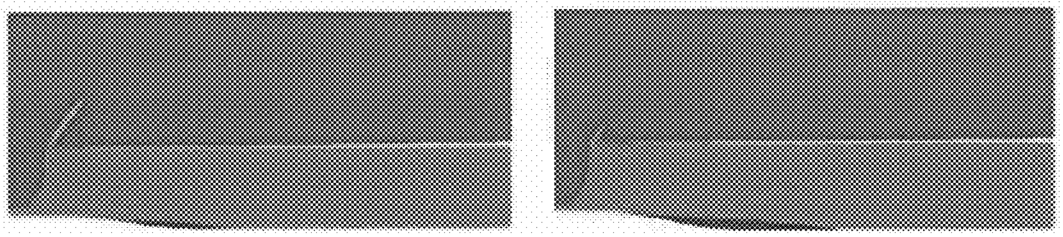
FIG. 34c
FIG. 34d

VORTEX GENERATORS TO CONTROL BOUNDARY LAYER INTERACTIONS

CROSS-REFERENCE TO RELATED APPLICATIONS

This application claims priority of U.S. Provisional Application No. 61/277,878, filed on Sep. 30, 2009 and entitled "Vortex Generators to Control Boundary Layer Interactions," the disclosure of which is incorporated herein by reference in its entirety.

GOVERNMENT INTERESTS

This invention was made with Government support under contract Number NNX07AC74A awarded by the NASA and contract Number FA9550-06-1-0400 awarded by the United States Air Force (USAF). The Government has certain rights in the invention.

FIELD

The present application generally relates to vortex generators, and more particularly to vortex generators that control boundary layer interactions on aerodynamic surfaces.

BACKGROUND

Fluid flow around an object such as an airplane wing generates aerodynamic forces, including lift and drag. A thick boundary layer and flow separation from a surface of the object adversely affects the aerodynamic performance. Vortex generators (VGs) have been used in passive flow control applications such as on wings at transonic speeds to generate vorticity, or more circulation of the airflow in the boundary layer, thereby delaying or eliminating flow separation. Streamwise vorticity inside the boundary layer is desirable, which improves the aerodynamic performance of the object.

Typical vortex generators generally have a height close to the boundary layer thickness and thus generate undesirable parasitic drag. "Low-profile" or micro-VGs (μVGs) have been proposed to reduce the parasitic drag while producing benefits similar to those of traditional VGs. The micro-VGs generally have a height less than the boundary layer thickness.

When air flows at supersonic speeds, such as at supersonic inlets, a shock wave is generated. Shock wave interaction with a turbulent boundary layer has an adverse impact on the aerodynamic performance of the supersonic inlets, such as shock-induced flow separation, increased thickness in boundary layer, and stagnation pressure loss.

A typical flow control method is to bleed the flow at the shock impingement to suppress separations, which thins the boundary layer and increases the pressure recovery. However, bleeding the flow has a significant penalty cost of removing up to tenth of the incoming mass flow in order to function effectively. This requires larger inlets to compensate for the lost mass flow which can lead to weight increase and drag. Therefore, improved flow control devices that can reduce or completely eliminate bleeding are desirable.

SUMMARY

A device for generating streamwise vorticity in a boundary layer is provided by the teachings of the present disclosure. The device provides delayed airflow separation and allows an object, such as an airfoil or wing, to operate at higher angles-of-attack.

In one form, a vortex generator for generating streamwise vorticity in a boundary layer is provided that comprises_a first ramp element with a front end and a back end, a ramp surface extending between the front end and the back end, and a pair of vertical surfaces extending between the front end and the back end adjacent the ramp surface. A second ramp element has a front end and a back end, a ramp surface extending between the front end and the back end, and a pair of vertical surfaces extending between the front end and the back end adjacent the ramp surface. A flow channel is between the first ramp element and the second ramp element, and the back ends of the ramp elements have a height greater than a height of the front ends, and the front ends of the ramp elements have a width greater than a width of the back ends.

In another form, a vortex generator for generating streamwise vorticity in a boundary layer is provided that comprises_a first vane element with a front end and a back end, a canted outer surface extending between the front end and the back end, and an inner surface extending between the front end and the back end adjacent the canted outer surface. A second vane element has a front end and a back end, a canted outer surface extending between the front end and the back end, and an inner surface extending between the front end and the back end adjacent the canted outer surface. A flow channel is between the first vane element and the second vane element, and the back ends of the vane elements have a height greater than a height of the front ends, and the back ends of the vane elements have a width greater than a width of the front ends.

In still another form, a vortex generator for generating streamwise vorticity in a boundary layer is provided that comprises a first ramp-vane element with a front end and a back end, a ramp surface extending between the front end and the back end, and a pair of vertical surfaces extending between the front end and the back end adjacent the ramp surface. A second ramp-vane element has a front end and a back end, a ramp surface extending between the front end and the back end, and a pair of vertical surfaces extending between the front end and the back end adjacent the ramp surface. A flow channel is between the first ramp-vane element and the second ramp-vane element, and the back ends of the ramp-vane elements have a height greater than a height of the front ends, and the front ends of the ramp-vane elements have a width greater than a width of the back ends.

Further features and advantages will become apparent after a review of the following description, with reference to the drawings, and the claims.

BRIEF DESCRIPTION OF THE DRAWINGS

FIG. 31 shows a) schematic of a two dimensional computational domain and b) the mesh which used for RANs flow solutions;

FIG. 32 shows RAINS flow with an freestream Mach number of 1.4 and different diffuser lengths a) 1.15 L, b) 1.20 L, c) 1.25 L;

FIG. 33 shows Mach profiles at the measuring plane for various diffuser heights and upstream Mach numbers;

FIG. 34 shows streamwise velocity contour showing the effects of the diffuser slop angle (5° and 7°) and diffuser shape (straight and sinusoidal curve) where blue regions have a negative streamwise velocity (indicating flow separation) and red regions have a streamwise velocity at least 99% of the freestream velocity;

DETAILED DESCRIPTION

Figure 1:
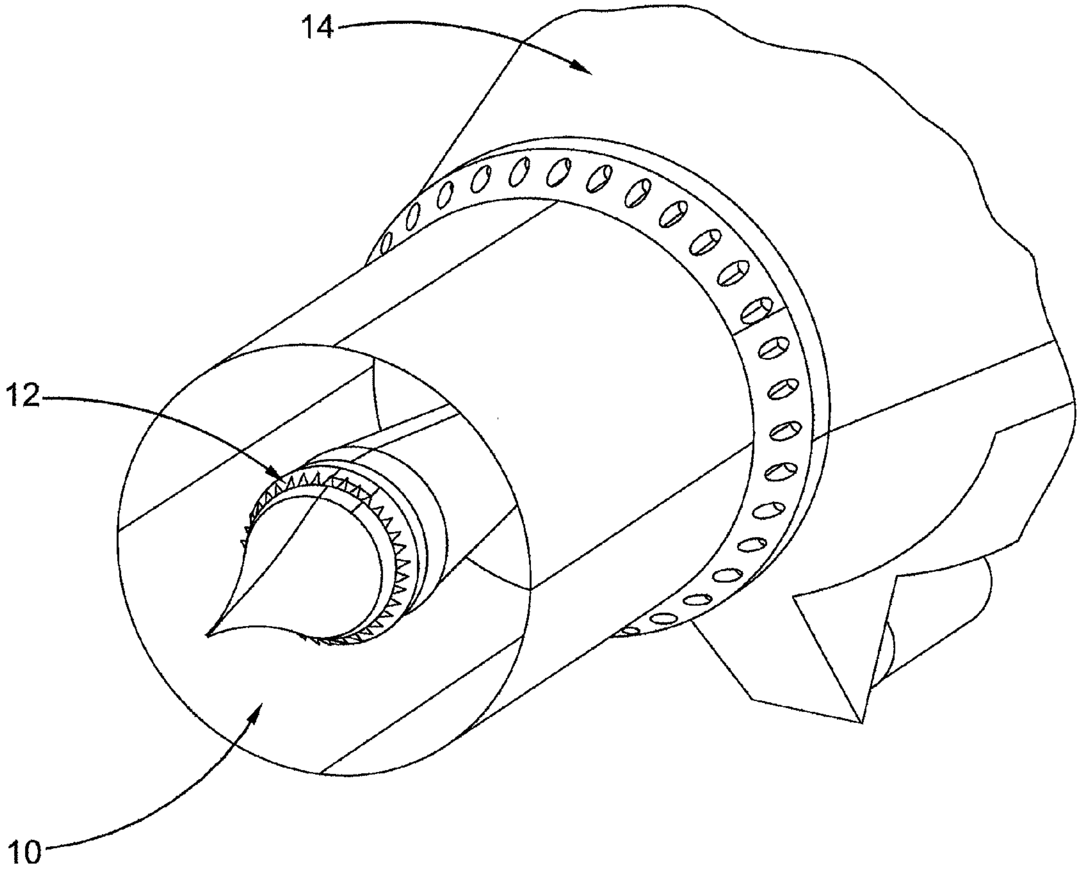
FIG. 1 is a perspective view of an array of vortex generators (VGs) according to the teachings of the present disclosure, wherein the VGs are arranged on an exemplary supersonic inlet.

Referring to FIG. 1, an array of micro vortex generators 10 according to the teachings of the present disclosure is illustrated in an exemplary supersonic inlet 12 of an aircraft engine 14, to generate streamwise vorticity inside the boundary layer. Generally, streamwise vorticity inside the boundary layer delays airflow separation and thus allows an airfoil (in this exemplary form the compressor blades of the engine 14, which are not shown) to operate at higher angles-of-attack without airflow separation.

The micro vortex generators 12 may have both supersonic and subsonic applications. For example, the micro vortex generators 12 may be provided on the wings of aircraft. The micro vortex generators 12 may be used on civil or military aircraft (supersonic or subsonic) and propulsion systems, such as supersonic inlets or SCRAMJET engines. When used with a jet engine, flow with a full healthy boundary layer may be generated when entering a compressor stage or even on a compressor blade. When used in a SCRAMJET engines, the micro vortex generators 12 can be used to generate streamwise vorticity to mix fuel and air streams. Further, the micro vortex generators 12 may be used in systems that encounter fluid dynamic separation regions, including but not limited to, sailboats, submarines, cars, wind turbines, compressor blades, and turbine blades. The micro vortex generators 12 may further be used in systems such as chemical lasers to generate streamwise vorticity to aid mixing. Accordingly, the various applications of the vortex generators as illustrated and described herein should not be construed as limiting the scope of the present disclosure.

Split-Ramp Vortex Generator

Figure 2:
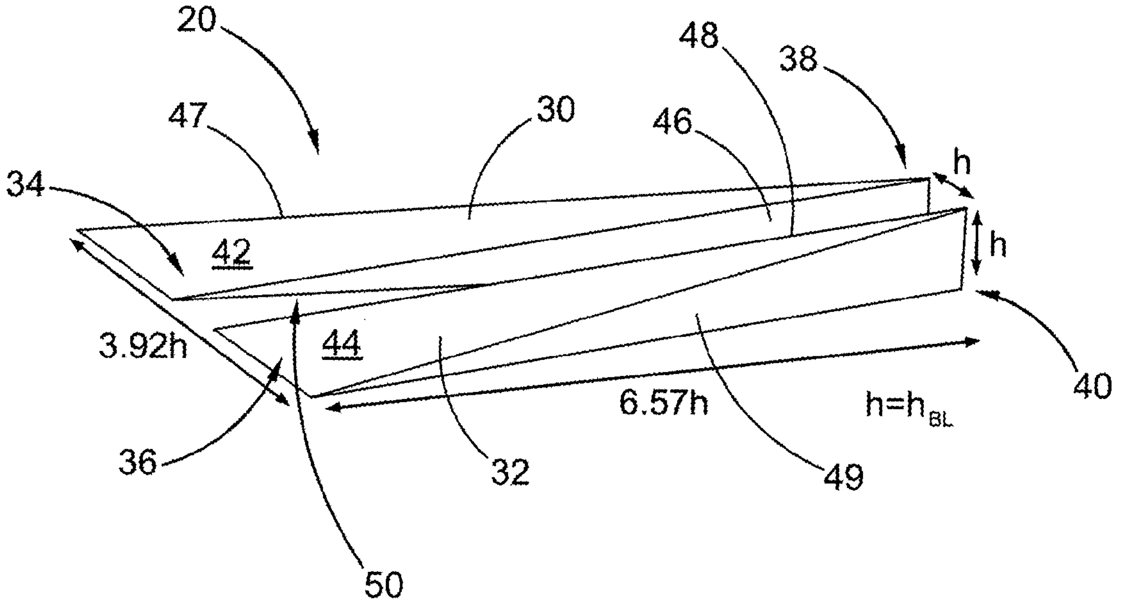
FIG. 2 is a perspective view of a split-ramp vortex generator constructed in accordance with the teachings of the present disclosure.
Figure 3:
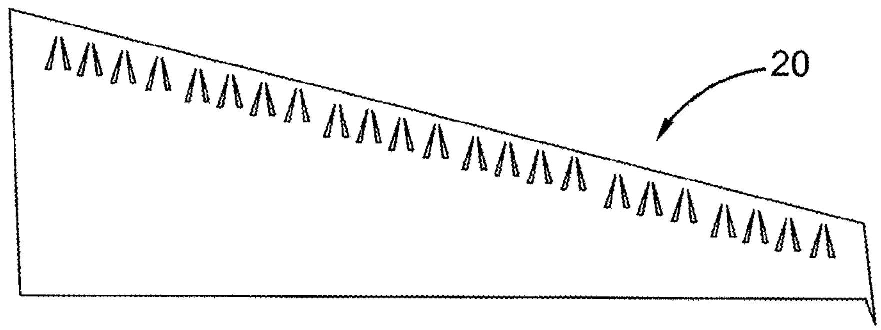
FIG. 3 is plan view of a series or array of split-ramp vortex generators arranged on an exemplary aircraft wing in accordance with the teachings of the present disclosure.

Referring to FIG. 2, one form of a vortex generator according to the teachings of the present disclosure is a split-ramp-type vortex generator, which is generally indicated by reference numeral 20. The split-ramp vortex generator 20 includes a first ramp element 30 and a second ramp element 32 arranged to generate streamwise vorticity through either flow spill or channeling. As shown in FIG. 3, the split-ramp vortex generator 20 may include a series of pairs of first ramp elements 30 and second ramp elements 32, which are arranged in pairs and placed in an array or series of arrays inside a boundary layer (not to scale). Accordingly, any number or arrangement of split-ramp vortex generators 20 should be construed as falling within the scope of the present disclosure. Furthermore, any number or arrangement (e.g., array or series) may be employed with any of the various forms of vortex generators illustrated and described herein while remaining within the scope of the present disclosure.

The first ramp element 30 and the second ramp element 32 each have a front (upstream) end 34, 36 and a back (downstream) end 38, 40. The back ends 38 and 40 have a height greater than the height of the front ends 34 and 36 so that ramp surfaces 42 and 44 extend between the front ends 34, 36 and the back ends 38, 40.

Figure 4A:
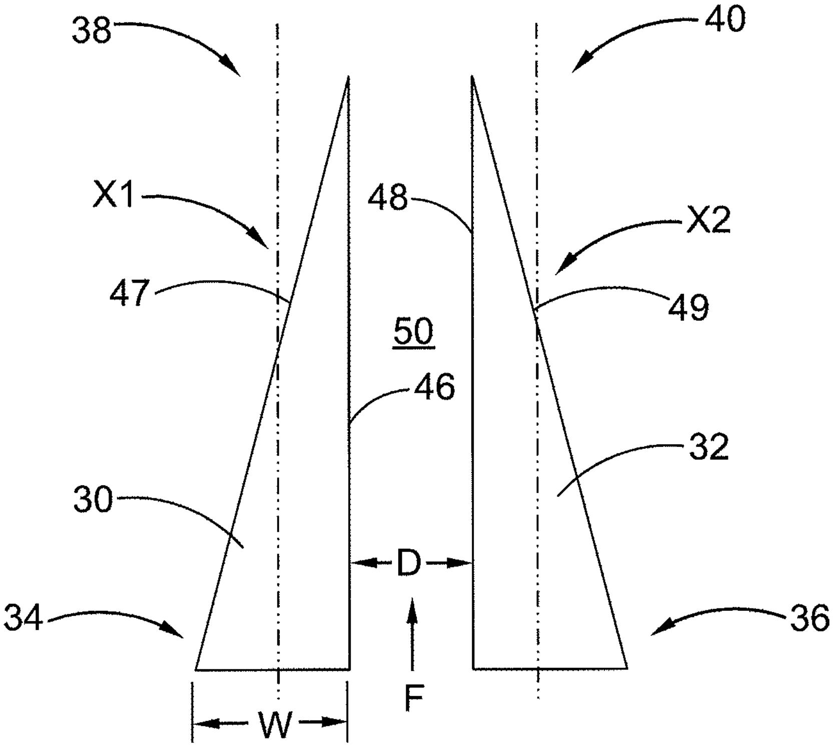
FIG. 4*a* is a plan view of the split-ramp vortex generator of FIG. 2 having parallel centerlines in accordance with the teachings of the present disclosure.
Figure 4B:
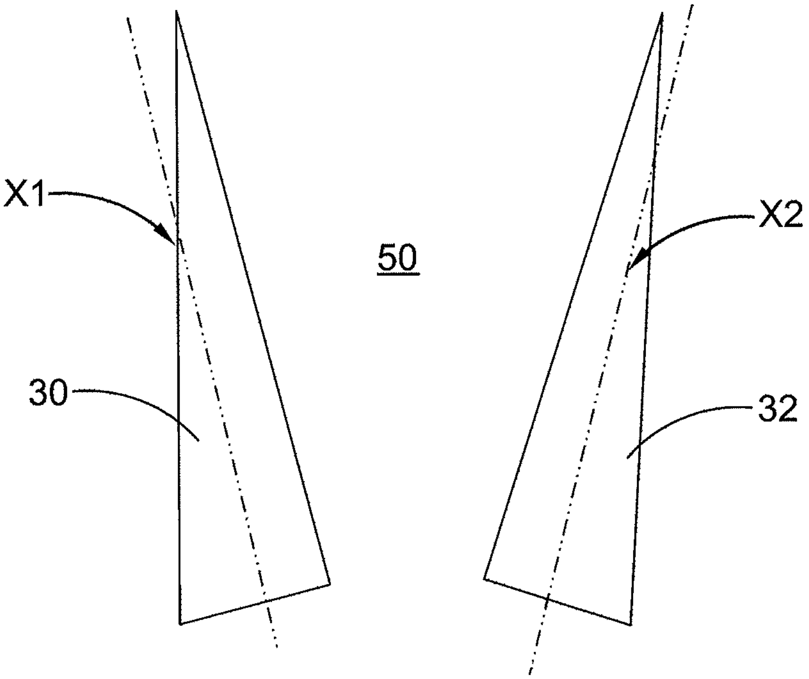
FIG. 4*b* is a plan view of the split-ramp vortex generator of FIG. 2 having non-parallel centerlines in accordance with the teachings of the present disclosure.

As shown in FIGS. 4*a* and 4*b*, the first ramp element 30 and the second ramp element 32 each have a centerline X1, X2 extending along the length of the first and second elements 30 and 32. The centerlines X1, X2 of the first ramp element 30 and the second ramp element 32 may be substantially parallel as shown in FIG. 4*a* or non-parallel as shown in FIG. 4*b*, depending on the application. Furthermore, the first ramp element 30 and the second ramp element 32 may be oriented 180° from their position as shown in FIG. 4*a* such that the back ends 38, 40 face the incoming flow F. It should be understood that any orientation relative to the incoming flow F is within the scope of the present disclosure, and the illustrations shown herein are merely exemplary and should not be construed as limiting the scope of the invention.

As further shown, the first ramp element 30 and the second ramp element 32 each have a width (W) at the front ends 34, 36 greater than the width at the back ends 38, 40 so that the ramp surfaces 42, 44 each define a substantially triangular shape. The first and second ramp elements 30 and 32 each define a pair of inner vertical surfaces 46, 48, and outer vertical surfaces 47, 49 extending between the front ends 34, 36 and the back ends 38, 40 adjacent the ramp surfaces 42, 44. The inner vertical surfaces 46 and 48 are substantially parallel, and the outer vertical surfaces 47, 49 are angled as shown. The ramp surfaces 42 and 44 are disposed between the corresponding pairs of vertical surfaces 46-49 and extend from the front ends 34, 36 to the back ends 38, 40. A flow channel 50 is defined between the first and second ramp elements 30, 32 as shown. Furthermore, the dimensions as shown in FIG. 2 are merely exemplary and should not be construed as limiting the scope of the present disclosure.

The first ramp element 30 and the second ramp element 32 are disposed at a distance D, as measured at the front ends 34, 36 as shown in FIG. 4*a*. The dimensions of the split-ramp vortex generator 20 (including height, width and distance), and more specifically of the first and second ramp elements 30 and 32, are functions a number of variables, including but not limited to the flow Mach number, Reynolds number, the type of shock-wave that interacts with the boundary layer, and the desired balance between performance and efficiency. For example, smaller devices may be more efficient in that they have higher stagnation pressure recovery, but may have less performance in that the strength of the vortices will not be as strong nor will persist as long. The size and relative length scales can be chosen based on the downstream incompressible shape factor using RANS (Reynolds-Averaged Navier-Stokes) numerical methods.

The pair of first and second ramp elements 30 and 32 create vorticity by having the flow spill over peak edges 51 and 53, which are at an angle to the free-stream flow. The split-ramp vortex generator 20 allows flow to be channeled in the flow channel 50 between the first and second ramp elements 30 and 32. As a result, the flow channel 50 at the center of the split-ramp vortex generator 20 improves the boundary layer characteristics downstream of the split-ramp vortex generator 20. By reducing flow separation, the split-ramp vortex generator 20 improves the aerodynamic performance of external surfaces on a variety of objects such as vehicles, thereby reducing drag.

The split-ramp vortex generator 20 can also reduce turbulence and pressure fluctuations downstream of a shock wave. The streamwise vorticity can reduce the amount of separation caused by the adverse pressure gradient of a shock-wave in supersonic conditions or of flow expansion in subsonic conditions, and can reduce the downstream boundary layer thickness on either side of the device. The streamwise vorticity helps induce mixing of high momentum flow to be closer to the vertical surfaces 46, 48. As such, the boundary layer profile becomes fuller and healthier.

Detailed test results and analyses of this split-ramp vortex generator 20, along with other configurations of vortex generators as set forth in the following are provided in greater detail below.

Thick Vane Vortex Generator

Figure 5A:
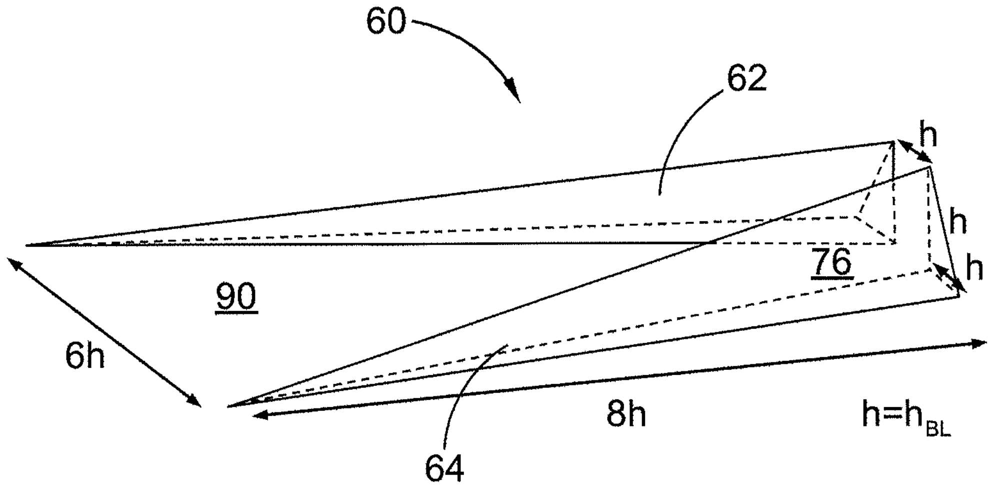
FIG. 5*a* is a perspective view of a thick-vane vortex generator constructed in accordance with the teachings of the present disclosure.
Figure 5B:
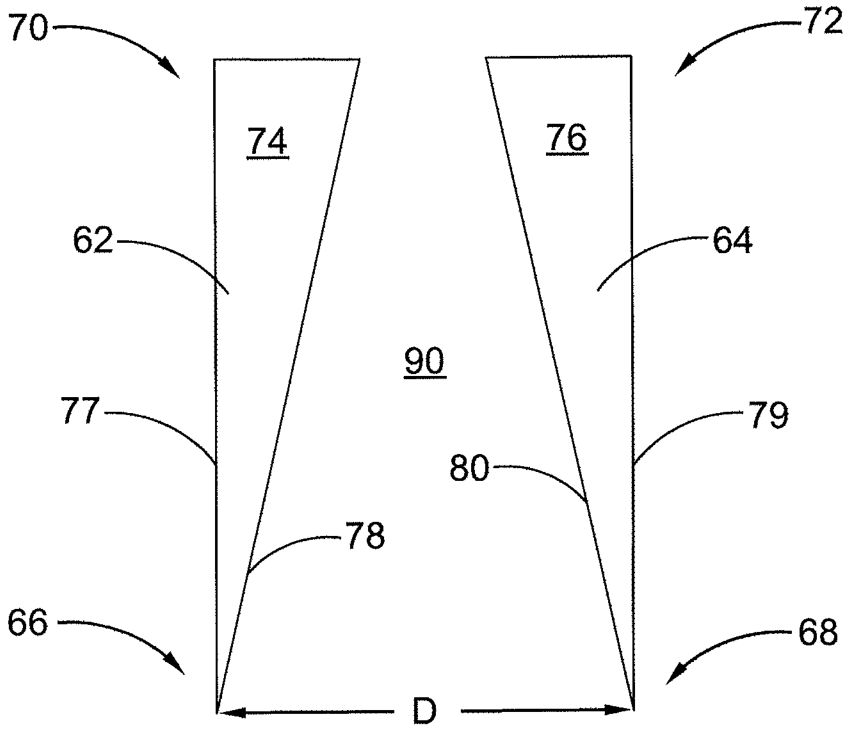
FIG. 5*b* is a plan view of the thick-vane vortex generator of FIG. 5*a* in accordance with the teachings of the present disclosure.

Referring to FIGS. 5*a* and 5*b*, another form of a vortex generator according to the teachings of the present disclosure includes a thick-vane type vortex generator 60. Like the split-ramp type vortex generator 20, the thick vane vortex generator 60 provides streamline vorticity generation through flow spill over and flow channeling and can provide higher stagnation pressure recovery than prior art vortex generators. The higher stagnation pressure recovery reduces parasitic drag created by the vortex generators, resulting in improved efficiency.

The thick-vane vortex generator 60 includes a first vane element 62 and a second vane element 64. The first vane element 62 and the second vane element 64 each have a front (upstream) end 66, 68 and a back (downstream) end 70, 72. The back ends 70 and 72 have a height greater than the height of the front ends 66 and 68, and canted outer surfaces 74 and 76 extend between the front ends 66, 68 and the back ends 70, 72. Inner surfaces 78 and 80 also extend between the front ends 66, 68 and the back ends 70, 72, adjacent the canted outer surfaces, and are relatively vertical in this form of the thick-vane vortex generators 60. The canted outer surfaces 74, 76 further define outer edges 77, 79, which in one form of the present disclosure are parallel to a direction of flow (F). In another form, the first vane element 62 and the second vane element 64 may be oriented 180° from their position as shown in FIG. 5*b* such that the back ends 70, 72 face the incoming flow F. It should be understood that any orientation relative to the incoming flow F is within the scope of the present disclosure, and the illustrations shown herein are merely exemplary and should not be construed as limiting the scope of the invention.

Similar to the previous split-ramp vortex generator 20, a flow channel 90 is defined between the first vane element 62 and the second vane element 64. Furthermore, the dimensions as shown in FIG. 5*a* are merely exemplary and should not be construed as limiting the scope of the present disclosure.

The first vane element 62 and the second vane element 64 are disposed at a distance D, as measured at the front ends 66, 68 as shown in FIG. 5*b*. As with the previously described split-ramp vortex generator 20, the dimensions of the thick-vane vortex generator 60 (including height, width and distance), and more specifically of the first and second ramp elements 62 and 64, are functions a number of variables, including but not limited to the flow Mach number, Reynolds number, the type of shock-wave that interacts with the boundary layer, and the desired balance between performance and efficiency. For example, smaller devices may be more efficient in that they have higher stagnation pressure recovery, but may have less performance in that the strength of the vortices will not be as strong nor will persist as long. The size and relative length scales can be chosen based on the downstream incompressible shape factor using RANS (Reynolds-Averaged Navier-Stokes) numerical methods.

The pair of first and second ramp elements 62 and 64 create vorticity by having the flow spill over peak angle surfaces 63 and 65 and allow flow to be channeled in the flow channel 90. As a result, the flow channel 90 at the center of the thick-vane vortex generator 60 improves the boundary layer characteristics downstream of the thick-vane vortex generator 60. By reducing flow separation, the thick-vane vortex generator 60 improves the aerodynamic performance of external surfaces on a variety of objects such as vehicles, thereby reducing drag.

The thick-vane vortex generator 60 also can reduce turbulence and pressure fluctuations downstream of a shock wave. The streamwise vorticity can reduce the amount of separation caused by the adverse pressure gradient of a shock-wave in supersonic conditions or of flow expansion in subsonic conditions, and can reduce the downstream boundary layer thickness on either side of the device. The streamwise vorticity helps induce mixing of high momentum flow to be closer to the inner surfaces 78 and 80. As such, the boundary layer profile becomes fuller and healthier.

Ramped-Vane Vortex Generator

Figure 6A:
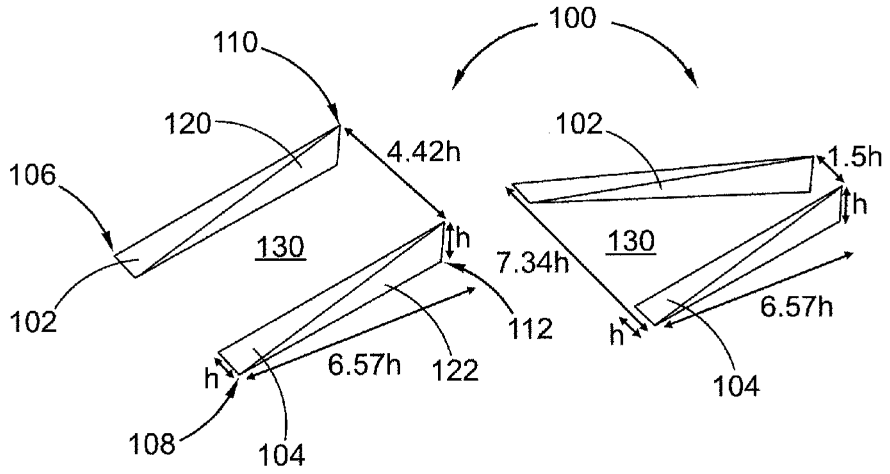
FIG. 6*a* is two perspective views of ramped-vane vortex generators constructed in accordance with the teachings of the present disclosure.
Figure 6B:
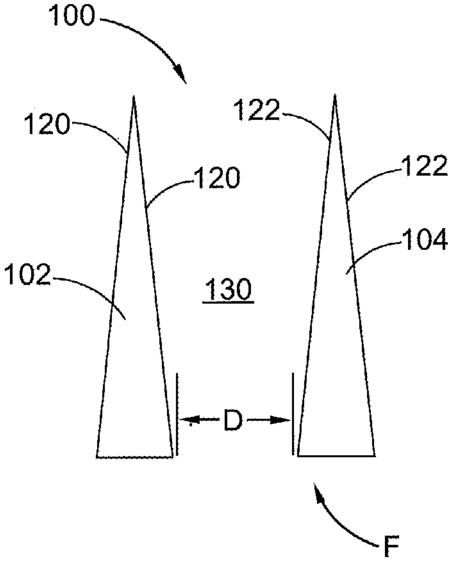
FIG. 6*b* is a plan view of one set of the ramped-vane vortex generators of FIG. 6*a* in accordance with the teachings of the present disclosure.
Figure 6C:
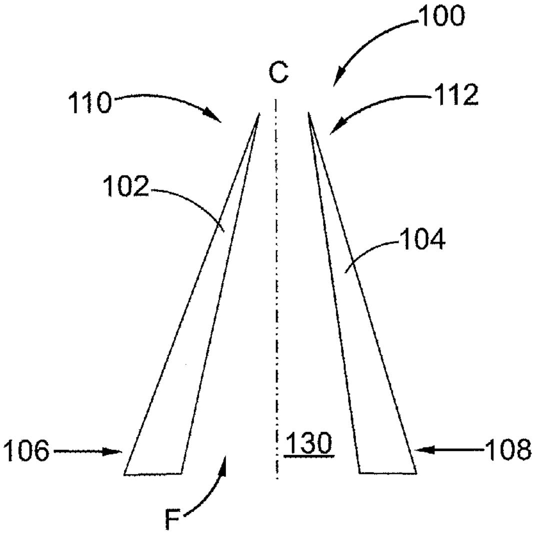
FIG. 6*c* is a plan view of another set of the ramped-vane vortex generators of FIG. 6*a* in accordance with the teachings of the present disclosure.

Referring now to FIGS. 6*a*-*c*, another implementation of vortex generators in accordance with the teachings of the present disclosure is shown as a ramped-vane vortex generator 100. The ramped-vane vortex generator is similar to the split-ramp vortex generator 20 as set forth above, and differs in its relative geometric dimensions as set forth in FIG. 6*a*.

The ramped-vane vortex generator 100 includes a first ramp-vane element 102 and a second ramp-vane element 104. The first ramp-vane element 102 and the second ramp-vane element 104 each have a front (upstream) end 106, 108 and a back (downstream) end 110, 112. The back ends 110 and 112 have a height greater than the height of the front ends 106 and 108, and each ramp-vane element 102, 104 includes relatively vertical sidewalls 120, 122 that extend from the front ends 106, 108 to the back ends 110, 112. The first ramp-vane element 102 and the second ramp-vane element 106 may be oriented 180° from their position as shown in FIGS. 6*b*, 6*c* such that the back ends 110, 112 face the incoming flow F. It should be understood that any orientation relative to the incoming flow F is within the scope of the present disclosure, and the illustrations shown herein are merely exemplary and should not be construed as limiting the scope of the invention.

Similar to the previous vortex generators 20, 60, a flow channel 130 is defined between the first ramp-vane element 102 and the second ramp-vane element 104. Furthermore, the dimensions as shown in FIG. 6*a* are merely exemplary and should not be construed as limiting the scope of the present disclosure.

The first ramp-vane element 102 and the second ramp-vane element 104 are disposed at a distance D, as measured at the front ends 106, 108 as shown in FIG. 6*b*. As with the previously described generators 20, 60, the dimensions of the ramped-vane vortex generator 100 (including height, width and distance), and more specifically of the first and second ramp-vane elements 102 and 104, are functions a number of variables, including but not limited to the flow Mach number, Reynolds number, the type of shock-wave that interacts with the boundary layer, and the desired balance between performance and efficiency. For example, smaller devices may be more efficient in that they have higher stagnation pressure recovery, but may have less performance in that the strength of the vortices will not be as strong nor will persist as long. The size and relative length scales can be chosen based on the downstream incompressible shape factor using RANS (Reynolds-Averaged Navier-Stokes) numerical methods.

The pair of first and second ramp-vane elements 102 and 104 create vorticity by having the flow spill over top edges 103 and 104 and allow flow to be channeled in the flow channel 130. As a result, the flow channel 130 at the center of the ramped-vane vortex generator 100 improves the boundary layer characteristics downstream of the thick-vane vortex generator 60. By reducing flow separation, the ramped-vane vortex generator 100 improves the aerodynamic performance of external surfaces on a variety of objects such as vehicles, thereby reducing drag.

The ramped-vane vortex generator 100 also reduces turbulence and pressure fluctuations downstream of a shock wave. The streamwise vorticity can reduce the amount of separation caused by the adverse pressure gradient of a shock-wave in supersonic conditions or of flow expansion in subsonic conditions, and can reduce the downstream boundary layer thickness on either side of the device. The streamwise vorticity helps induce mixing of high momentum flow to be closer to the walls 120 and 122. As such, the boundary layer profile becomes fuller and healthier.

As further shown, the ramped-vane vortex generator 100 may be co-rotating as shown in FIG. 6*b* or counter-rotating as shown in FIG. 6*c*. With the co-rotating configuration, both of the first and second ramp-vane elements 102 and 104 are oriented at a spanwise angle to the incoming flow (F). With the counter-rotating configuration, a centerline (C) between the first and second ramp-vane elements 102 and 104 is parallel to the incoming flow (F).

As used in the following, the term μVG is referred to as a micro-vortex generator and is used interchangeably with the term vortex generator (VG) as set forth above in the various forms of the present disclosure.

Experiments and Test Data for the Vortex Generators 20, 60, 100

Figure 7:
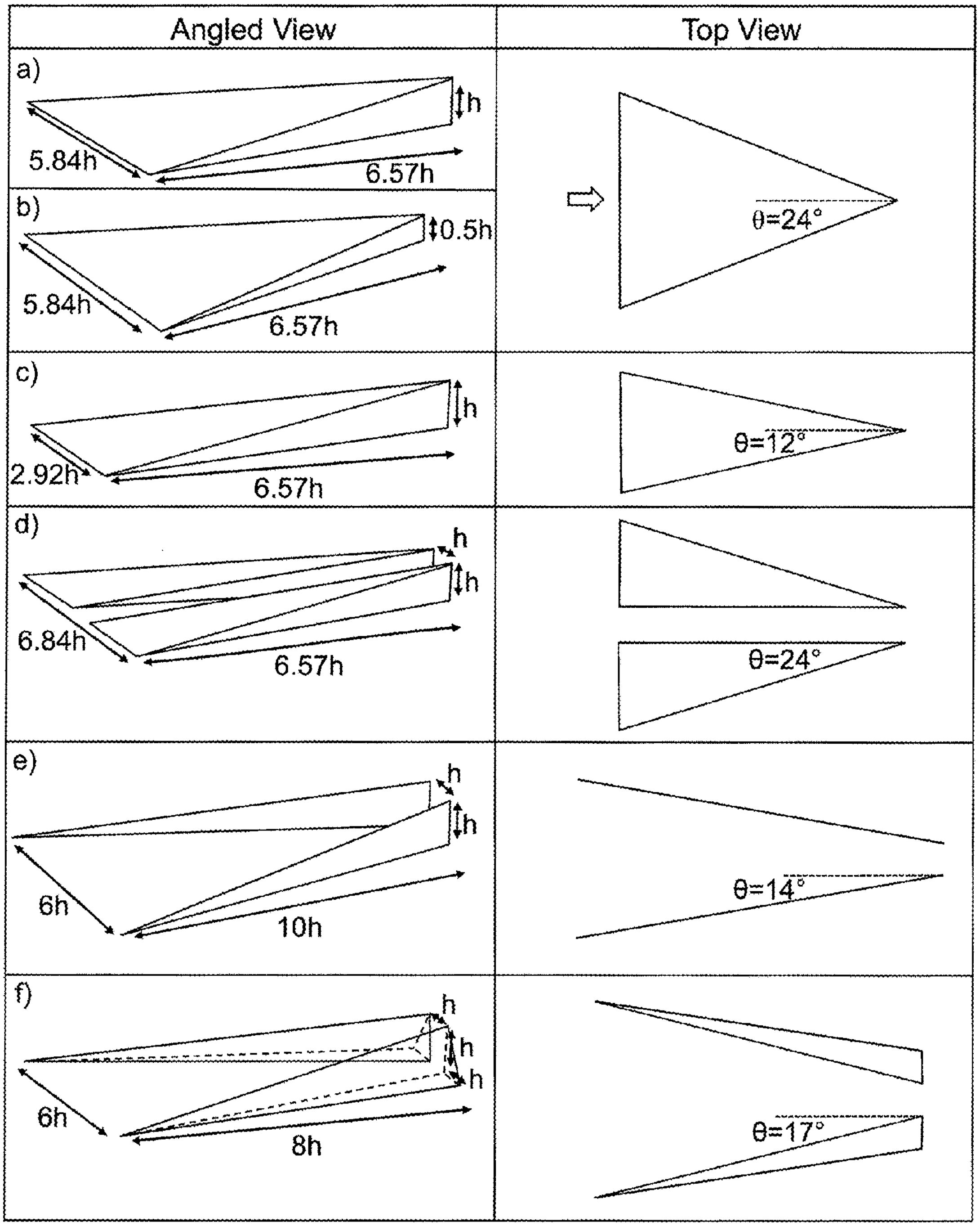
FIG. 7 illustrates various types of vortex generators and their dimensions according to the teachings of the present disclosure.

Referring to FIG. 7, various forms of vortex generators according to the present disclosure are shown to have varied length and width scaled with the height (h). FIG. 7(*a*) shows a baseline ramp (BR) with a height of h. FIG. 7(*b*) is half height ramp (HHR). FIG. 7(*c*) is a half width ramp (HWR). FIG. 7(*d*) is a split ramp (SR). FIG. 7(*e*) is a micro vane with baseline vanes (BV). FIG. 7(*f*) is a thick vane with side support (TV). In all these configurations, the spacing between the centerlines of the adjacent vortex generators is 7.5 h. The lower sweep angles of the vanes are similar to that of the half-width ramp (HWR). Both the ramps in FIGS. 7*e* & 7*f* have the same height as the baseline micro-ramp. The top-view of the devices is shown on the right column where the sweep angles and the heights can be seen.

The symbols and acronyms used throughout the present disclosure are listed in Table 1 below:

TABLE 1

| Symbols | Explanation |
|---|---|
| a | speed of sound |
| $\alpha$ | total pressure recovery factor |
| $A_{sep}$ | separation area |
| B | blending function |
| BR | baseline micro-ramp |
| BV | baseline micro-vane |
| $\beta$ | frictional velocity ratio |
| CFL | Courant-Freidrichs-Lewy number |
| D | width of the computational domain |
| $\delta$ | boundary layer thickness |
| $\delta_{ref}^*$ | displacement thickness at inviscid shock location but with no shock effects |
| dt | time increment for integration |
| dx | spatial increment in streamwise direction |
| dy | spatial increment in normal direction |
| dz | spatial increment in spanwise direction |
| $\Gamma$ | circulation induced by vortex generators |
| h | micro-ramp height |
| H | incompressible shape factor |
| $\eta$ | wall normal coordinate normalized by boundary layer thickness |
| HHR | baseline micro-ramp with reduced height by half |
| HWR | baseline micro-ramp with reduced width by half |
| K | spatial average of time-averaged turbulent kinetic energy |
| $\kappa$ | Von Karman constant |
| L | length of the computational domain |
| M | Mach number |
| NR | no micro-ramp |
| p | time-averaged pressure |
| P | spatial average of time-averaged pressure |
| $P_o$ | total pressure |
| SR | BR split at the centerline |
| SBLI | shock boundary layer interaction |
| $\Delta t$ | time step |
| T | temperature |
| $\tau$ | integration time |
| $\tau^*$ | integration time normalized by the freestream flow convection time |
| TV | thick vane |
| u | instantaneous streamwise velocity |
| u' | streamwise fluctuation velocity |
| U | average streamwise velocity |
| $U_\tau$ | frictional velocity |
| $\upsilon_\omega$ | kinematic viscosity at wall |
| v | normal velocity |
| w | spanwise velocity |
| $\omega_{max}$ | maximum streamwise vorticity in a vortex core |
| x | streamwise distance |
| $\Delta x$ | streamwise length of computational cell |
| $\xi$ | i direction in computational domain |
| y | normal distance relative to solid-wall |
| Y | trajectory of $\omega_{max}$ in y |
| $\psi$ | j direction in computational domain |
| z | spanwise distance relative to center of domain |
| Z | trajectory of $\omega_{max}$ in z |
| $\zeta$ | k direction in computational domain |
| Superscripts | |
| – | time-averaged |
| + | dimension in wall units |
| * | dimension normalized by $\delta_{ref}^*$ |
| ** | dimension normalized by h |
| Inner | boundary layer inner region |
| outer | boundary layer outer region |
| Subscripts | |
| dom | domain |
| f | total integration time required for final convergence |
| i | initial value |
| $\infty$ | freestream value |
| inlet | upstream plane used as input for recycling |
| int | total integration time |
| max | maximum |
| MP | measuring plane |
| recycle | downstream recycling plane |
| SI | theoretical shock impingement location |
| TE | μVG trailing edge location |

Throughout the various experiments conducted, it has been found that reducing the size of the vortex generators (VGs or μVGs as used herein) according to the present disclosure and placing them closer to the impinging shock location allowed reduced flow separation area at the impinging shock and increased pressure recovery downstream. This indicates that the optimum μVG design is be dependent on flow conditions and may require capture of the unsteady large-scale structures, or flow over the VGs.

Figure 8A:
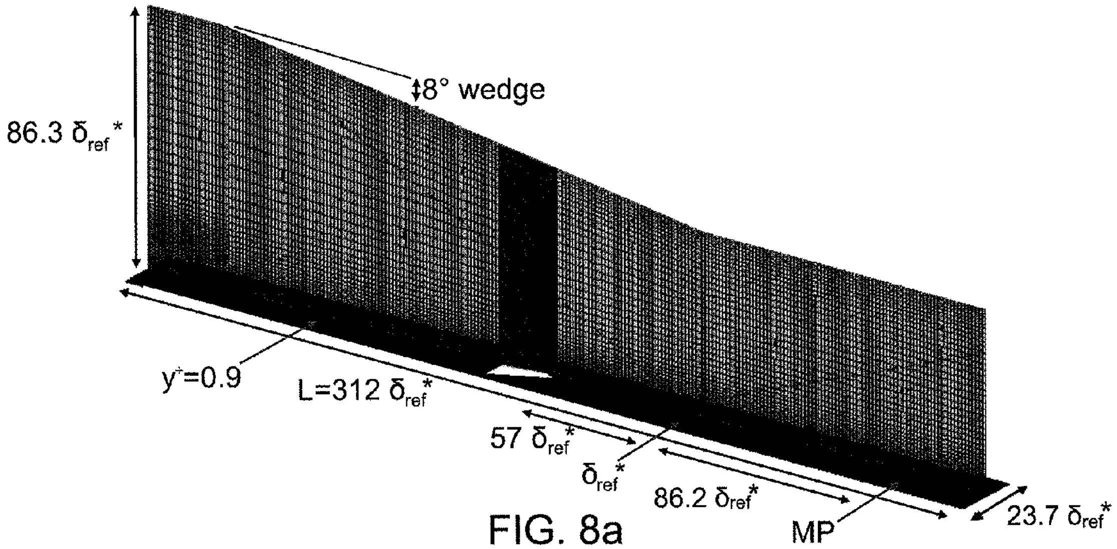
FIG. 8 shows a computational grid a); at z=0 with the domain dimensions and b) a side view of a vortex generator at z=11.85 $\delta_{ref}*$.

The study of the physics of the interaction between the shock wave, the turbulent boundary layer and the counter-rotating vortex pair generated from the flow control device is discussed below. The development of the vortices differs between various VG geometries and are compared to that of previous subsonic measurements. The evolution of the turbulent structures passing over the μVGs and the impact of the oblique shock is shown, and then the effect of different geometries of the μVGs on flow separation and downstream boundary layer properties including stagnation pressure recovery was determined. In one experiment, a Mach 3 turbulent boundary layer with $Re_{\delta*}$=3,800 with an 8° oblique impinging shock was investigated.

μVGs and Computational Grid Referring to FIG. 8, the computational grid is a scaled version of the test section of a wind tunnel at AFRL which included a downstream measuring plane (MP). The flow domain is dimensioned in this figure in terms of a reference displacement thickness, denoted as $\delta_{ref}$*. The reference displacement thickness of the boundary layer is that measured for a clean flat plate flow (i.e. no shocks and no micro-ramps) but at the position of the theoretical inviscid shock ($x_{SI}$). The ratio of the baseline micro-ramp's height, h, to the displacement thickness is 3.19 (h=3.19 $\delta_{ref}$*) based on Anderson. The length and the width of the grid is 312 $\delta_{ref}$* and 23.7 $\delta_{ref}$*, respectively. The spanwise coordinate z is 0 at the centerline and z*=z/$\delta_{ref}$*. The normal coordinate y is zero at the floor such that the height of the grid varies from y of 86.3 $\delta_{ref}$* to 61.1 $\delta_{ref}$* at the entrance and the exit of the domain and y=y/$\delta_{ref}$*. The streamwise distance was normalized by the reference displacement thickness and centered at the theoretical shock impingement location ($x_{SI}$) so that x*=(x−$x_{SI}$)/$\delta_{ref}$*. The micro-ramp trailing edge is located at 57 $\delta_{ref}$* upstream of the inviscid shock impingement location (i.e. x*=−57). The full domain is decomposed into 11 zones for parallelization to increase computational efficiency where each interfacing zones are abutting grids. FIG. 7*b* shows an enlarged side view of the grid for the baseline micro-ramp (FIG. 6*a*).

Figure 8B:
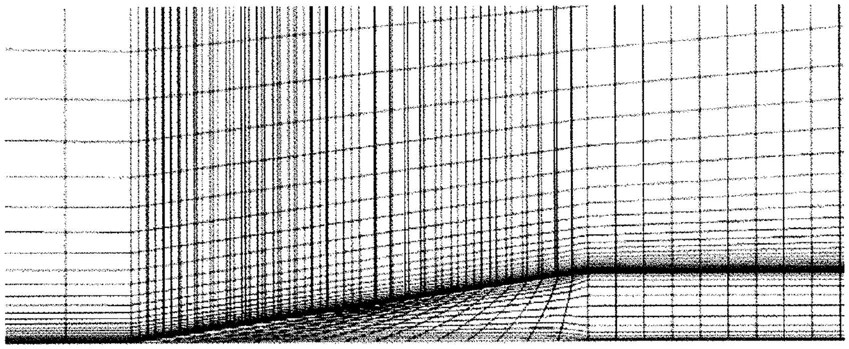
Figure 9A:
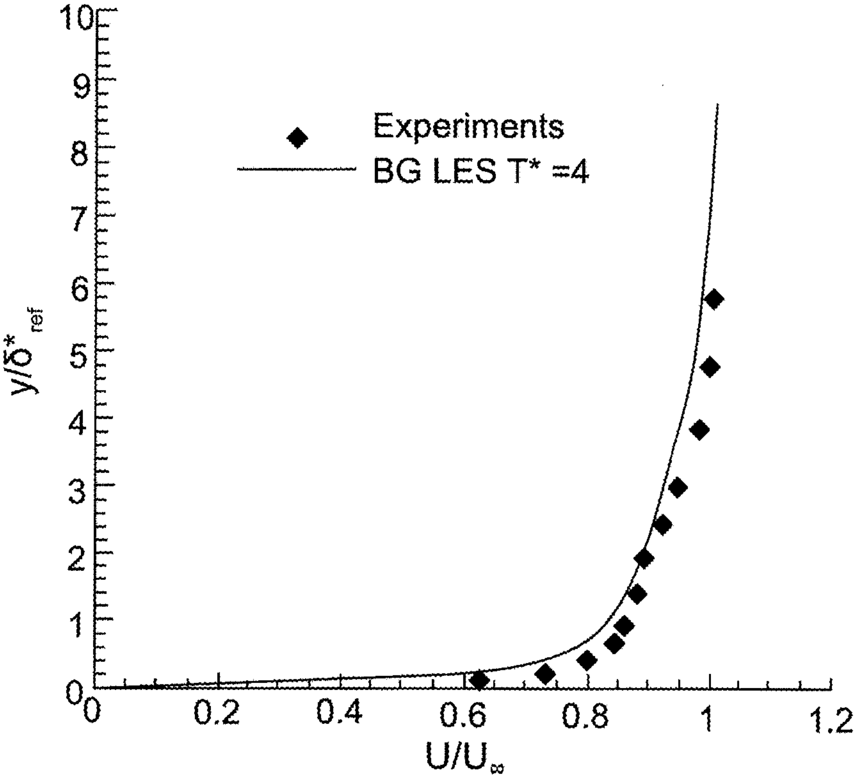
FIG. 9 shows a streamwise velocity profile compared with experimental data at MP for a) NR and b) BR where results for the baseline grid (BG), the dense grid (DG) and two different averaging time-scales are compared.
Figure 9B:
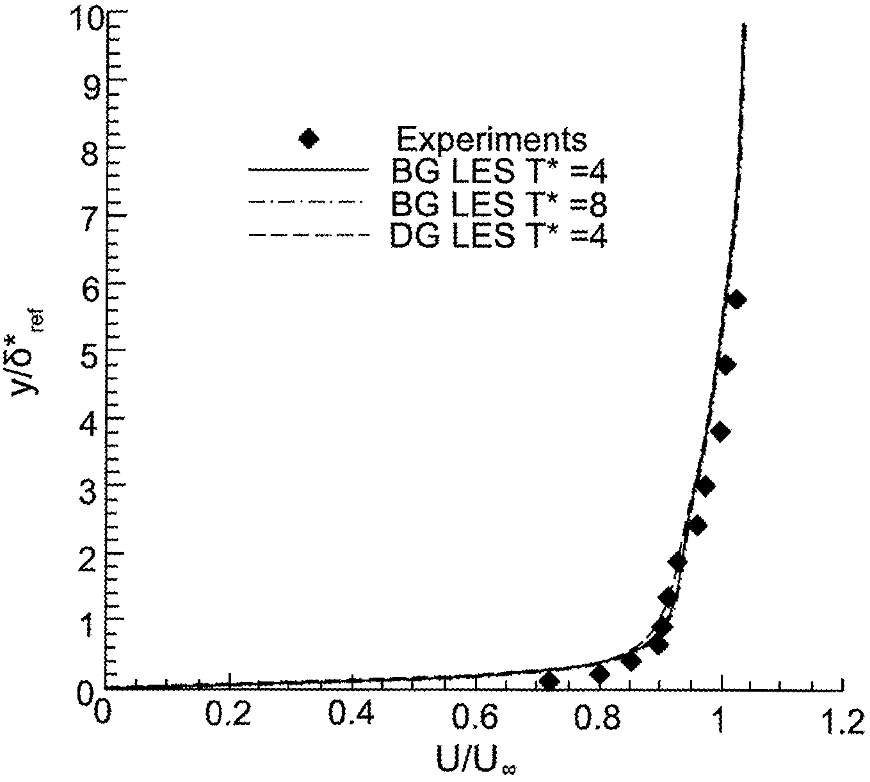

Referring to FIG. 9, the rescale-recycling zone whose length is 29.5 $\delta_{ref}$* generates turbulent boundary layer flow at the inflow of the domain which is followed by an oblique shock induced by the 8° wedge on the ceiling. The μVGs were placed approximately at the mid-point between the inflow and the outflow of the domain which is upstream of the inviscid shock impingement region. The shock is then reflected from the impingement location and convects downstream passing through the outflow plane at x*=102. Data measurement to assess the μVG performance was conducted at the measuring plane ($x_{MP}$) which is based at x*=86.2. Periodic boundary conditions were imposed on the side walls of the domain to represent arrays of μVGs in the spanwise direction which would make the spacing between the adjacent μVG equal 23.7 $\delta_{ref}$*. Slip and no-slip conditions were imposed on the ceiling and the floor of the domain, respectively, where the outflow conditions are based on zero order pressure extrapolation. The grid stretching ratio (division of two consecutive cell lengths) in the normal direction to the wall is 1.15 where the first grid point normal to the wall is at $y^+$=1 (based on the shear stress at the inlet station of rescale-recycle zone). The streamwise and the spanwise grid spacing correspond to $x^+$ of 28 and $z^+$ of 13 whereby the total number of grid points is 3.2 million nodes, which is denoted as the baseline grid (BG). Finer grid spacing was necessary in the zones that surround the μVG in order to conform to the boundaries of the geometry, which is shown in vertical slice of the grid above the μVG in FIG. 8.

Validation, Mean Flow Convergence and Grid Independence

FIG. 9*a* shows a comparison between the mean MILES streamwise velocity at $x_{MP}$ and experimental data obtained by AFRL, (Air Force Research Labs), (also at a similar Reynolds number of 4,000 based on $\delta_{ref}$*) using the baseline grid. The No Ramp (NR) flowfield included the oblique shock wave but there was no control device. FIG. 8*b* shows a similar comparison of the oblique-shock case for the baseline micro-ramp (BR). It shows that the fuller boundary layer measurements with the control device are consistent with the predicted trends.

The vortex generators were tested in a Mach 3 turbulent boundary layer at $Re_{\delta*}$ of 3,800 (based on $\delta_{ref}$)), where the freestream pressure and the temperature are 7076 N/m$^2$ and 582.3 K, respectively.

Referring to FIG. 10, different types of micro vortex generators of FIG. 7 are placed upstream of the shock interaction with the boundary layer. This flow is subjected to an 8° oblique shock. To characterize the impact, the evolution of the turbulent structures is first discussed followed by that for the evolution of the mean streamwise velocity in terms of streamwise, transverse, and spanwise distributions.

Next, the streamwise development of a spatially-averaged kinetic energy and streamwise vorticity is investigated, where the latter is compared to previous measurements in low-speed sub-sonic flow. Finally, the impact of the devices on downstream stagnation pressure recovery, displacement thickness and shape factor are considered, along with the net change in separation area.

Turbulent Boundary Layer

FIG. 10 shows flow visualization of oblique shock interaction: a) density iso-surface for NR, b) velocity contours at $y^+$=5 or NR and c) velocity contours at $y^+$=5 for BR showing reference lengths of 1000 streamwise wall units and 100 wall spanwise wall units.

Figure 10A:
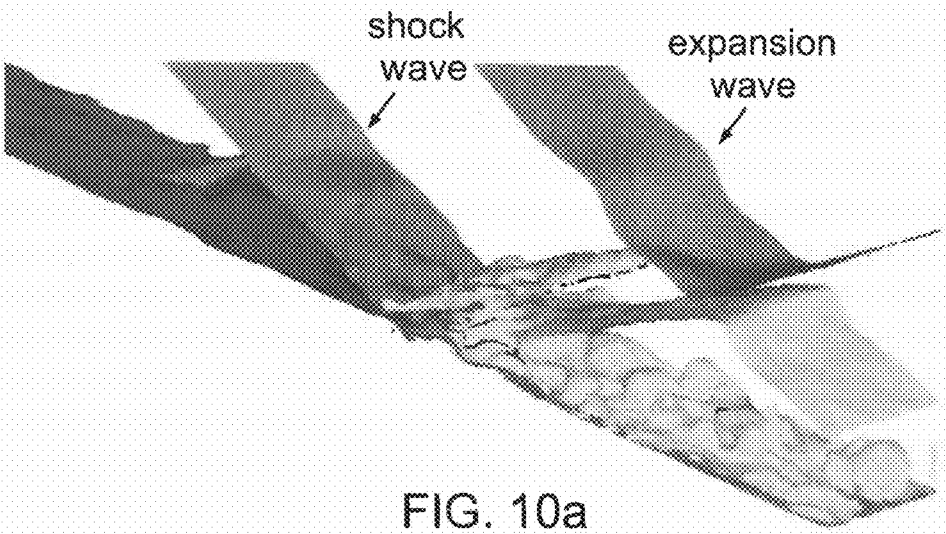
FIG. 10 shows flow visualization of oblique shock interaction: a) density iso-surface for NR, b) velocity contours at $y^+$=5 or NR and c) velocity contours at $y^+$=5 for BR showing reference lengths of 1000 streamwise wall units and 100 wall spanwise wall units.
Figure 10B:
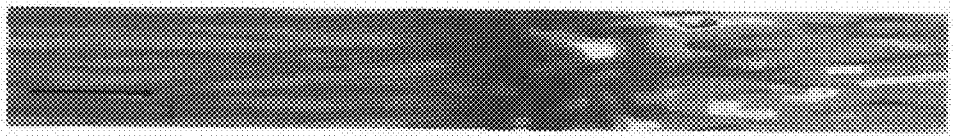

FIGS. 10*a* & 10*b* show instantaneous density iso-surfaces and streamwise velocity contours at $y^+$ of 5 without the flow control device. In terms of overall gas dynamics, FIG. 9*a* shows that the oblique shock wave propagating downward (shown in green) followed downstream by an expansion wave generated from the trailing edge of the shock wedge which also propagates downward (shown in green). The reflected shock from the turbulent boundary layer (shown in yellow) moves upwards and interacts with the expansion wave. It should be noted that the incoming oblique shock wave is two-dimensional while the reflected wave contains significant spatial undulations (and was found to be unsteady). These figures also show the evolution of the coherent structures convecting through the shock. As the shock impinges on the boundary layer, the shapes of the structures just downstream of the shock become more vertically pronounced (FIG. 10*a*). This is due, in part, to the boundary layer thickening and the adverse pressure gradient. The results also show a reduced aspect ratio of the structures, though they begin to relax towards the pre-shock aspect ratios further downstream (FIGS. 10*a* & 10*b*). The reduced aspect ratio and associated reduced coherence of the structures in the streamwise direction near the shock may be attributed to the shock unsteadiness. In the present flow, the reflected oblique shock 106 was observed to undergo oscillations with amplitude on the order of $\delta_{ref}$*.

Figure 10C:
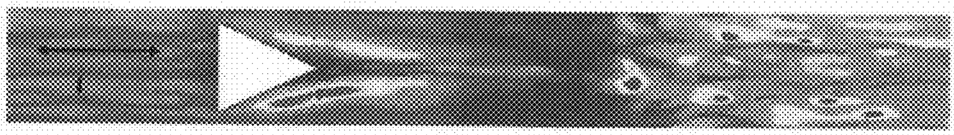

Referring to FIG. 10, the streamwise velocity contours indicate the scale and shape of the low speed streaks for the case with no flow control device. The lengths of the streaks are on the order of 1000 wall units where the spacing between each streaks are approximately 100 wall units upstream of the shock. This length scale is typical for both incompressible and compressible turbulent boundary layer flow. However, the lengths of the streaks decrease (200~300 wall units) while the spacing widens approximately 15 percent as the flow convects through the shock impingement as shown in the density iso-surface contours of FIG. 10*a*. Multiple recirculation regions are observed near the shock impingement so that the overall separation bubble is quite three-dimensional and unsteady. Upon insertion of the baseline micro-ramp (BR) as shown in FIG. 10*c*, the presence of the device causes a horseshoe vortex which induces flow separation at the foot of the micro-ramp and produces a counter-rotating vortex pair shown by the high speed streaks (yellow and orange) resulting from the entrainment of high-speed fluid to the wall. As the vortex pair convects downstream, the high streamwise vorticity fluid breaks up the center of the separation region. This contributes to the recovery of the boundary layer (which was afflicted by unsteadiness of the shock and the adverse pressure gradient) in the form of increased number of high-speed regions.

Vortex Evolution

Figure 11:
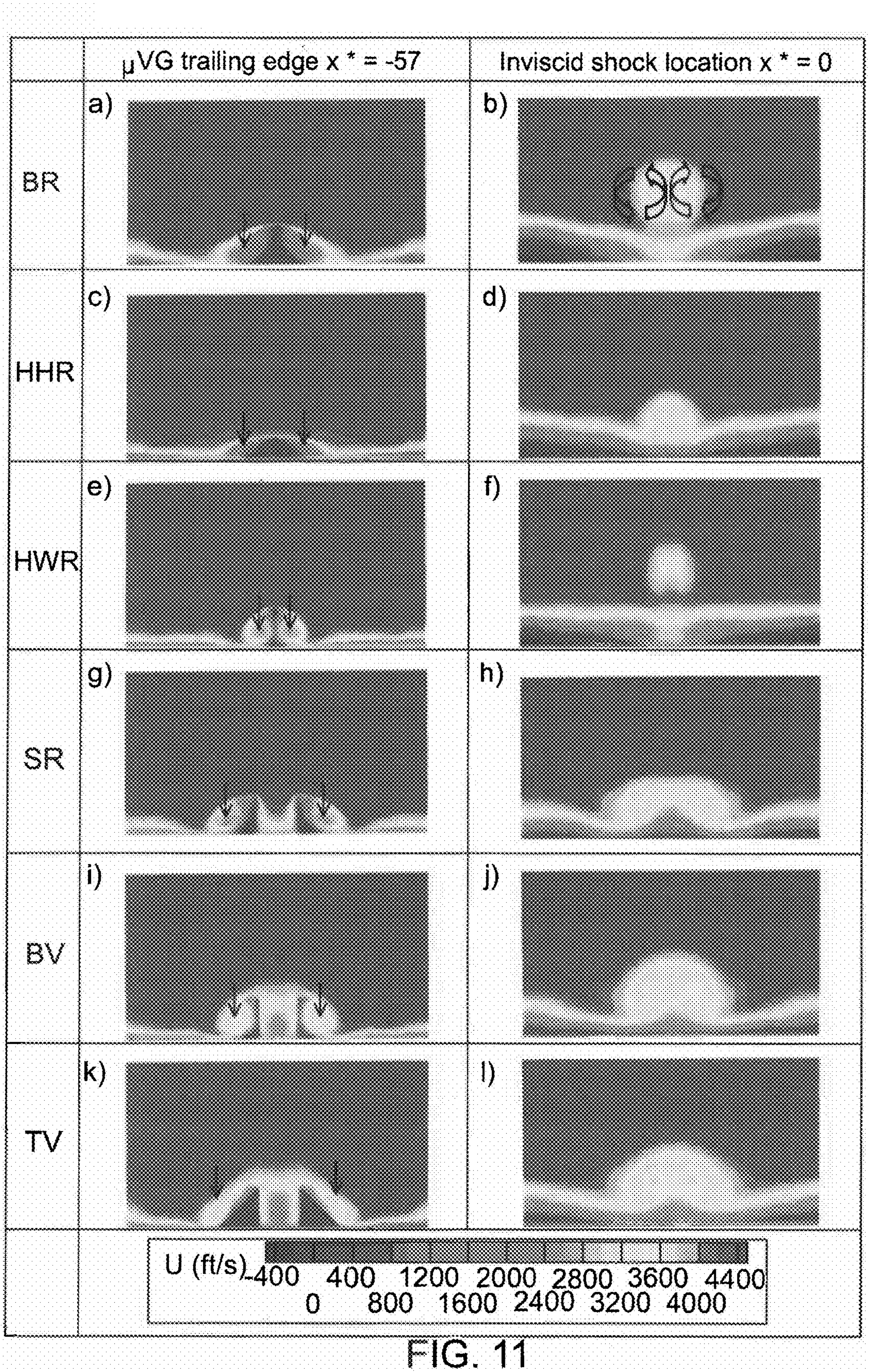
FIG. 11 shows cross-sections of time-averaged (T*=4) streamwise velocity contour at the trailing edge of µVGs (x*=−57 with the center of the vortices are indicated by the arrows) and the inviscid shock location (x*=0)

FIG. 11 shows cross-sections of time-averaged ($T^*=4$) streamwise velocity contour at the trailing edge of μVGs ($x^*=-57$ with the center of the vortices are indicated by the arrows) and the inviscid shock location ($x^*=0$). FIG. 11 shows the spanwise view of the streamwise velocity contour. The counter-rotating vortex pair mentioned above appears as a pair of vortex tubes when examined just downstream of the μVG trailing edge (left-hand column with arrows indicating the center of the vortex cores). The two primary vortices generated by the BR device are largest in size at the trailing edge and can be seen to locally reduce the boundary layer thickness close to the device due to the entrainment of high speed flow (FIG. 11*a*). However, the boundary layer thickness increases away from the centerline indicating significant spanwise variation.

Also shown in FIG. 11*a*, are small secondary vortices (in blue) which form due to the corner flow at the ramp's side wall and the bottom floor. These secondary vortices counter rotate against the primary vortex and, contribute to the rise of the primary vortex from the floor at the inviscid shock location. However, the rise is primarily driven by the upwash generated by the two counter-rotating vortices. The vortices are shown schematically in FIG. 11*b* superimposed on the velocity field to show their influence. The vortices entrain high-speed fluid downward along the outside edges to thin the boundary layer, but also pull low-speed fluid upwards in between the vortices. At this point (FIG. 11*b*), the boundary layer under the vortex pair remains attached and thin despite the shock impingement which is one of the main benefits of using such flow control devices. However, the boundary layer thickness is significantly increased in the outward regions due to flow separation (shown as dark blue region in FIG. 11*b*).

As the height of the micro-ramp is reduced by half with the HHR geometry, the initial size of the vortex tube pair is reduced proportionally but the vortex core strength is approximately maintained (as is that of the secondary vortices) as shown in FIG. 11*c*. At the inviscid shock location (FIG. 11*d*), the primary vortex pair is significantly weakened and does not provide as much centerline thinning as the BR device. However, its lower initial height allows it to have a reduced altitude and decreased intensity appear to have reduced the undesirable thickening at the outer spanwise locations, noted for the BR case.

The micro-ramp reduced in width by half and denoted as HWR yields a pair of primary counter-rotating vortices which are more circular and much closer together in the spanwise direction (FIG. 11*e*). The reduced width of the micro-ramp also substantially reduces the size of the secondary vortices. Downstream (FIG. 11*f*), the close proximity of the two counter-rotating vortices causes them to interact more and degrade in their strength as compared to the BR case. This is consistent with trends seen for low-speed subsonic devices which are spaced too close together. The boundary layer thickness (at the centerline) is thinned similar to that seen for the HHR case but with somewhat more spanwise variation.

The split-ramp (SR) vortex generator is shown in FIG. 11*g* at the trailing edge. In this case, the primary vortices are circular, similar to the case for HWR, but are separated by a significant spanwise spacing on the order of the device height. At the centerline, there is a high speed flow owing to the channel between the two halves of the device. The increased spanwise spacing allows the vortices to stay closer to the wall and with less dissipation further downstream (FIG. 11*h*) as compared to the BR case. This spacing leads to an undesirable upwash near the centerline which causes some boundary layer thickening but also results in thinner boundary layer at outward spanwise locations.

Vortex tubes generated by BV and TV yield streamwise velocity fields which are quite similar to the SR case, but with some differences. At the trailing edge location, BV (FIG. 11*i*) and TV (FIG. 11*k*) show a substantial internal vortex (shown in green) between the vanes which do not retain the high-speed flow seen for the SR case. At the incident shock location, the similarities of the three cases (FIGS. 11*h, j* & *l*) are stronger, with the primary difference that the vane cases have vortex cores that are somewhat closer in spanwise spacing and somewhat higher in distance above the floor. This leads to less upwash near the centerline for the vane case (compared to SR), but all three have similarly thin boundary layers at the outward spanwise locations (as compared to the BR, HHR and HWR cases).

The above results indicate that the last three devices tend to have the best downstream performance, which makes SR and TV particularly useful owing to their physical robustness. Generally, the differences between the BV and the TV are quite small, though the TV tends to have a bit less upwash so that its centerline region is somewhat better whereas the BV tend to have somewhat more high-speed (shown in red) fluid pulled down around the vortices.

Flow Separation Area

Figure 12:
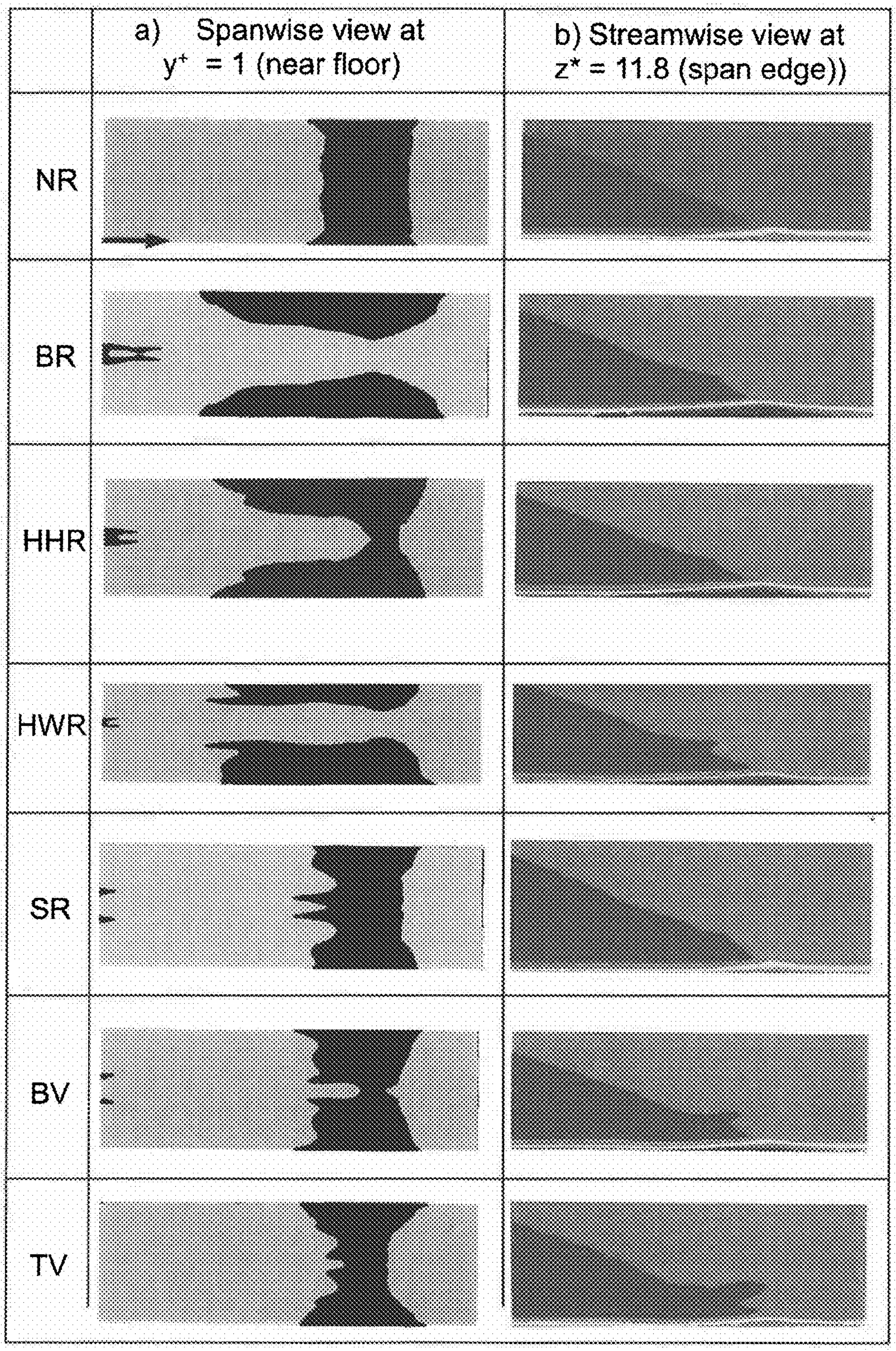
FIG. 12 shows time-averaged streamwise velocity contour for a) spanwise view of flow separation region shown in dark for negative wall shear stress at $y^+$=1 and b) streamwise view showing the oblique shock and the separation bubble (blue region) for x*=−57 to 19 at a spanwise location of z*=11.8 (consistent with the red arrow in FIG. 12*a*)

Flow separation area, defined as the surface region with negative shear stress, can be an important parameter for assessing the μVGs performance, given that a decrease in this area is a desirable feature. The mean flow separation area was obtained using a plane at $y^+=1$ for the six geometries investigated and is shown by the dark color regions in the left-hand column of FIG. 12. The first image shows the solid-wall no-ramp (NR) case where the separation at the shock intersection region is two-dimensional and the accompanying streamwise view of the velocity field (right-hand side column) indicates a thin separation coincident with the oblique shock impact. The left-hand side of baseline ramp (BR) case image shows a pair of thin separation regions related to the streamwise vortices near the centerline. Downstream of these, in the vicinity of the shock, the flow is seen to stay completely attached while the outer spanwise regions yield a much larger streamwise separation length. The outer spanwise changes are consistent with the BR streamwise velocity contours on the right-hand column and both of these aspects are consistent with FIG. 11*b*. The half-height micro-ramp case (HHR) yields a similar result but does not completely eliminate the centerline separation, which is attributed to the reduced strength of the primary vortices. The HWR case is similar to the HHR except that there is a fully attached centerline region though not as wide as for the BR case.

In general, all three of these cases increased the area of separation beyond the NR cases, as shown in Table 2. Table 2 shows spanwise averaged performance parameters for different µVGs with $A_{sep\ NR}=8.01D\delta_{ref}^*$.

TABLE 2

| | BR | HHR | HWR | SR | BV | TV |
|---|---|---|---|---|---|---|
| $\alpha/\alpha_{NR}$ | 0.95 | 0.99 | 0.98 | 0.97 | 0.97 | 0.96 |
| $\delta^*/\delta_{NR}^*$ | 1.08 | 1.06 | 1.05 | 1.10 | 1.10 | 1.13 |
| $H/H_{NR}$ | 0.99 | 1.02 | 1.01 | 1.00 | 0.99 | 0.99 |
| $A_{sep}/A_{sepNR}$ | 1.29 | 1.39 | 1.50 | 0.97 | 0.99 | 0.85 |

The SR, BV and TV cases are substantially different than the BR, HHR, and HWR cases which indicate that the channel region between the vanes dramatically alters the flow. In particular, SR, BV and TV cases yielded separation regions which were much more two-dimensional and similar to the NR case though the indicated effects of the streamwise vortices are shown near the centerline. In general, all three of these devices reduced the area of separation beyond the NR case, with up to a 15% decrease for the TV case (Table 2). This is attributed to the increased size of the primary vortices for these devices, e.g. note in FIG. 11 that the amount of yellow region for the SR, BV and TV cases is much larger than that for BR, HHR and HWR cases.

Vortex Characteristics

To assess the characteristics of the streamwise vortices and their affect on the boundary layer in the vicinity of the shock wave, average values were obtained for various quantities at different downstream distances. In particular, a square spatial averaging window was defined which included a spanwise extent from the centerline of the ramps (z=0) to a position equal to the half-width of the BR height (z=1.46 h) and a vertical extent from the bottom floor of the computational domain (y=0) to a similar height (y=1.46 h). The limited vertical extent confines the averaging to be primarily within the turbulent boundary layer. Average values of the pressure and turbulent kinetic energy were also obtained in this square averaging window:

$$\frac{P}{P_\infty} = \int_0^{1.46h}\int_0^{1.46h} \frac{p}{P_\infty}\,dy\,dz \Big/ \int_0^{1.46h}\int_0^{1.46h} dy\,dz \tag{11}$$

$$\frac{K}{U_\infty^2} = \int_0^{1.46h}\int_0^{1.46h} \frac{(\overline{u'^2}+\overline{v'^2}+\overline{w'^2})}{U_\infty^2}\,dy\,dz \Big/ \int_0^{1.46h}\int_0^{1.46h} dy\,dz \tag{12}$$

In the first expression, p is the time-averaged pressure at a computational node, $P_\infty$ is the freestream pressure, and P is the spatially-averaged pressure. Likewise, the time-averaged turbulent kinetic energy, given by the sum of the time-average of the fluctuating velocity is used to obtain a spatially-averaged kinetic energy, K. The pressure and kinetic energy averaged using the above equations are shown in FIG. 8 for each of the µVGs in terms of non-dimensional distance from the inviscid shock location defined as $x^{}_{SI}\equiv(x-x_{SI})/h$. Note that the trailing edge of the µVGs occur at $x^{}_{SI}=-18$ which is slightly upstream of the y axis in the plot. For the pressure distributions, all the results qualitatively follow the inviscid pressure rise for an oblique reflecting shock as given by the dashed-line. Departures from this dashed-line can be primarily attributed to the viscous effect which causes an upstream influence of the shock and a diffused shock interaction in the streamwise direction. The thickening of the boundary layer and separation before the shock impinges results in a well-established increase in the spatially-averaged pressure. This pressure continues to rise throughout the shock interaction region indicated by the arrow which approximately extends from $x^{**}_{SI}=-10$ to 10 over a distance that is consistent with the length of the separation bubbles.

Figure 13A:
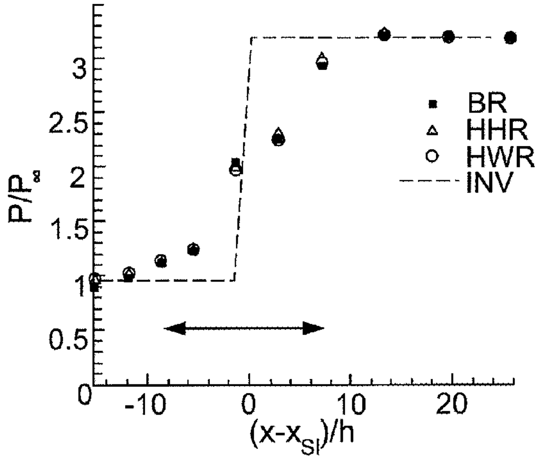
FIG. 13 shows time-spatially averaged (for T*=4 for y*=0 to 4.66 and z*=0 to 4.66) values for pressure and turbulent kinetic energy at discrete streamwise locations. Arrows indicate the SBLI regions.
Figure 13B:
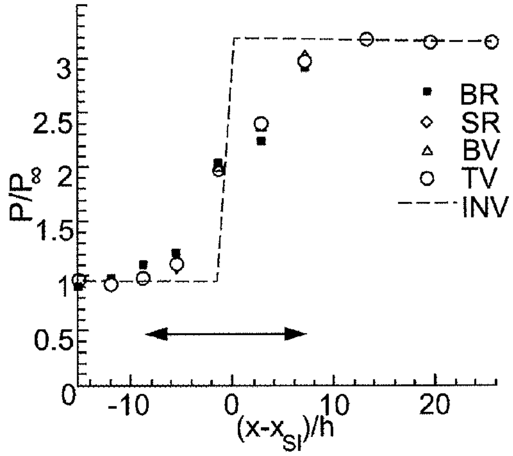
Figure 13C:
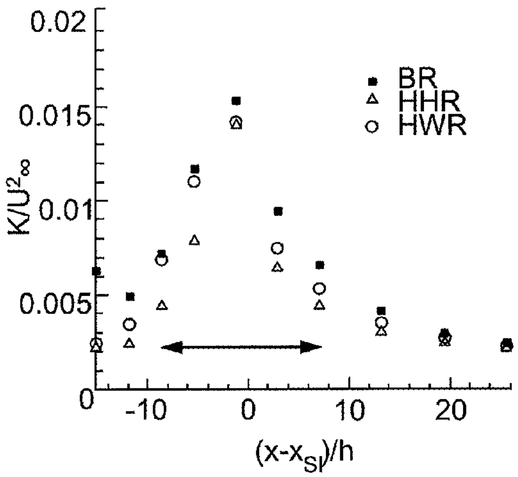
Figure 13D:
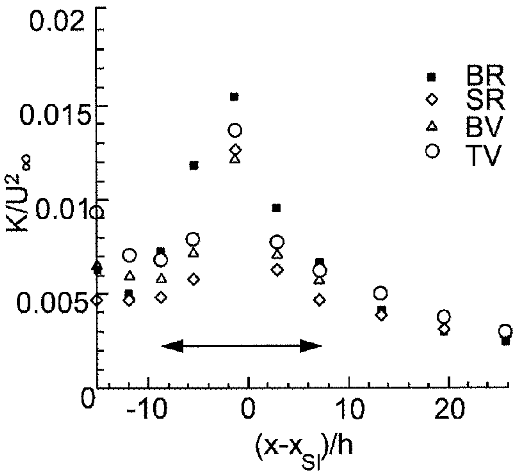

FIG. 13 shows time-averaged streamwise velocity contour for a) spanwise view of flow separation region shown in dark for negative wall shear stress at $y^+=1$ and b) streamwise view showing the oblique shock and the separation bubble (blue region) for $x^*=-57$ to 19 at a spanwise location of $z^*=11.8$ (consistent with the red arrow in FIG. 11*a*);

FIG. 14 shows time-spatially averaged (for $T^*=4$ for $y^*=0$ to 4.66 and $z^*=0$ to 4.66) values for pressure and turbulent kinetic energy at discrete streamwise locations. Arrows indicate the SBLI regions;

FIGS. 13*a* and 13*b* show that the BR, HHR and HWR cases are all nearly identical, but that the SR, BV and TV cases tend to have a less diffused pressure rise. This can be attributed to a reduction in their overall streamwise separation bubble length in comparison. Referring to FIGS. 13*c* & 13*d*, the spatially-averaged turbulent kinetic energy, K for all the µVGs cases is somewhat higher than that for traditional supersonic boundary layers at $x^{}_{SI}=-15$ owing to the wakes from the devices since this position is 3 h downstream of their trailing edge. However, the impact of the shock-wave enhances turbulence such that the kinetic energy is increased by nearly three-fold. The oblique shock DNS showed a 2.7 increase in the mean turbulent kinetic energy at the shock location in comparison with the upstream condition. This was attributed to the strong mixing layer at the separation bubble, as well as the shock oscillations. The BR case has the highest peak value of K at $x^{}_{SI}$ of about zero which may be related to the larger and more complicated separation region for this case (as well as that for HHR and HWR). The lower intensities for the SR, BV and TV cases can thus may be related to the smaller overall area of their separation bubbles compared with those of the other three devices (consistent with FIG. 12 and Table 2). Further downstream at $x^{**}_{SI}=26$, it is interesting to note that the BR, HHR and HWR cases have lower turbulence levels than those of the other three devices. The reason for this is less clear but may be due to an increased persistence of the unsteady streamwise vortices within the boundary layer.

Figure 14A:
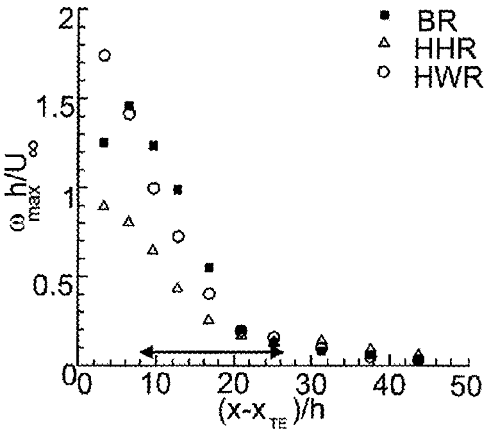
FIG. 14 shows temporally and spatially averaged (same as FIG. 13) values for streamwise vorticity and the spatially averaged center that represents the path of the vortex pair for each µVGs. Arrows indicate the SBLI region.
Figure 14B:
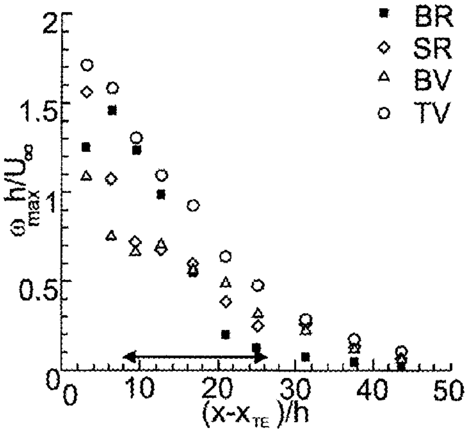

FIGS. 14*a* and 14*b* show the streamwise variation of $\omega_{max}$ (peak vorticity within the vortex core which is normalized by the free-stream velocity and the height of the baseline ramp) with respect to streamwise-distance. The streamwise-distance is referenced to the generator trailing-edge and normalized by the generator height as: $x^{}_{TE}\equiv(x-x_{TE})/h$ (note that the theoretical shock impinges at $x^{}_{TE}=18$). At $x^{}_{TE}=3$ (equivalent to $x^{}_{SI}=-15$), magnitude of $\omega_{max}$ is highest for the most cases since this position is close to the µVG trailing edges. Through the shock-wave the strength of the vorticity decays rapidly. This can be attributed to the high rate of mixing evidenced by the large increase in kinetic energy at this point and is consistent with the flow visualization of FIG. 10*c*. Reducing the height (HHR) caused a dramatic reduction in the initial vorticity which can be attributed to a smaller surface area for flow turning but also an increased immersion in the boundary layer, so that less of the high speed fluid was affected by the device. However, reduction in the width (HWR) gave higher initial vorticity which maybe caused by decreased ramp side angle allowing the vortices to form quickly.

As seen earlier in FIG. 11, HWR case yielded an even circular structure at the trailing edge of the device whereas the vortex formation is still in the transitional stage with other devices yielding an oval-like shape. In the shock interaction region (whose span is indicated by the arrow), there are large variations in the decay rate due to different interactions of the vortices with the shock. However, far downstream of the shock impingement ($x^{}_{TE}$=44), all three of these ramps reduced to similar vorticity levels. This is in contrast to the more profound differences noted at $x^{}_{TE}$=18 (near the shocks) in this Figure and in FIG. 6*b, d* & *f*. Thus, the geometric differences are mostly lost far downstream of the trailing edge of the generators and the shock interaction.

The split ramp and thick vane cases (SR and TV) showed higher initial vorticity compared to the baseline ramp case, while the baseline vane case yielded a lower strength. Furthermore the streamwise vorticity for the SR, BV and TV cases were more robust to the shock strength yielding higher levels than that of the BR case near and downstream of the interaction ($x^{**}_{TE}$>18). This may be partially attributed to the slightly reduced altitude of the vortex core for these cases as compared to the BR case. However, the primary reason for the persistence through the shock may be the significantly increased lateral spacing, which reduced the vortex-vortex interaction and the vortex-shock distortion. In addition, this may be due to a more stable flowfield for the separated vortices, which is consistent with reduced kinetic energy for the vane-type devices.

Figure 14C:
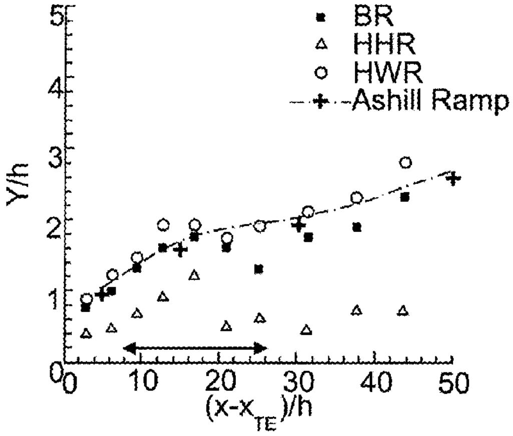
Figure 14D:
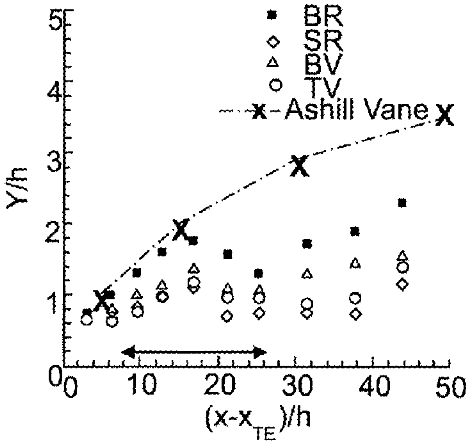

The trajectories of the vortex pair is approximated by the position of the $\omega_{max}$, Y and Z, which are the normal and spanwise positions respectively. The impinging shock tilts the vortex paths downward but afterwards they tend to recover the lifting effect similar to the subsonic case. HWR/HHR has the highest/lowest distance above the floor which is consistent with the results seen in FIG. 11. However, SR and the micro-vanes maintained a low profile for most of its path due to the spacing between the vortex pair which reduced the up-wash effects (FIGS. 14*c* & 14*d*).

Figure 14E:
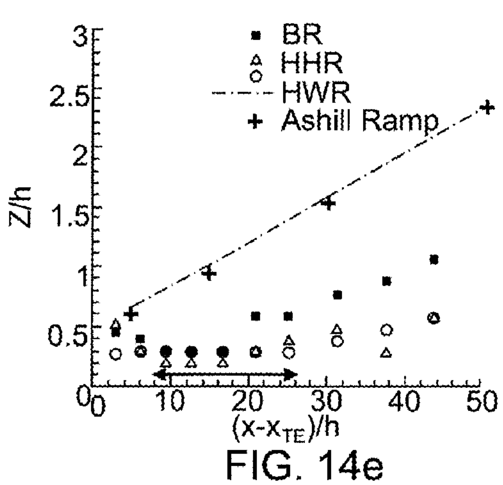
Figure 14F:
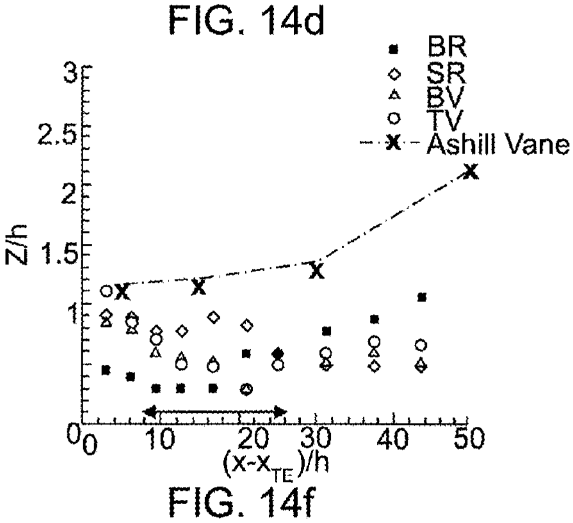
Figure 15A:
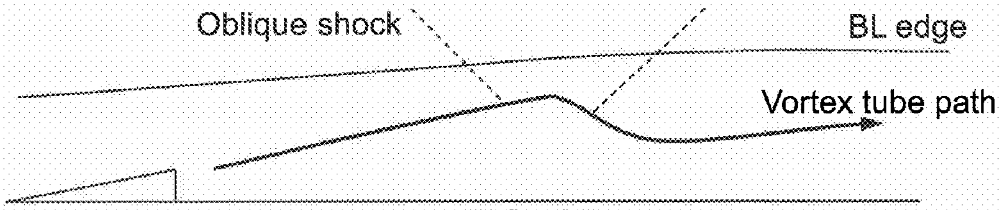
FIG. 15 shows a side view a) schematic of transverse path of the vortex tube with respect to the boundary layer (BL) edge with the oblique shock interaction, b) averaged density contour of BR case, top view of the streamwise velocity contours at $y^+$=5 for c) BR and d) TV where the streamlines show the approximate trajectories of the primary vortices.
Figure 15B:
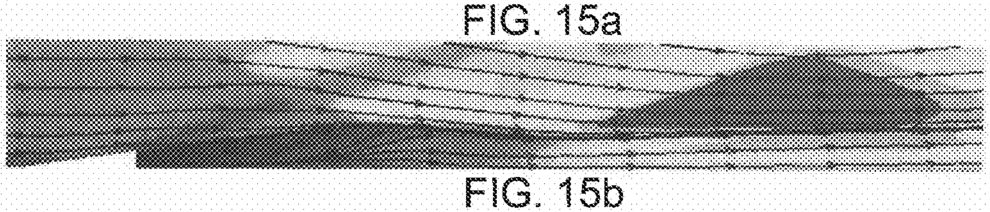
Figure 15C:
Figure 15D:
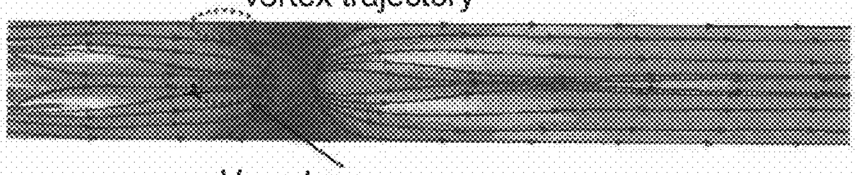

FIGS. 15*a* & 15*b* show a schematic of the vortex pair trajectory and the streamlines of the averaged MILES for BR, suggesting that a vortex tube traveling at higher distance above the floor will be more affected by the shock waves since it will be more directly exposed to gas dynamic waves. As shown in FIGS. 15*c* & 15*d* for BR and TV respectively, the streamlines close to the centerline initially collapses closer just downstream of the device wake (a triangular blue region) after which they slightly expand in the shock interaction region. The reason for this expansion is not clear but may be related to a sudden enlargement of the vortex due to the shock interaction. It is well known that the vortices subjected to sufficiently strong adverse pressure gradient develops "vortex-breakdown" or "vortex-bursting" for a variety of speed regimes. Once a bursting occurs, the diameter of the vortical structure rapidly expands with significant changes in the velocity profile. Thus dilation of the vortex core may be the main cause of the diverging trajectory of the vortex pair near the shock location. In the case for SR, BV and TV, the vortices are initially further away from each other in the spanwise direction (FIG. 14*f*) due to the spacing between the each component of the device which is consistent with the arrow positions in FIG. 11. Since these vortices are further apart, they do not undergo significant contraction upstream of the shock interaction. Once entering the interaction, the streamlines neck-in due to the low-velocity high-pressure separated regions on the sides (shown in blue) and perhaps are less likely to burst due to their increased spacing from each other, as shown in FIGS. 14*e* & 14*f*.

Figure 16A:
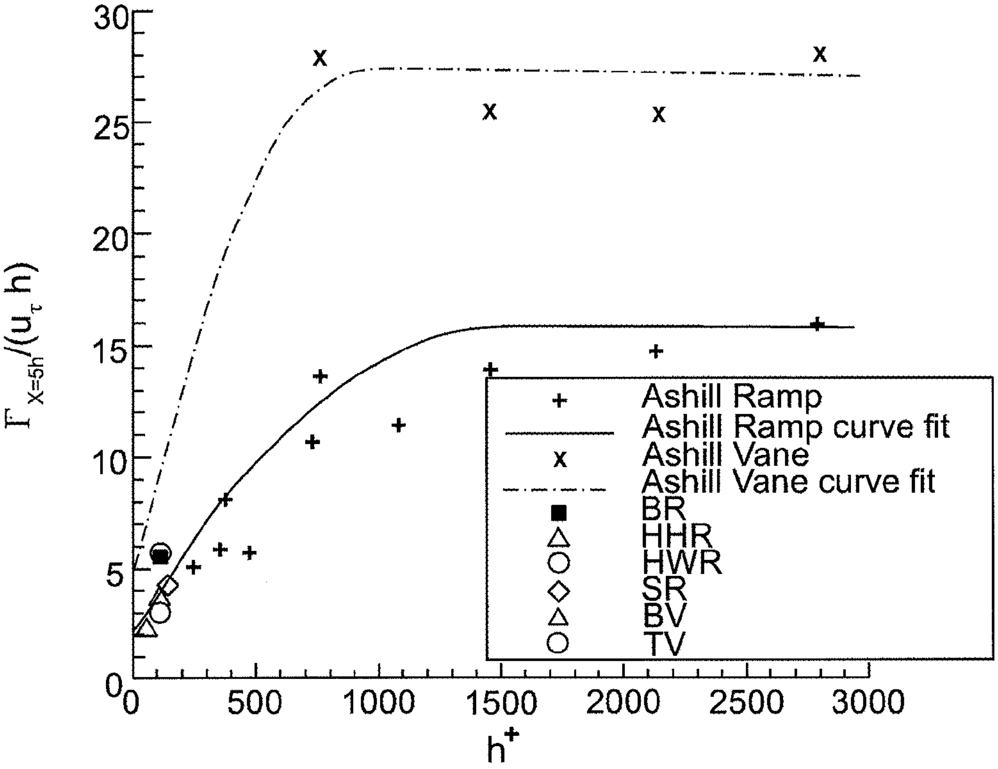
FIG. 16 shows correlation of a) circulation of various µVGs at 5 h downstream with the device height in wall units and b) decay of vortex peak strength with downstream distance.
Figure 16B:
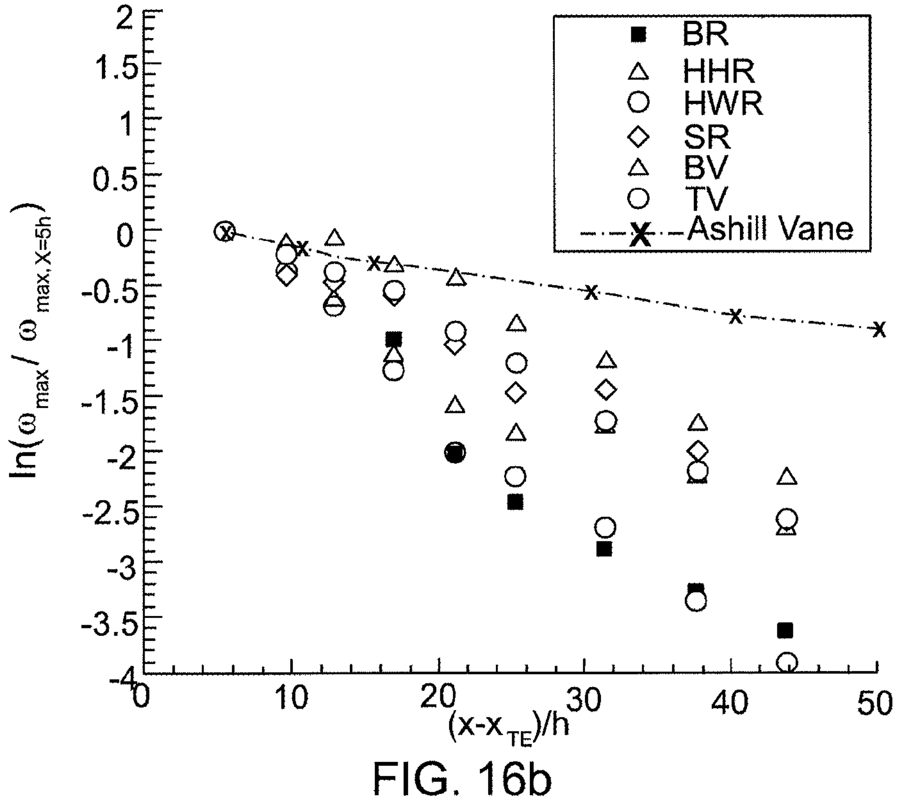

FIG. 16*a* shows the correlation of the vortex strength represented by the circulation at 5 h downstream for the μVGs. The circulation is computed around the edges of the same averaging window used in Equation 11 and 12. The numerical results occur at small $h^+$ values due to low Reynolds number flow. FIG. 16*b* shows the streamwise vorticity decay with distance, where the vorticity is normalized by that at $x^{}_{TE}$=5. All the present results show a rapid decay within the shock interaction region, while the low-speed subsonic result from a circulation profile indicate a slow but consistent decay rate with downstream distance. In contrast to the ramps devices, the vane-type devices had stronger persistency of vorticity strength through the interaction and maintained the strongest level at $x^{}_{TE}$=44. This is attributed to the large initial spacing between the vortex pair which reduces vortex interaction and shock distortion, as seen in FIG. 14*f*.

8 Spanwise Distribution of Performance Parameters

The impact of the micro-vortex generators at the measuring plane, MP shown in FIG. 8, were investigated using as the basis on stagnation pressure recovery factor, α, displacement thickness, δ*, momentum thickness, θ, and the incompressible shape factor which are defined as:

$$\alpha=\int_0^{y_{max}}(P_o/P_{o,\infty})dy \tag{13}$$

$$\delta^*=\int_0^{y_{max}}(1-U/U_\infty)dy \tag{14}$$

$$\theta=\int_0^{y_{max}}U/U_\infty(1-U/U_\infty)dy \tag{15}$$

$$H=\delta^*/\theta \tag{16}$$

In this expression, $P_{o,\infty}$ is the stagnation pressure at freestream, $y_{max}$ is the maximum height to avoid interference of the expansion wave emanating the upper wall (=23 $\delta_{ref}$*), these parameters are plotted as a function of spanwise distance in FIG. 16.

Figure 17A:
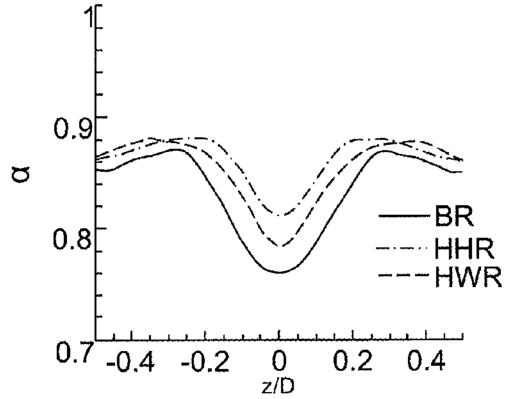
FIG. 17 shows spanwise distribution of stagnation pressure recovery, displacement thickness and incompressible shape factor for various µVGs.
Figure 17B:
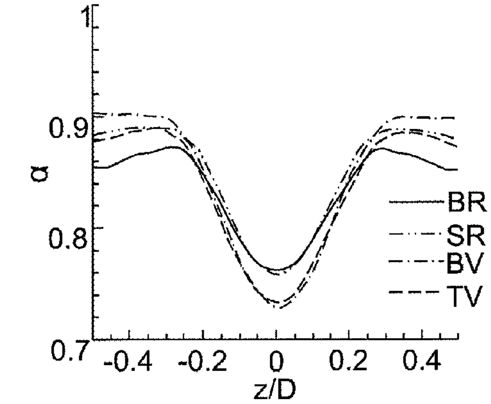

FIG. 17 shows spanwise distribution of stagnation pressure recovery, displacement thickness and incompressible shape factor for various μVGs, where $\delta_{NR}^*/\delta_{ref}^*$=1.07, $\alpha_{NR}$=0.80 and $H_{NR}$=1.25;

The stagnation pressure recovery factor for the BR case indicated large deficits in the centerline wake region due to the drag of the flow control devices. The HHR and HWR, having smaller dimensions, had a lesser effect (FIG. 17*a*). However, BV and TV increase the deficit in the wake region which may be due to stronger transformation of streamwise energy into vorticity as shown in FIG. 17*b*. Despite the losses in the wake region, the micro-vanes and other variation of the micro-ramps (HHR, HWR, SR) had much improved results at the outward regions. This may be due to the initial spanwise spacing of the primary vortex pair which allowed them to be less distorted by each other and diffused by the shock. Consequently, the spanwise average values were higher than the BR case as shown in Table 2. Although the resulting values reveal that the losses due to the μVGs were greater than for the case with no flow-control device, HHR had the highest recovery factor shown in Table 2.

Figure 17C:
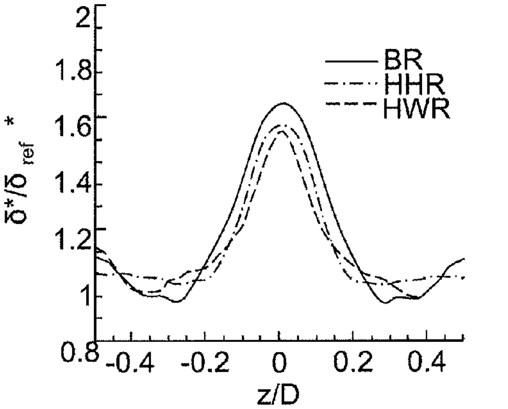
Figure 17D:
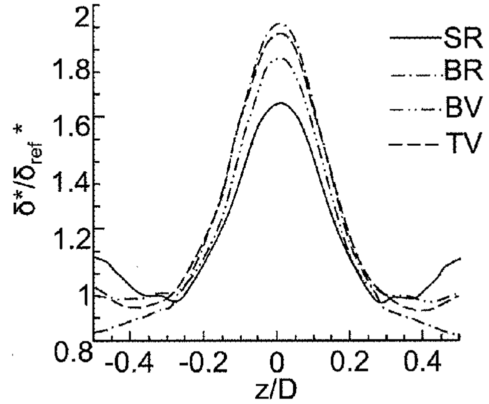

Likewise, the displacement thickness distribution, shown in FIGS. 17*c* & 17*d*, displays the large wakes of the μVGs at the center region where SR, BV and TV had the most impact. Despite the improvements in the displacement thickness in the outward spanwise region, especially for BV and TV shown in FIG. 17*d*, the increase in the spanwise average thickness were greater than that for the losses seen in the pressure recovery as shown in Table 1. The average displacement thickness normalized by that with no flow-control device for TV gave 13% increase where HWR had the least increase.

Figure 17E:
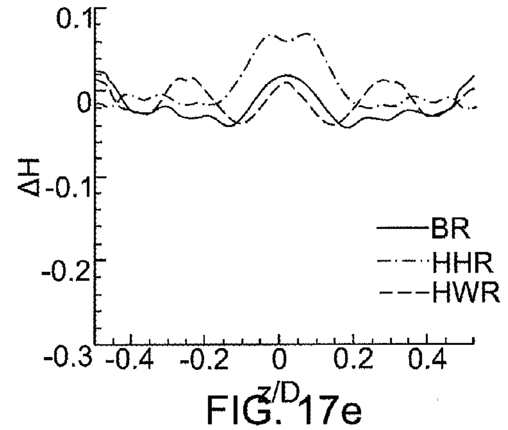
Figure 17F:
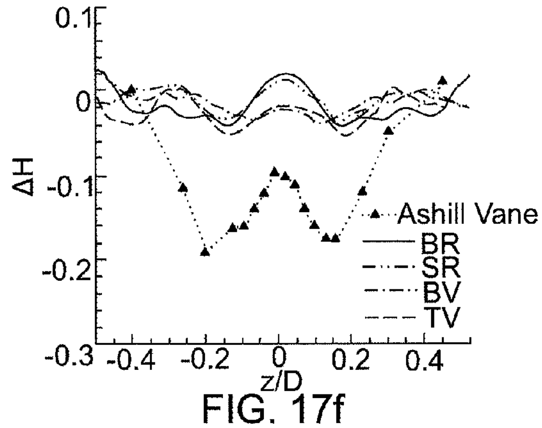

FIGS. 17*e* and 17*f* show the shape factor presented as increments which are referenced to the shape factor measured at the μVG position without the device and shock. Referring to FIGS. 17*e* and 17*f*, peaks in the center region for the shape factors are consistent with the wake deficit shown in both the displacement thickness and the stagnation pressure recovery factor though the spanwise average results were similar to NR case shown in Table 2. However, the overall reductions in the shape factor for the experiments are greater than the numerical results indicating much improved performance which maybe due to the higher Reynolds number.

Several different types of μVGs with various dimensions and shapes for supersonic boundary layer flow control are studied using Monotone Integrated Large Eddy Simulation (MILES). A third-order upwind spatial scheme with a second-order approximate factorization scheme using baseline structured grid generated flow solutions that were in good agreement with the experimental data. A special 'rescale-recycle' algorithm for compressible flows is used to generate turbulent inflow conditions which reduce computational cost by eliminating the need to compute boundary layer flows from the leading edge of the flat plate.

Shock interaction with the boundary layer produces substantial break-up in the turbulent structures, resulting in smaller aspect ratios just downstream of the shock impingement which may be caused by the unsteadiness of the reflecting shock interacting with the low-speed coherent structures. Further downstream, the structures tended to pre-shock characteristics. Similar results were found when a micro-ramp was present but their counter-rotating vortices dominated the streamwise vorticity in the vicinity of the shock interaction. The simulations showed that strong streamwise vorticity is generated by the μVGs and this vorticity helps to entrain high momentum from the upper boundary layer to the wall. This high momentum generated by the μVGs contributes to reducing or breaking up the flow separation region induced by the shock. The micro-vane and the hybrid devices, namely the "thick vane" and the "split ramp", had the most impact in reducing the flow separation due to the persistence of strong streamwise vortices through the shock interaction. This persistence can be related to the increased spanwise spacing between the two primary streamwise vortices at their point of formation which also helped to reduce the local turbulence intensity and dissipation levels compared to that seen for the micro-ramp case. The impinging oblique shock influences the trajectories of the vortex pair so that its path normal to the wall turns downward at the shock impingement and recovers at downstream location. The spanwise trajectories of the vortex pair are also affected by the shock which induces the vortex diameter to expand and causes the vortex pair to repel from each other.

Despite the drag penalty due to the presence of the μVGs, where BR gave the most loss in the stagnation pressure recovery, incompressible shape factors were reduced in most cases indicating a healthier boundary layer. However, the flow disturbance caused by the μVGs increased the displacement thickness with the micro-vanes having higher values than the micro-ramps due to strong streamwise vorticity. Such events may correlate to the higher peaks of turbulent kinetic energy and rapid streamwise vorticity decay at the shock region.

Figure 19A:
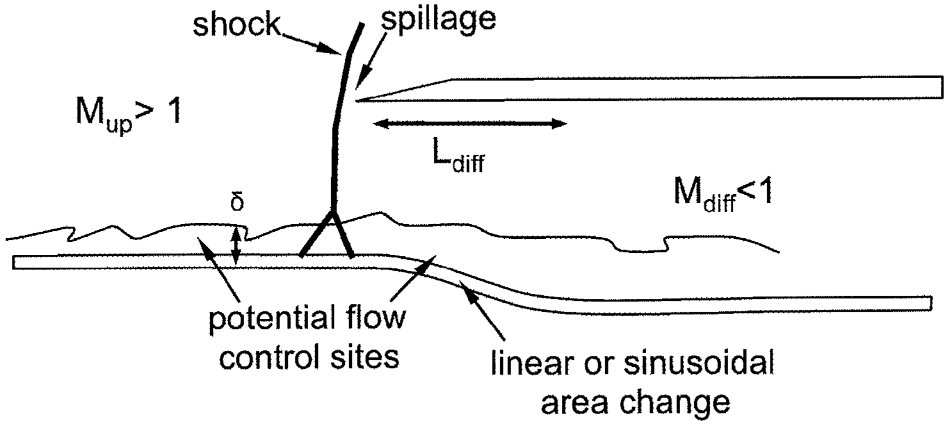
FIGS. 19 and 19*b* show further alternative arrangements of vortex generators wherein FIG. 19 *a* shows a split-ramp vortex generator 20 and FIG. 19*b* shows a ramped-vane vortex generator 100.
Figure 19B:
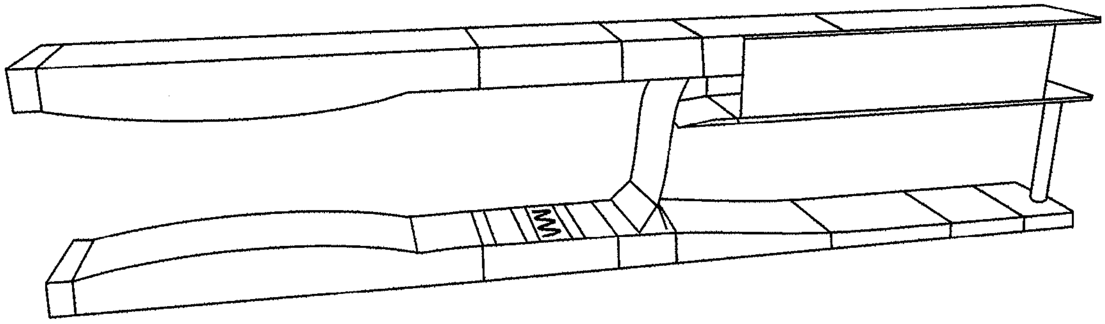

Referring to FIGS. 19*a* and 19*b*, experiments were conducted in the blow-down supersonic wind tunnel. FIG. 19*a* shows a schematic of the test setup. It consists of a flow splitter plate and linear six-degree diffuser representative of inlet geometry. All tests were conducted at a freestream Mach number of 1.4, typical of inlet flow, and with stagnation temperature of 290K and stagnation pressure of 170 kPa. Fluctuations in the stagnation temperature and stagnation pressure over the course of a tunnel run cause fluctuation in Reynolds number of less than 5%, with typical runtime of 20-30 seconds. Flow diagnostics included high-speed Schlieren video (2000 fps), surface oil flow visualization, and pressure measurements using a pitot-static system.

Figure 18A:
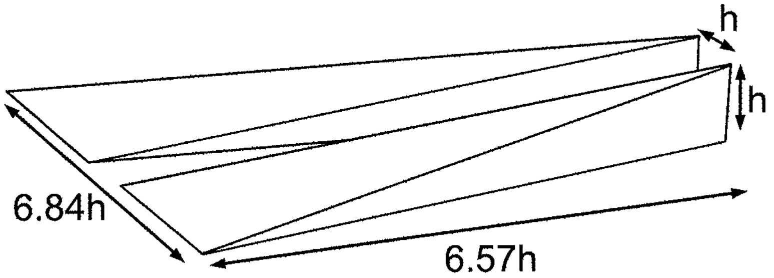
FIG. 18*a* shows a general NSBLI flow control configuration used to represent the flow physics of external compression inlet.
Figure 18B:
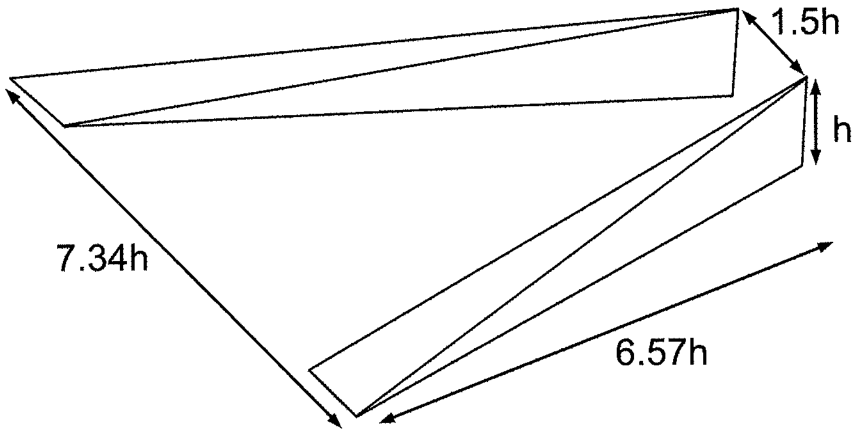
FIG. 18*b* shows a wind tunnel test configuration used in the experiment.

In addition to the baseline solid-wall geometry, a range of heights and streamwise locations for two different micro vortex generator geometries was considered: ramped-vanes (FIG. 18*a*) and split-ramps (FIG. 18*b*). Device height, h, ranged between 2 mm and 4 mm (with an incoming boundary layer thickness of 5 mm). Device placement was set at three fixed positions of 15, 25, and 35 boundary layer thicknesses, δ, upstream of the normal shock. Spanwise spacing was fixed as 10 h gap-to-gap for ramped-vanes and 8 h gap-to-gap for split-ramps. All test samples were manufactured using rapid prototyping techniques with resolution of 12 microns, allowing for a smooth surface finish despite the small device size. The vortex generators were made with a 1 mm thick plate of material underneath for convenient mounting and alignment with the flow direction. These plates were in turn secured to 3 mm aluminum blanks with adhesive and countersunk screws at the corners, and finally secured in one of three 4 mm cut outs in the tunnel floor, corresponding to the three streamwise test locations. One vortex generator plate and two blanks were used for each test case, while three blanks provided the baseline no-control case. Once mounted the plates were sealed with putty and sanded to a smooth finish, then painted matte black to provide a high contrast surface for oil flow visualization with a mixture of Titanium Dioxide and Paraffin. This mounting method was found superior to manufacturing and mounting vortex generators (or in this case vortex generator halves) individually as alignment with the incoming freestream and consistent placement at all streamwise locations was assured.

The VGs tested include ramped-vanes with heights of 2 mm, 3 mm and 4 mm and split-ramps with heights of 3 mm and 4 mm. The final VG test matrix included ramped-vanes with heights of 2 mm, 3 mm, and 4 mm as well as split-ramps with heights of 3 mm and 4 mm. For all devices, placement was at three fixed positions of 15, 25, and 35 boundary layer thicknesses upstream of the normal shock in the planar, inlet-analogue test geometry with a flow splitter plate and 6-degree diffuser. Incoming boundary layer thickness is 5 mm. Device spacing is fixed with 10 h gap-to-gap for ramped-vanes and 8 h gap-to-gap for split-ramps.

Table 3 is a summary of displacement thickness δ*, momentum (mm) thickness, and shape factor H for the no-control (NC) baseline, ramped-vane (RV) and split-ramps (SR) tested.

TABLE 3

| VG | h | δ* (mm) | θ (mm) | H |
|---|---|---|---|---|
| NC | — | 8.18 | 5.38 | 1.52 |
| RV | 2 mm | 7.98 | 5.07 | 1.57 |
| RV | 3 mm | 6.72 | 4.62 | 1.45 |
| RV | 4 mm | 6.07 | 4.62 | 1.31 |
| SR | 3 mm | 8.38 | 5.37 | 1.56 |
| SR | 4 mm | 8.63 | 5.63 | 1.53 |

Figure 20:
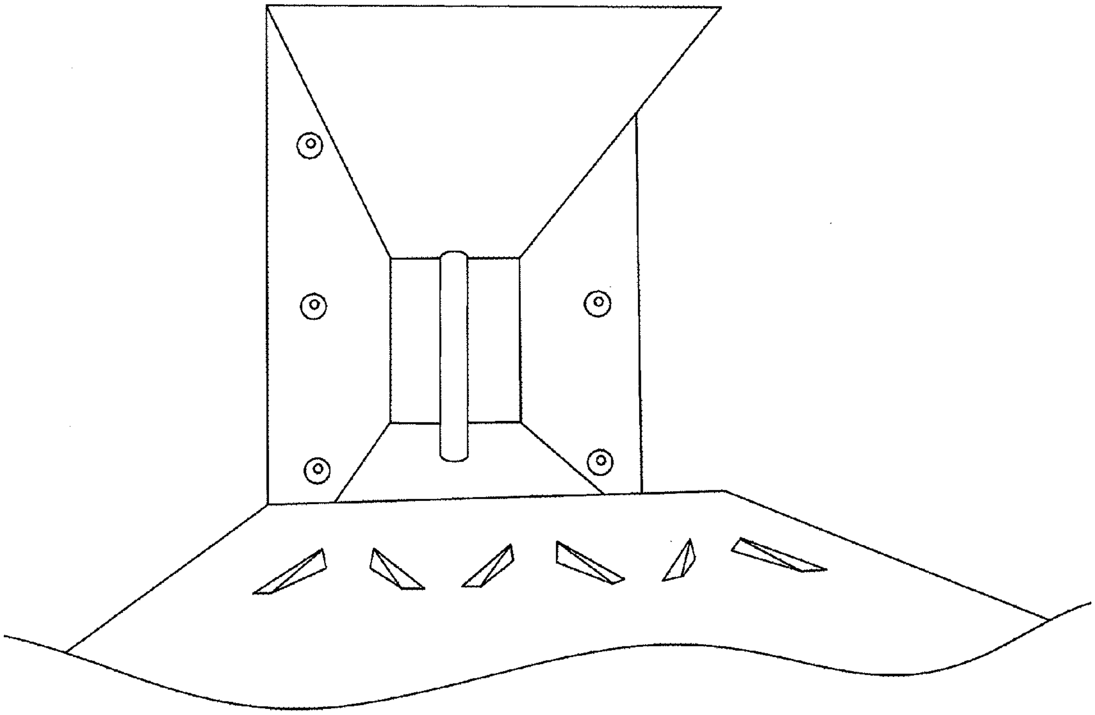
FIG. 20 is a downstream view of the ramped-vane type VG as installed in the tunnel.

FIG. 20 shows ramped-vanes secured for testing, which were photographed from the upstream direction. The splitter plate can be seen near the top edge of the figure and the choking cylinder is visible in the background. Note the large rectangular window on the right tunnel sidewall. The left tunnel sidewall, here removed for access, features a matching window, allowing for unobstructed visual access for Schlieren imaging.

The fabrication technique employed allowed for consistent device placement accurate to within 1 mm in the streamwise and spanwise directions. Experimental uncertainty was present in pressure measurements and Schlieren imaging of the shock position. Stagnation and static pressures were measured to an accuracy of 1% while the position of the static pressure tap and pitot rake tubes is accurate to within 0.5 mm. Shock position as determined from the Schlieren images is accurate to within several pixels.

A. Schlieren

Figure 21A:
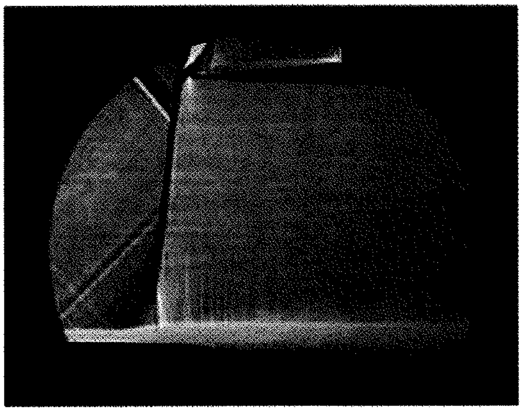
FIG. 21 is instantaneous Schlieren of (a) baseline configuration, (b) 4 mm ramped-vanes at the 25 δ position, and (c) 4 mm split-ramps at the 35 δ position.

Flowfield characterization began with high speed Schlieren video, a live feed of which was used to position the shock slightly upstream of the splitter plate. FIG. 21 shows an instantaneous Schlieren snapshot for the baseline case. The field of view encompasses a section of the inflow region, the splitter plate and small section of the outer flow, and a section of the diffuser directly downstream of the normal shock position. This was chosen to image the boundary layer upstream of the normal shock, the normal shock itself, and the resulting post-SBLI flowfield immediately downstream of the normal shock and within the upstream portion of the diffuser. Note that the apparent change in slope of the diffuser floor at the lower edge of the field of view is caused by blockage from the lower edge of the tunnel sidewall window. The diffuser slope remains unchanged until outside of the field of view. In FIG. 21*a*, the incoming boundary layer and lambda shock foot of the normal shock are clearly visible. A series of small secondary shocklets is present downstream of the lambda shock foot and a thick boundary layer develops within the diffuser. The few weak oblique shocks visible in the freestream are caused by joints between tunnel surfaces.

Figure 21B:
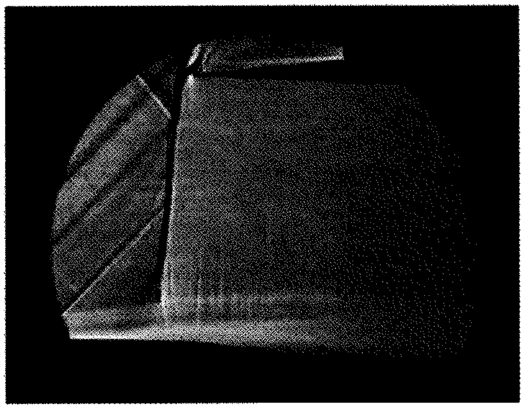
Figure 21C:
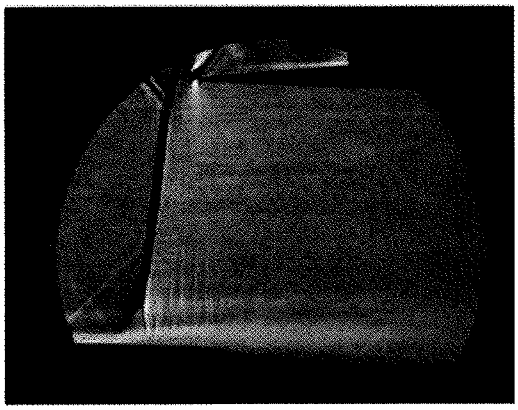
Figure 22A:
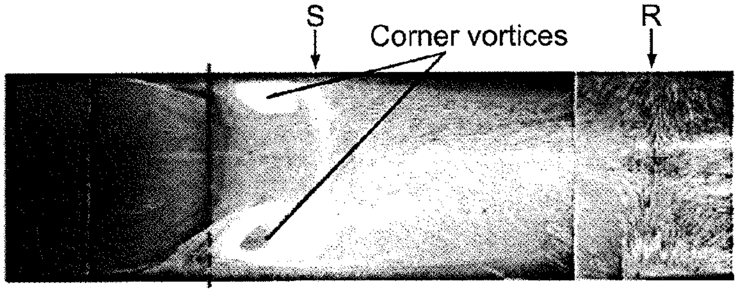
FIG. 22 is oil flow visualization of base line no-control case (a), and 2 mm ramped vanes at 15 δ (b), 25 δ (c), 35 δ (d), upstream of the shock location.
Figure 22B:
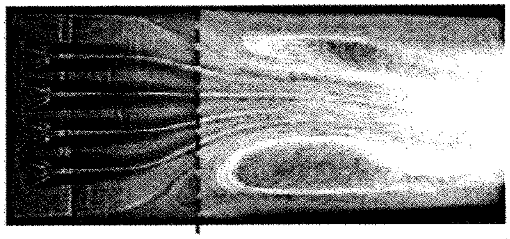
Figure 22C:
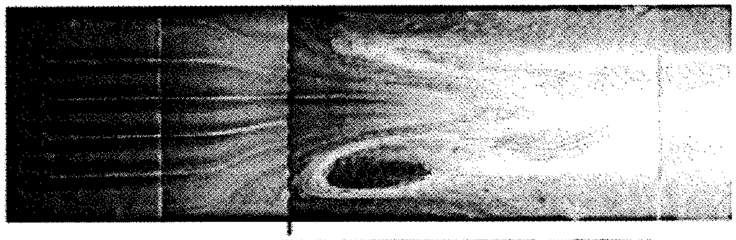
Figure 22D:
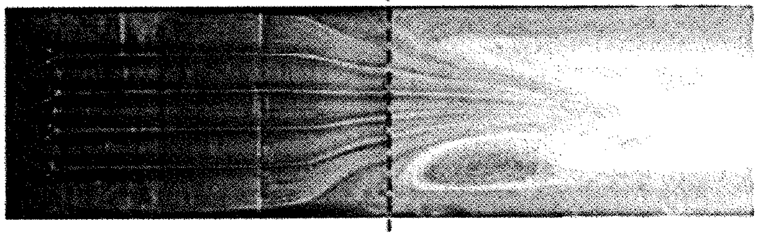

Comparison with instantaneous Schlieren of representative ramped-vane and split-ramp cases, specifically 4 mm ramped-vanes at the 25 δ position and 4 mm split-ramps at the 35 δ position, which were found to yield the best flow control performance as will be discussed subsequently, is given in FIG. 21*b-c*. In both controlled cases, the vortex pairs and wakes formed by the flow control devices are visible upstream and downstream of the normal shock. Both controlled cases also feature a shear layer which appears to be closer to the tunnel floor. The lambda shock foot in both controlled cases appears more diffuse though its size and geometry are generally not changed. Oblique shocks formed by the devices are seen upstream of the normal shock in the case of ramped-vanes, but not split-ramps, due to the far upstream placement location of the latter in the case shown.

B. Oil Flow Visualization

Figures 23A, 23B, 23C, 23D:
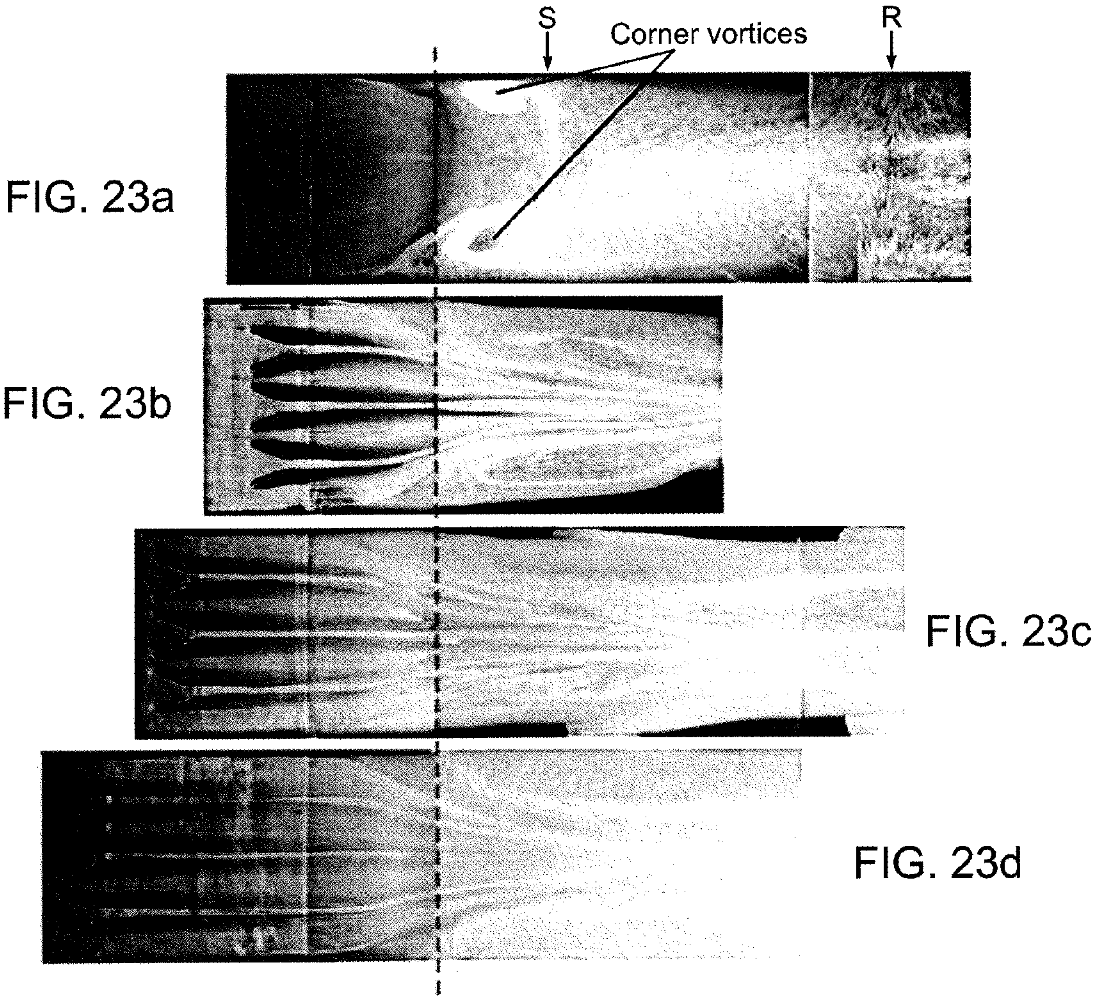
FIG. 23 is oil flow visualization of base line no-control case (a), and 3 mm ramped vanes at 15 δ (b), 25 δ (c), 35 δ (d), upstream of the shock location.
Figure 24A:
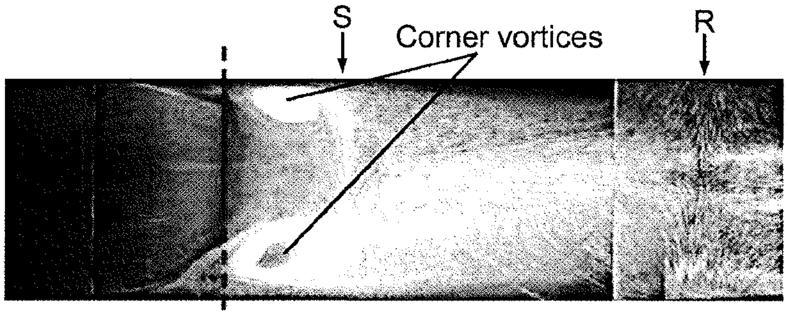
FIG. 24 is oil flow visualization of base line no-control case (a), and 4 mm ramped vanes at 15 δ (b), 25 δ (c), 35 δ (d), upstream of the shock location.
Figure 24B:
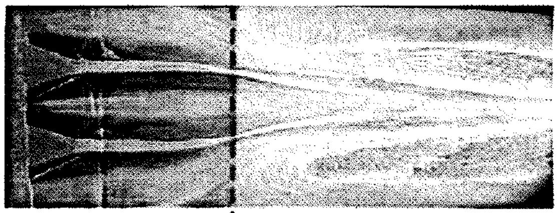
Figure 24C:
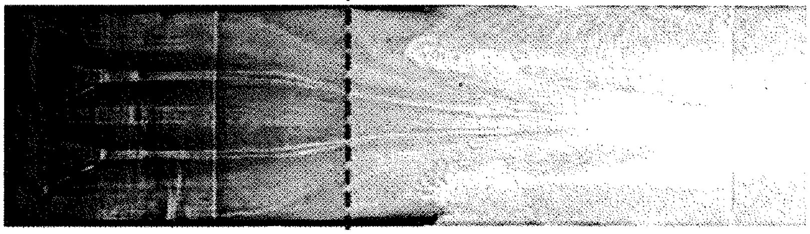
Figure 24D:
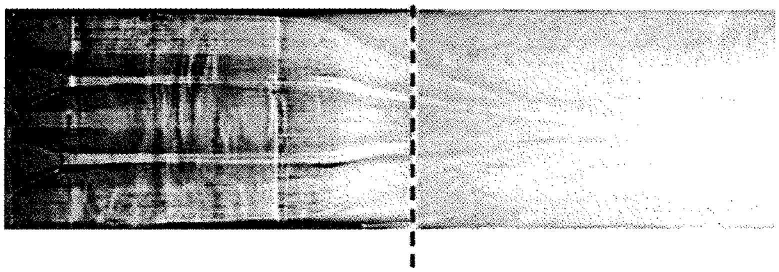
Figure 25A:
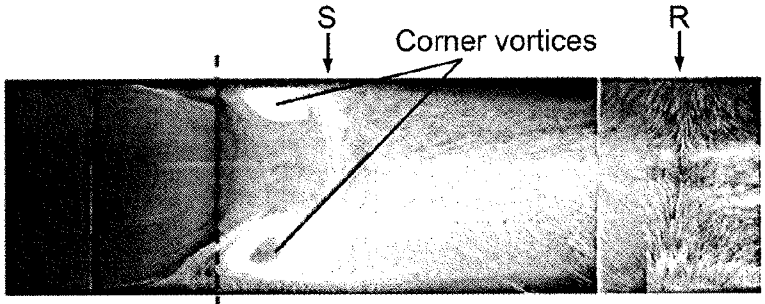
FIG. 25 is oil flow visualization of base line no-control case (a), and 3 mm split-ramps at 15 δ (b), 25 δ (c), 35 δ (d), upstream of the shock location.
Figure 25B:
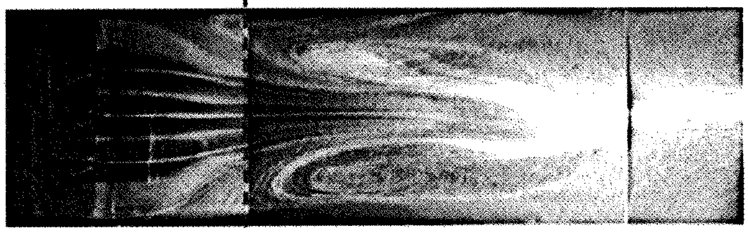
Figure 25C:
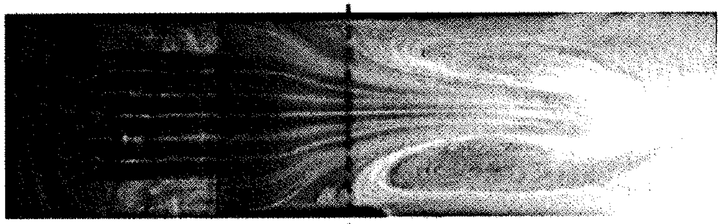
Figure 25D:
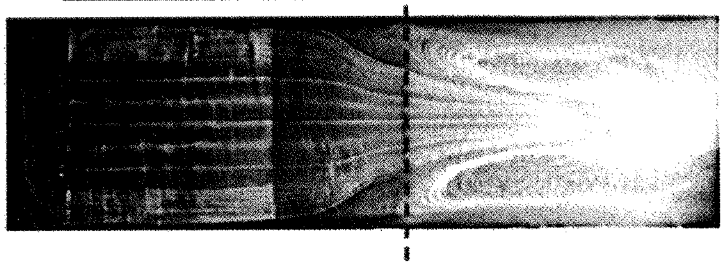
Figures 26A, 26B, 26C, 26D:
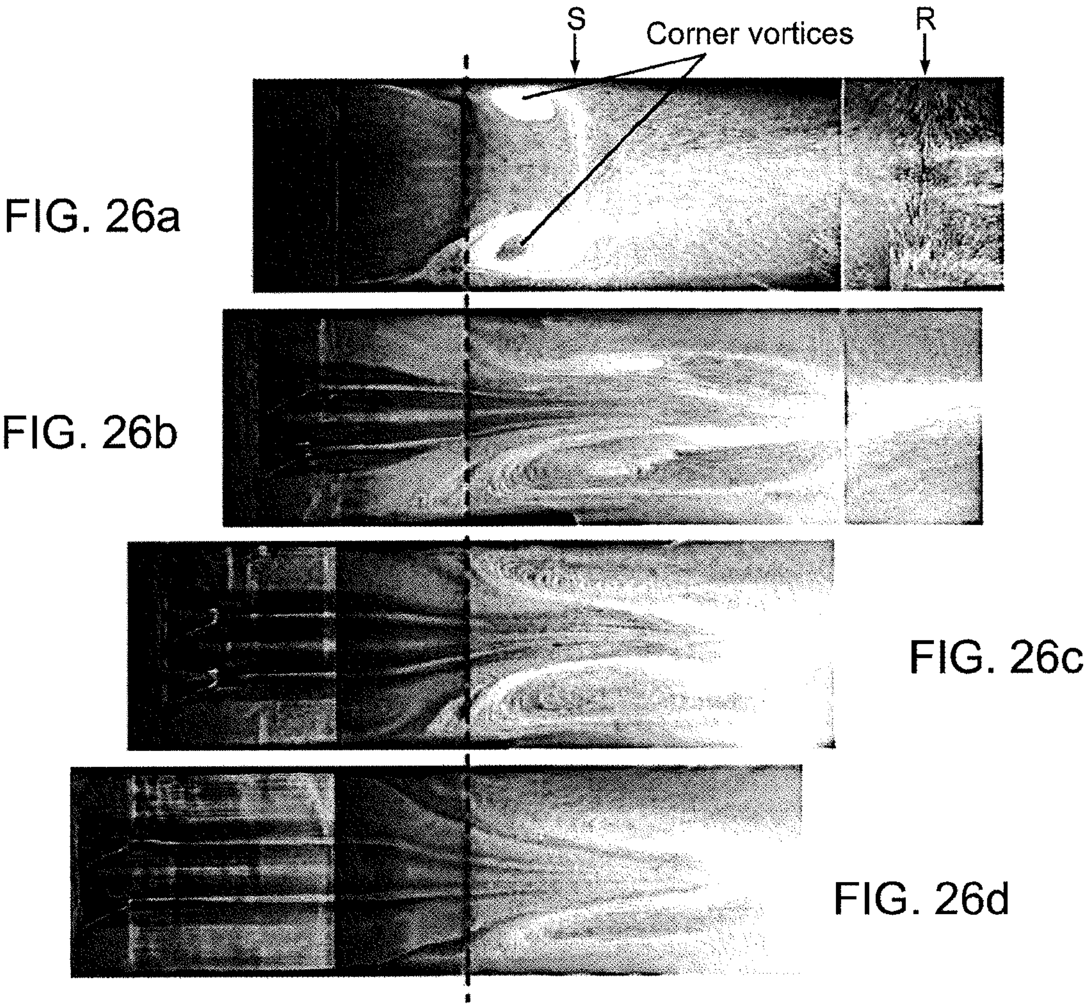
FIG. 26 is oil flow visualization of base line no-control case (a), and 4 mm split-ramps at 15 δ (b), 25 δ (c), 35 δ (d), upstream of the shock location.

Referring to FIGS. 22-24, the overall effect of the vortex generators on the near-wall flowfield can be investigated with surface flow visualization. FIGS. 22-24 shows oil flow visualization for the ramped-vane cases. FIGS. 24-26 shows oil flow visualization for the split-ramp cases. The oil distribution provides insight into near-wall flow direction, shear strength, and separation/re-attachment regions. For ease of comparison, each figure is arranged to show the no-control baseline adjacent to all three streamwise locations, in order of increasing distance upstream of the normal shock, of a given device type and height. The baseline flow exhibits a distinct lack of spanwise symmetry with one corner flow dominating, and significant centerline flow separation within the diffuser. This is indicated by a large region of reverse flow between the separation and re-attachment markers in the baseline oil flow figures.

These undesirable features are mitigated to various degrees by the presence of vortex generators. FIG. 22 shows the effects of 2 mm ramped-vanes. At all device placement locations the centerline separation of the baseline flow field is eliminated but the resulting attached flow is constricted by the corner vortices. These corner vortices become larger and more diffuse, but one continues to dominate as in the baseline case. There is no clear impact of device distance from the normal shock on the oil flow results. As the device size is increased to 3 mm as shown in FIG. 23, the corner interaction becomes even more diffuse. Device distance plays an increased role as the flowfield becomes symmetric for the 25 δ and 35 δ device locations but one corner effect continues to dominate for the 15 δ location. Only at the 15 d location do the corner vortices continue to exhibit a clear center of circulation. The corner vortex is not necessarily eliminated; rather, this behavior may be indicative of a highly unsteady corner interaction which only appears uniform and steady in the temporally averaged oil flow. The same trends are evident as the device size is increased to 4 mm as shown in FIG. 24. The flow field is again symmetric and the corner vortices have clear centers of circulation only when the devices are placed at the 15 δ location.

FIG. 25 shows the effect of 3 mm split-ramps. The centerline separation is initially eliminated as in the corresponding ramped-vane case but the pooling of oil near the centerline farther downstream indicates that centerline flow separation in the diffuser may simply be delayed. The corner effects become larger and more diffuse but not fully symmetric. A center of circulation is still visible in each case. An increase to 4 mm split-ramps, illustrated in FIG. 26, shows a slight improvement in flowfield symmetry and more diffuse corner vortices with no clear center of circulation for the 25 δ and 35 δ device locations. Device distance from the shock has no clear effect on the flow field for either the 3 mm or 4 mm split-ramps. The impact both types of vortex generator have on the flow are attributable to transfer of higher momentum fluid from within the boundary layer into the near-wall region by the vortex pairs generated downstream of the devices. This results in a fuller boundary layer which is better able to resist separation from the adverse pressure gradient present in the diffuser.

C. Pressure Measurements

Performance benefits of the vortex generators as seen near the diffuser outflow were investigated with measurements of pressure recovery, the ratio of local to freestream stagnation pressure, which is an important performance parameter for inlet design. These pressure measurements were performed along the tunnel centerline and only for the middle streamwise position, 25 δ upstream of the normal shock, for each device type.

Figure 27A:
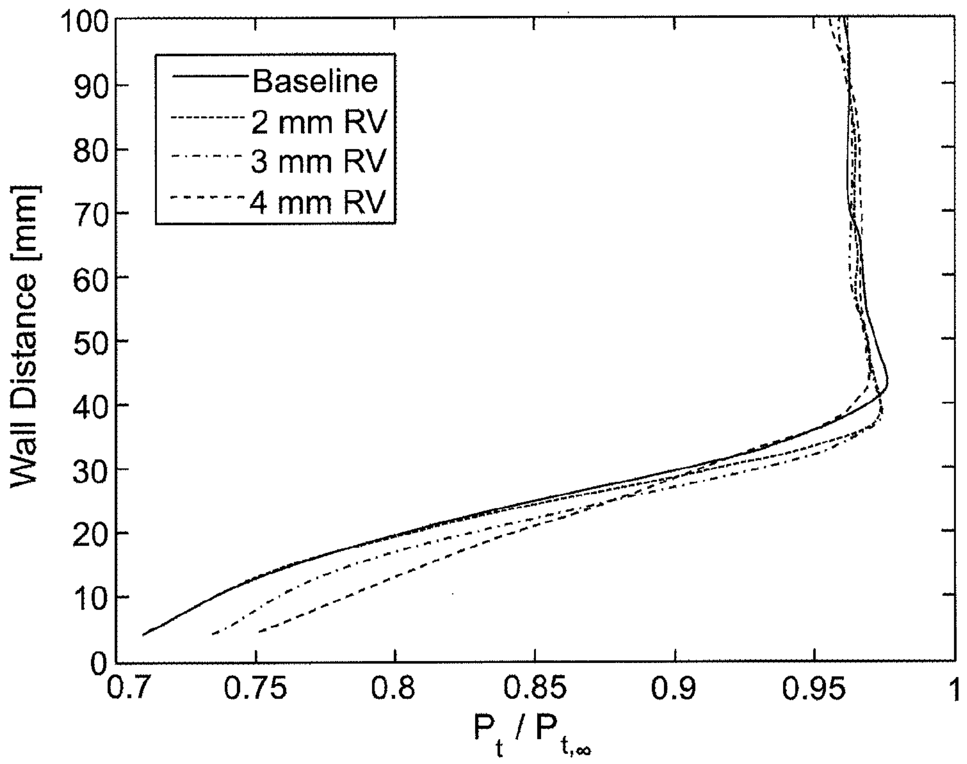
FIG. 27 is normalized stagnation pressure profiles measured ~100 δ downstream of devices located 25 δ upstream of the shock for (a) ramped-vanes, and (b) split-ramps.
Figure 27B:
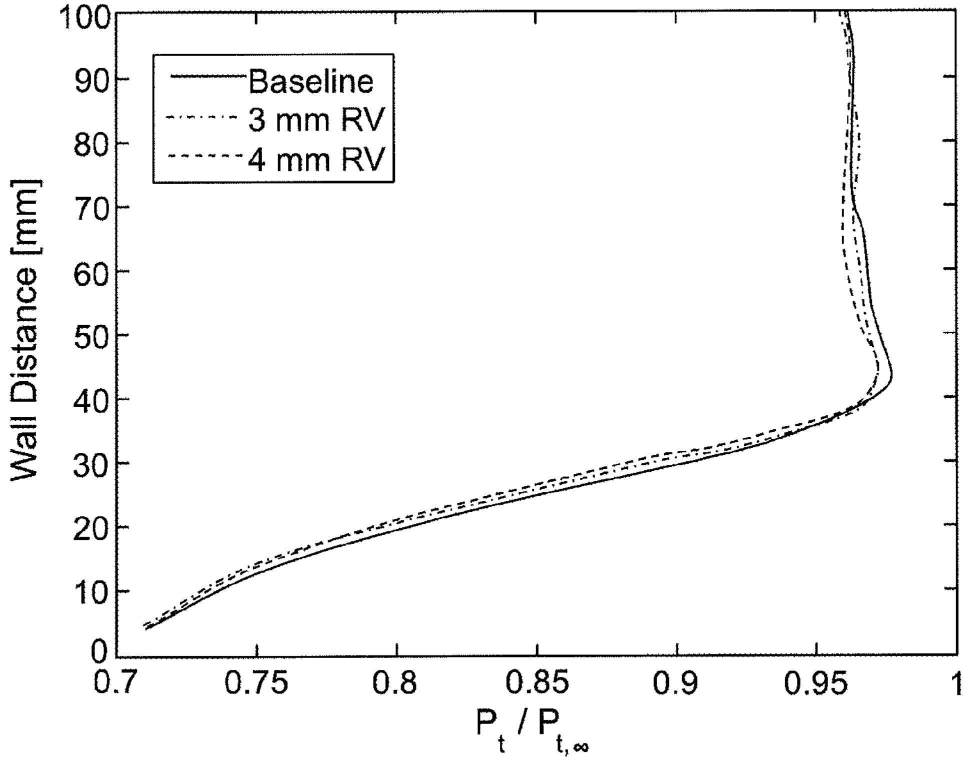

FIG. 27 shows stagnation pressure curves normalized by the freestream value for the baseline and vortex generator cases are displayed in. The trends are consistent with the oil flow results, with ramped-vanes yielding fuller boundary layer profiles and improved pressure recovery. Specifically, the 4 mm ramped-vanes yield the largest pressure recovery improvement in the range of 0-30 mm from the wall as compared to the baseline case. However, whereas the 4 mm ramped-vane curve rejoins the baseline at around 30 mm from the wall, the 3 mm ramped-vane curve consistently outperforms the baseline throughout the boundary layer profile. The mid-range device appears to strike a balance between competing flow phenomena—transfer of high-momentum fluid to the near-wall region and that of lowmomentum wake flow farther away from the wall. In doing so, it retains much of the near-wall performance improvement of the larger device while its smaller wake does not adversely affect the outer portion of the boundary layer. It thus has a uniformly positive effect on pressure recovery within the entire boundary layer profile. Splitramps, though they do have local flowfield effects and reduce spanwise separation within the diffuser, do not appreciably alter the pressure recovery.

D. Boundary Layer Parameters

Figure 28A:
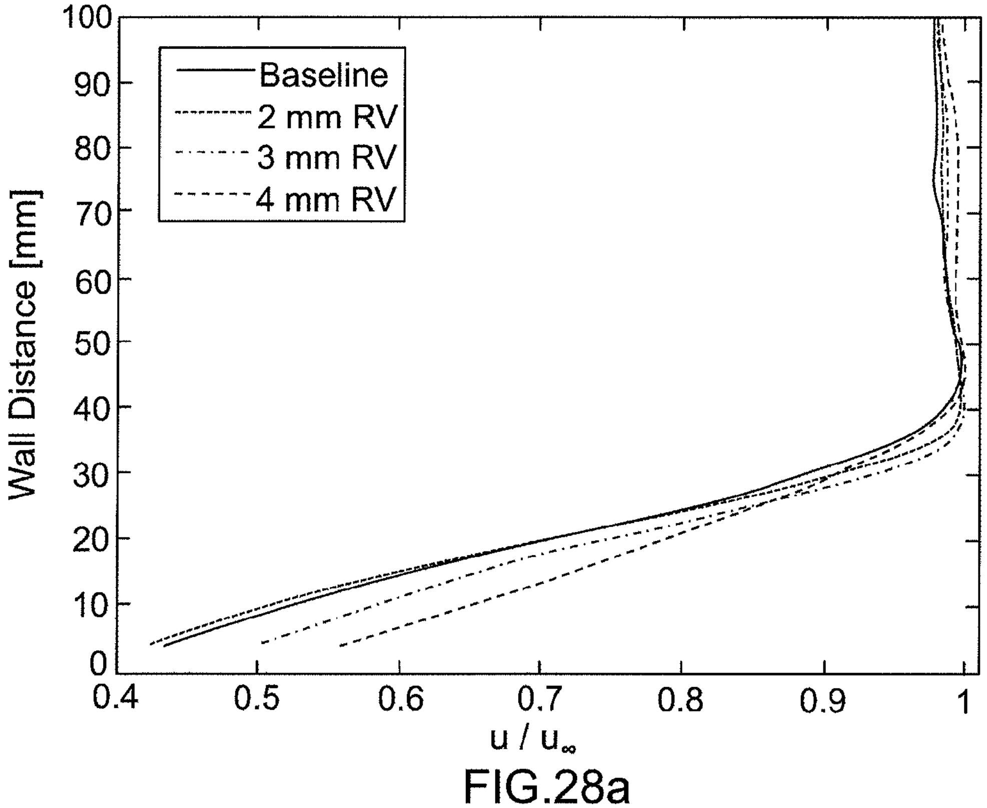
FIG. 28 shows normalized velocity profiles computed stagnation pressure data collected ~100 δ downstream of devices located 25 δ upstream of the shock for (a) ramped-vanes, and (b) split-ramps.
Figure 28B:
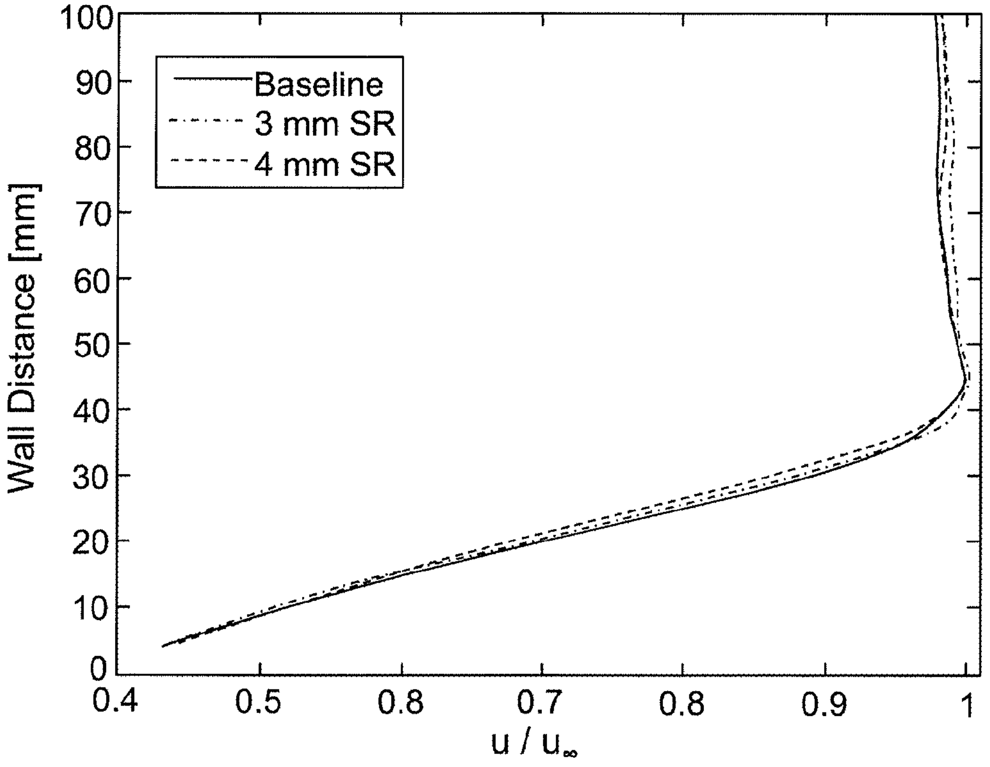

Using isentropic flow relations, inflow stagnation properties, and the static and stagnation pressure measurements obtained from the flow field the streamwise velocity at the pitot rake location can be computed. FIG. 28 shows normalized streamwise velocity profiles for the baseline and vortex generator cases. Due to slight variation in freestream velocity between the different cases, the freestream velocity used for normalization was extracted for each case individually rather than using a global value. The boundary layer velocity profiles in FIG. 28 can be seen to generally mimic the behavior of pressure recovery curves in FIG. 27 relative to the baseline case. Ramped-vanes again yield a fuller near-wall profile and split-ramps cause minimal deviation from the baseline. The primary utility of computing the streamwise velocity profiles, however, is in calculating the boundary layer displacement thickness, δ*, momentum thickness, θ, and the shape factor, H. Shape factor, which is the ratio of displacement thickness and momentum thickness for a given boundary layer, is a measure of flow distortion in the normal direction. It is a good single indicator of flow control effectiveness since it is sensitive to changes in the boundary layer profile resulting from transfer of high-momentum fluid to the near-wall region as well as the resulting low-energy wake. Low values of shape factor indicate a healthy boundary layer able to withstand separation due to adverse pressure gradients while high values are indicative of impending separation. Values of δ*, θ, and H are shown in Table 1 for all cases for which pressure measurements were made, i.e. all device types and heights but only at the 25 δ location. Shape factors for the 2 mm ramped-vanes and both 3 mm and 4 mm split-ramps are very close to the baseline value of 1.52, with deviation towards larger values of shape factor, indicating a marginally negative impact on the flowfield. Values for 3 mm and 4 mm ramped-vanes, however, at 1.45 and 1.31, respectively, are significantly lower than the baseline and indicate an improvement in boundary layer health consistent with the trends seen in FIGS. 27 and 28.

E. Shock Stability

Figure 29A:
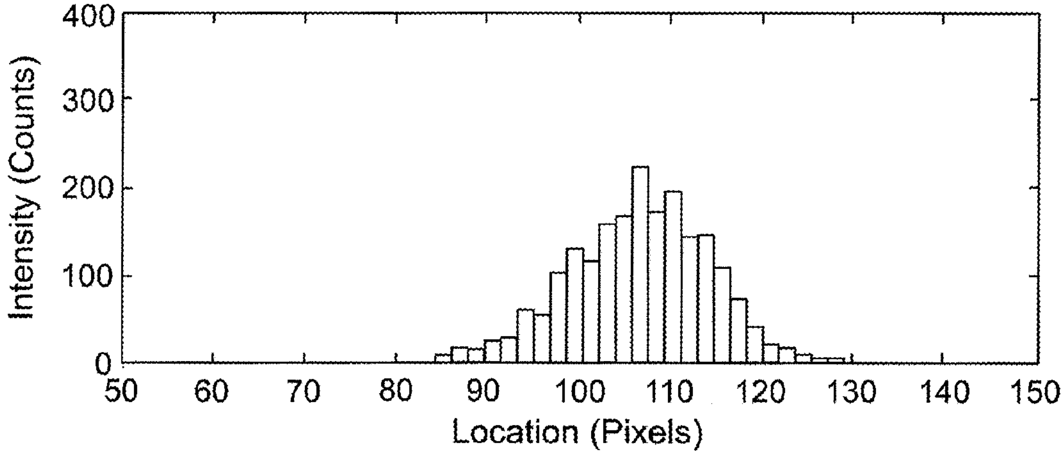
FIG. 29 shows Histogram of shock position obtained from 2000 fps Schlieren video for a) baseline no-control case (standard deviation=7.37), b) 4 mm ramped vanes 25 δ upstream of the shock (standard deviation=5.95), and c) 3 mm split-ramps 35 δ upstream of the shock (standard deviation=6.85)
Figure 29B:
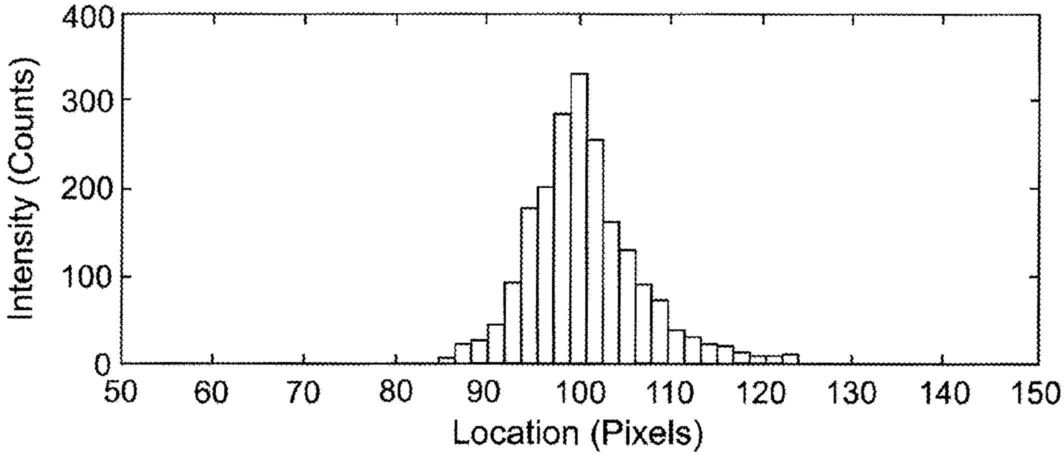
Figure 29C:
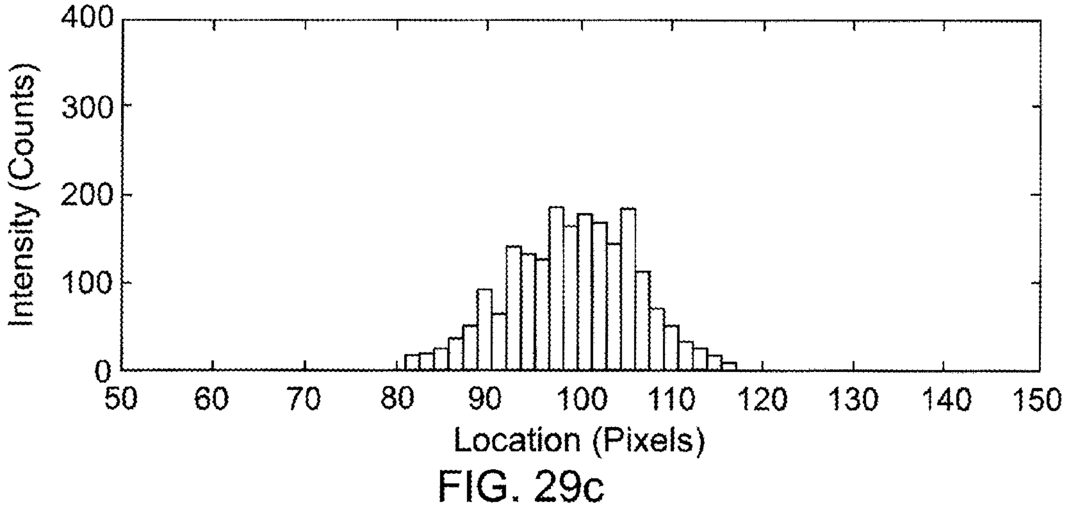

FIG. 29 shows Histograms of shock position obtained through a frame-by-frame processing method for three selected cases: the baseline flowfield and the best performing, in terms of shock position standard deviation, ramped-vanes (4 mm at 25 δ) and split-ramps (3 mm at 35 δ). The frame-by-frame processing of the high speed Schlieren video using a MATLAB™ script allowed the fluctuating shock position to be tracked over the course of a tunnel run. The more compact histogram of shock position and corresponding reduced standard deviation indicate that shock position fluctuations in the streamwise direction were reduced by the presence of the VG arrays, for these cases, as compared to the baseline flow. This improvement in shock stability may indicate a favorable impact of vortex pairs generated by the devices on the shock wave/boundary layer interaction, likely through the reduction of separation area downstream of the shock.

Table 4 provides a summary of standard deviation from the mean shock position for all ramped-vane (RV) and split-ramp (SR) cases tested, and the no-control (NC) baseline.

TABLE 4

| VG | h | 15 δ | 25 δ | 35 δ |
|---|---|---|---|---|
| NC | — | 7.37 | 7.37 | 7.37 |
| RV | 2 mm | 6.96 | 8.40 | 7.10 |
| RV | 3 mm | 7.10 | 8.81 | 7.34 |
| RV | 4 mm | 8.34 | 5.95 | 7.77 |
| SR | 3 mm | 8.23 | 8.41 | 6.85 |
| SR | 4 mm | 9.12 | 11.00 | 7.01 |

Tests were conducted with a freestream Mach number of 1.4. Flow diagnostics performed include high-speed Schlieren video, surface oil flow visualization, and pressure rake measurements.

The trend for ramped-vanes was not consistent for all device heights, as the shock position is most stable for the 15 δ and 35 δ positions and least stable for the 25 δ position with 2 mm and 3 mm devices, whereas the opposite trend is true for the 4 mm devices. The best shock stability in this particular experiment was given by the 4 mm ramped-vanes located 25 δ upstream of the normal shock while both 15 δ and 35 δ placement of the same devices yields shock oscillation greater than the baseline. Split-ramp results feature a more consistent trend for all device heights with shock stability lower than the baseline at the 15 δ and 25 δ position but improved beyond the baseline value at the 35 δ position. This indicates that split-ramps may have the best impact on shock stability when placed relatively far upstream of the normal shock.

In general, the flow control methods tested yielded measurable improvements to several important aspects of the flowfield relative to the no-control baseline. Specifically, ramped-vanes were found to perform better than splitramps. Ramped-vanes eliminated centerline separation present in the baseline flow, yielded fuller boundary layer velocity profiles and improved pressure recovery, lower values of shape factor, and improved shock stability for several cases. In contrast, split-ramps significantly reduced centerline separation but did not eliminate it completely along the centerline, yielded boundary layer velocity profiles and pressure recovery consistent with the baseline, and slightly higher values of shape factor. However, split-ramps did consistently improve shock stability when placed at the far upstream location. The devices tested, specifically ramped-vanes with height between 60% and 80% of the incoming boundary layer thickness, show promise in flow control of an inlet-analogue flowfield.

Referring to FIGS. 30*a-e*, a plurality of micro vortex generators are illustrated, wherein the ramp elements are orientation and spaced differently. FIG. 30*a* shows a ramp (R2). FIG. 30*b* shows a split-ramp (SR2). FIG. 30*c* shows a ramped-vane (RV2, RV2U and RV3). FIG. 30*d* shows a ramped-vane with larger spacing (RV1). FIG. 30*e* shows a ramped-vane with 50% size increase (RV1B). Table 5 provides definitions of acronyms for vortex generator configurations and their dimensions as follows:

TABLE 5

| | Definitions of acronyms for micro vortex generator configurations | h/δ | $g_{LE}$ | $g_{TE}$ |
|---|---|---|---|---|
| NR | No flow control device, i.e., solid flat wall | n/a | n/a | n/a |
| R2 | Two side-by-side ramps | 0.34 | 1.64 h | n/a |
| SR2 | Two side-by-side split-ramps | 0.34 | 0.14 h | n/a |
| RV2 | Two side-by-side ramped-vanes | 0.34 | 0.14 h | 1.5 h |
| RV2U | Same as RV2 but placed 1 chord | 0.34 | 0.14 h | 1.5 h |

TABLE 5-continued

| | Definitions of acronyms for micro vortex generator configurations | h/δ | $g_{LE}$ | $g_{TE}$ |
|---|---|---|---|---|
| | ($2.3\ \delta_{ref}$) upstream | | | |
| RV3 | Same as RV2 but 33% smaller with three spanwise devices | 0.23 | 0.14 h | 1.5 h |
| RV1 | Same as RV2 but with wider gap and one spanwise device | 0.34 | 4.57 h | 4.57 h |
| RV1 B | Same as RV1 but 50% larger and a reduced interior gap | 0.52 | 1.64 h | 2.5 h |

Figure 30:
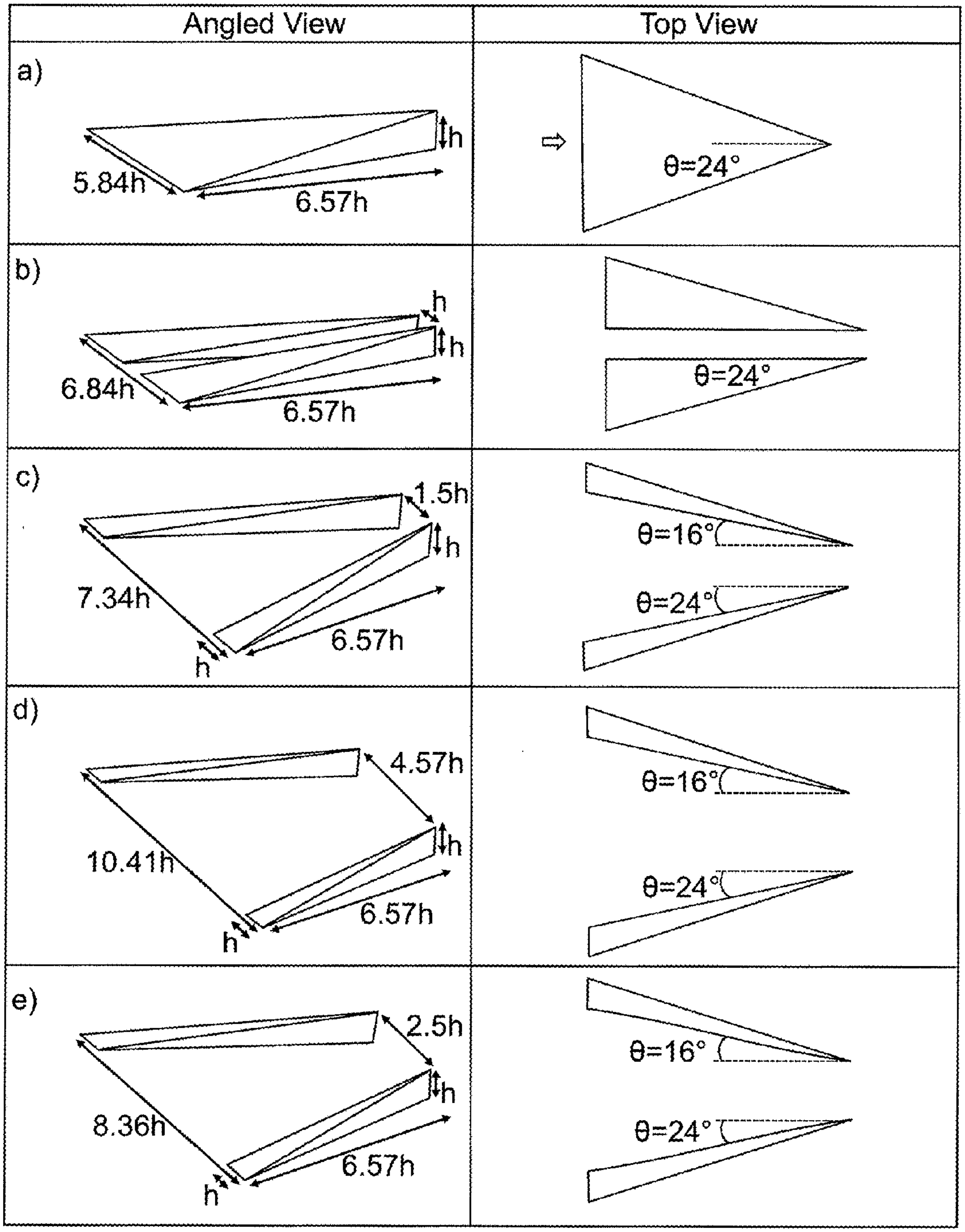
FIGS. 30*a-f* shows alternate form of various configurations of vortex generators according to the teachings of the present disclosure.
Figure 30F:
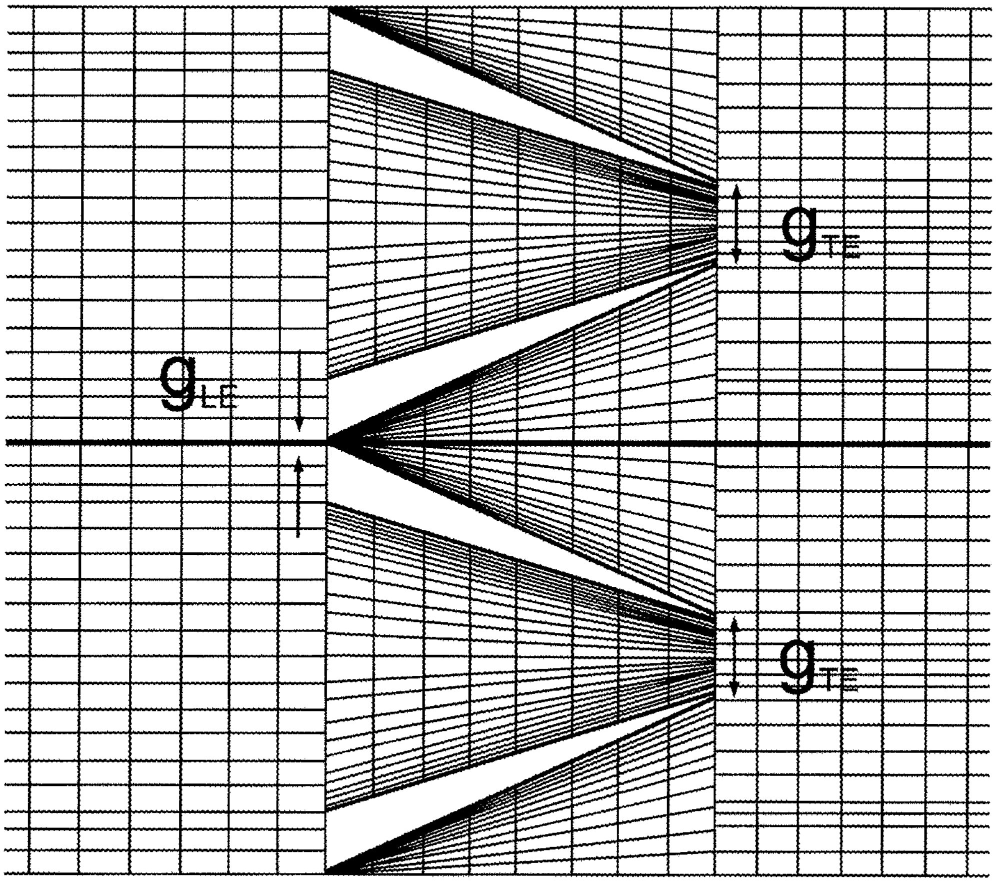

As shown in FIG. 30*f*, this spacing or gap and the leading edge (LE) and trailing edge (TE) can be varied to improve the performance of the micro vortex generators according to the teachings of the present disclosure.

Table 6 summarizes the spanwise averaged performance parameters for the different micro vortex generators in Table 5 as follows:

TABLE 6

| | R2 | SR2 | RV2 | RV2U | RV3 | RV1 | RV1B |
|---|---|---|---|---|---|---|---|
| $\alpha/\alpha_{NR}$ | 1.00 | 1.00 | 1.00 | 1.00 | 1.00 | 1.00 | 1.00 |
| $\delta^*/\delta_{NR}^*$ | 1.07 | 1.18 | 1.09 | 1.15 | 1.36 | 1.10 | 1.02 |
| $H/H_{NR}$ | 1.04 | 1.08 | 1.05 | 1.05 | 1.12 | 1.01 | 0.97 |
| $A/A_{NR}$ | 0.77 | 0.73 | 0.79 | 0.84 | 0.85 | 0.73 | 0.75 |
| $K/K_{NR}$ | 1.10 | 1.04 | 0.80 | 0.76 | 1.23 | 0.97 | 0.74 |
| $P_{RMS}/P_{RMS,\,R}$ | 1.01 | 1.15 | 0.73 | 0.73 | 1.37 | 0.94 | 0.59 |

FIG. 31 shows the overall dimensions of the domain where its total length is 24 L, where L is the diffuser height at the throat. The upstream distance of 12 L before the diffuser was fixed to develop a thick enough boundary layer that would be approximately 10% of the diffuser throat height. Thinner boundary layer would require more grid points in the transverse direction near the wall to resolve the smaller eddies such that the boundary layer thickness was increased for computational efficiency.

The Reynolds number based on the boundary layer thickness at the diffuser throat was 4.55×105. The diffuser is a straight line segment (discontinuous in slope with the adjacent segments) with a downturn of 5° and the measuring plane (MP) is 2.51 L downstream of the throat. A thin splitter plate was placed as the ceiling of the diffuser which is 1 L above the wall at the throat that extends downstream to the outflow plane to help maintain a steady shock position. The grid resolution is Δx+=40 and Δy+=1 (first grid point off the wall) with a stretching ratio of r=1.15 in the streamwise and transverse, respectively.

Referring to FIG. 32, three different diffuser heights of 1.15 L, 1.20 L and 1.25 L were investigated and the predicted Mach contours are shown with an incoming freestream Mach number of 1.4. The boundary layer thickness at the measuring plane increases with larger diffuser height due to increased adverse pressure gradient where the regions of low momentum fluid extend further downstream for the largest case in FIG. 31*c*. Referring to FIG. 33, comparisons of Mach profiles at the measuring plane clearly show the growing boundary layer thickness with respect to the increasing diffuser height, where its thickness is approximately 80% of the diffuser height in the largest diffuser (1.5 L) case. FIG. 33 also shows effects of Mach number. It can be seen that that decreasing the Mach number to 1.3 (and thus decreasing the shock strength) yields a thinner boundary layer. From these studies, the case of a 1.2 L diffuser with an incoming freestream Mach number of 1.3 was chosen as the baseline since it included a diffuser/throat ratio similar to an external compression inlets while maintaining a thinner boundary layer compared to the previous test cases.

Figure 35:
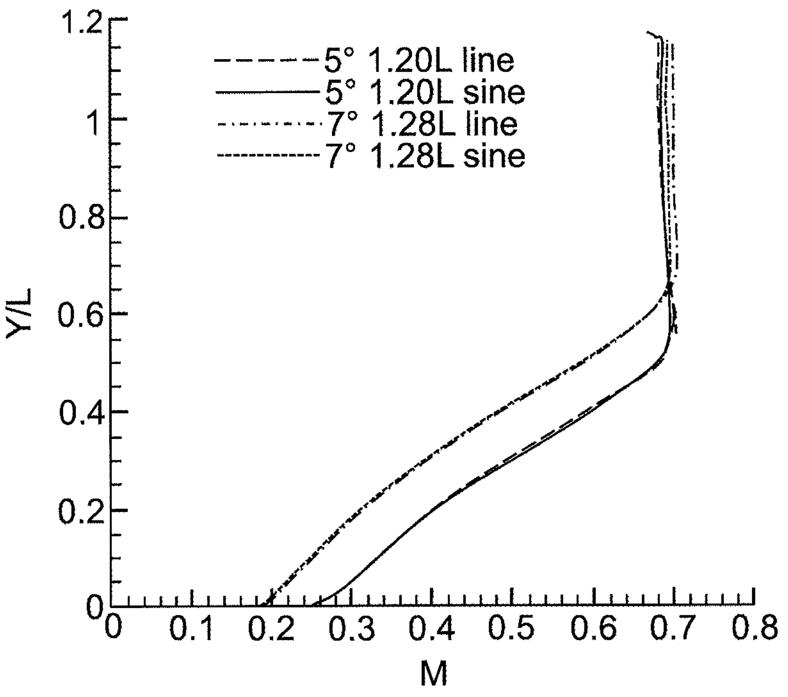
FIG. 35 shows Mach profiles at the measuring plane for different slope and shapes.

Referring to FIG. 34, the impact of the average diffuser angle and its profile shape were investigated. Referring to FIG. 35, increasing the slope from 5° to 7° increases the flow separation area (shown in blue) and a slight increase in the maximum Mach number and a thicker boundary layer. Changing from a sine-wave profile to a simple linear (constant slope) profile for the diffuser shape had a minimal effect on the Mach profiles (FIG. 35). However, the former was selected as the baseline shape. The diffuser geometry was selected as: 1.2 L height, sine function for profile shape, average slope angle of 5°, and at freestream incoming Mach number of 1.3.

Figure 36A:
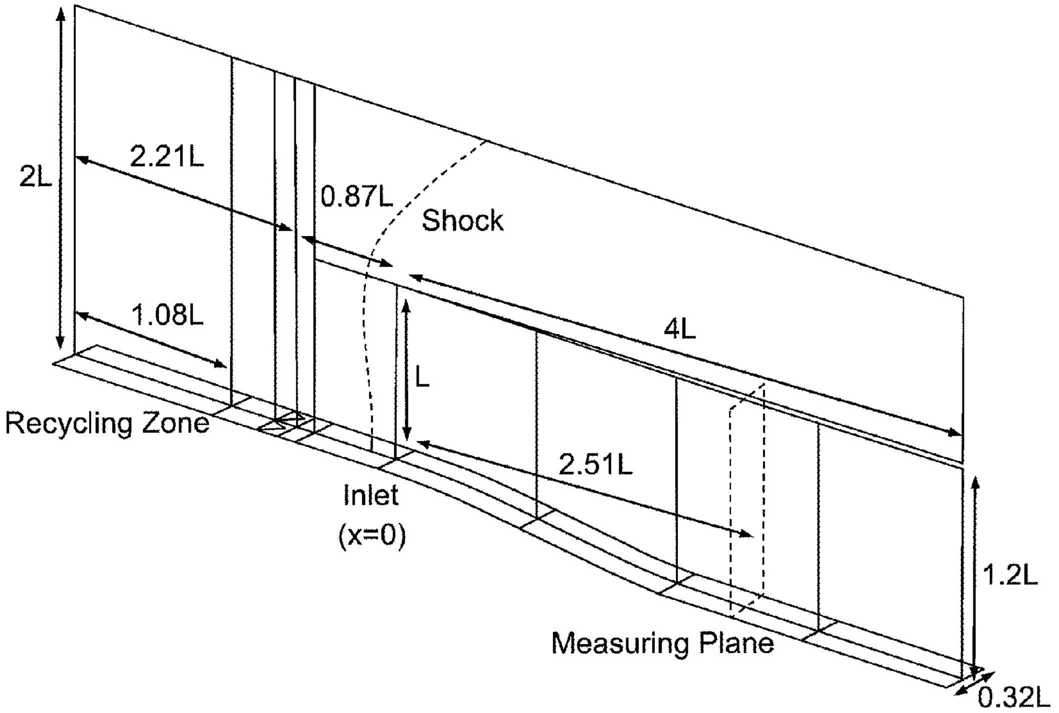
FIG. 36 is a schematic view of a) the computational domain for large eddy simulation is shown which begins with the recycling zone and the micro VGs are placed upstream of the shock, which sits in front of the inlet splitter plate (at x=0), b) streamwise view of the LES grid.
Figure 36B:
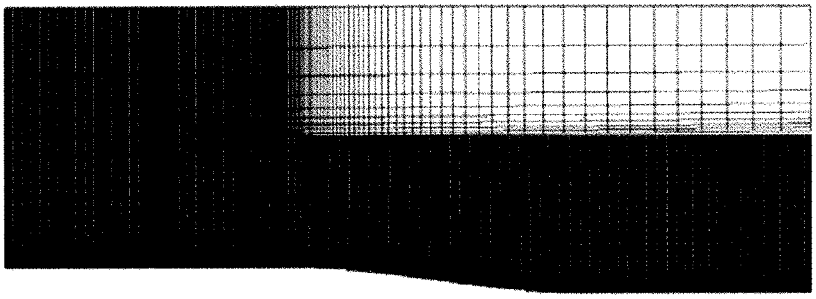

Referring to FIG. 36*a*, the upstream section employs a recycling zone which generates the incoming turbulent boundary layer. The length of the recycling zone is 1.08 L, which provides sufficient distance of 3000 in wall units between the inlet station and the recycling station. The height of the recycling zone is 2 L and the width, 0.32 L, whether the latter is needed to develop a reasonable turbulent boundary layer (Urbin & Knight 1999, 2001). The recycling zone is placed 2 L upstream of the diffuser inlet (throat) in order for the turbulent boundary layer thickness to grow to 10% of the inlet height. In addition, 2 L length provides sufficient space to include the flow control devices where, depending on the size of the device, one to three micro-vortex generators can be placed in a spanwise array. The trailing edge position of a device is generally set at 0.87 L upstream of the diffuser inlet, which is approximately 8.8 $\delta_{ref}$ (0.51 L) upstream of the normal shock position. Note that the reference boundary layer thickness ($\delta_{ref}$) is measured at 0.87 L upstream of the diffuser inlet for a clean tunnel (no device). The shock position is generally set at 3.8 $\delta_{ref}$ (0.22 L) upstream of the diffuser inlet by adjusting the diffuser back pressure. The measuring plane (MP) is located 2.51 L downstream of the diffuser inlet, consistent with the RANS cases, and the outflow plane is 1.49 L further downstream, making the total length of the diffuser and the splitter plate equal to 4 L.

Figure 37A:
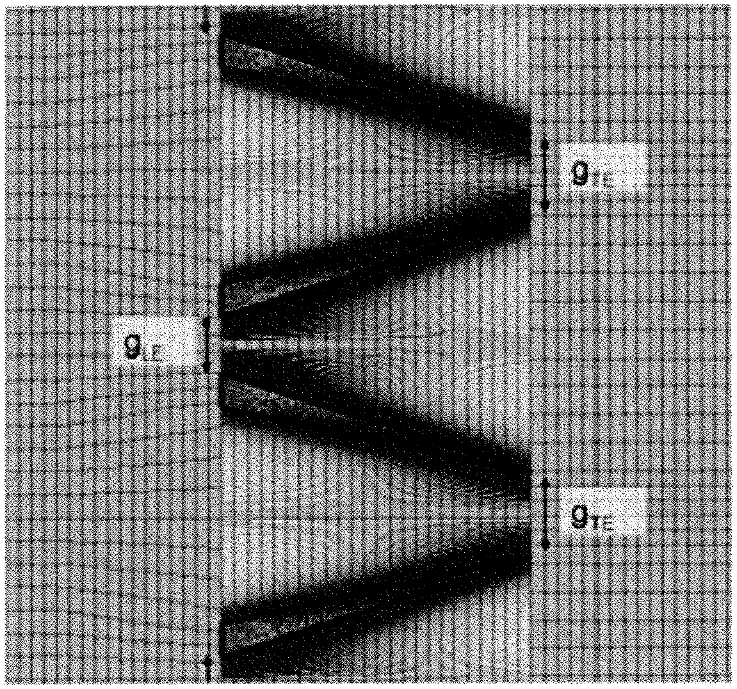
FIG. 37 shows computational grid near a micro-ramped vane: a) top view indicating the leading edge gap ($g_{LE}$) and trailing edge gap ($g_{TE}$) and b) side view.
Figure 37B:
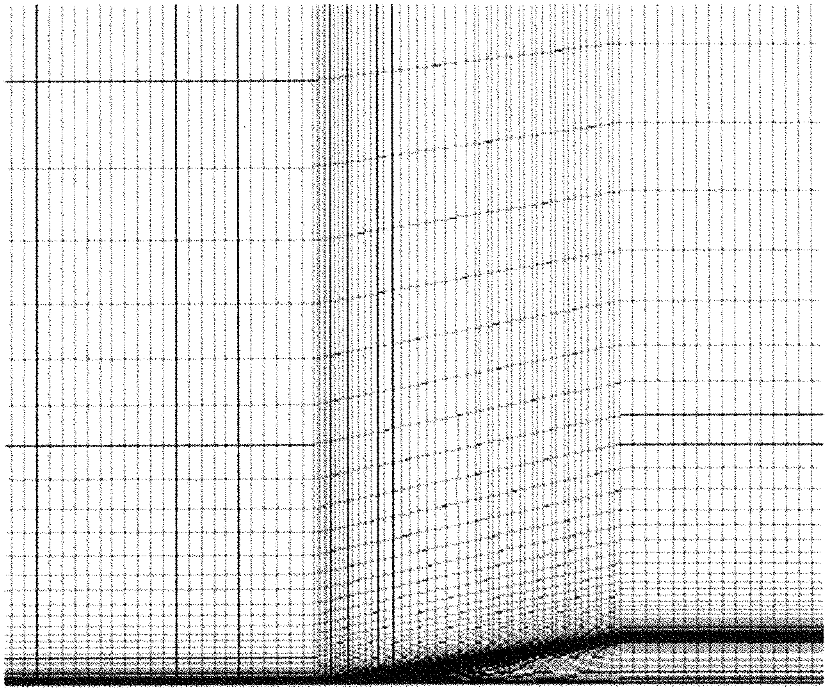

Periodic boundary conditions were used on the side walls to emulate an infinite spanwise array of flow control devices and planar diffuser. FIGS. 37*a* and 37*b* show grid topology for a two ramped-vane case with a top and a side view where the grid points are compressed near the surface of the device to maintain the y+=1 condition. This is later relaxed to the original spacing a few chord downstream of the device.

Referring to FIG. 30, various micro-ramp (R2) with a height of h is shown. The suffix in this device naming refers to the number of device present in the domain (i.e. R2 has two spanwise devices in the computational domain). The split ramp (SR2), shown in FIG. 30*b*, is simply separated the two halves of a conventional ramp by one ramp height. The "ramped-vane" (RV) is an angled variation of the split-ramp and incorporated a leading edge width for each wing equal to the device height. Several RV cases were considered. The RV2 case (FIG. 30*c*) is the baseline version and has the same chord length and height as R2 and SR2 but the gap is increased by 0.5 h to improve the flow between the wings. For R2, SR2 and RV2, the height is approximately 0.35 $\delta_{ref}$. A variation on these was the RV2U for which the streamwise position is moved upstream by 1 chord length (2.3 $\delta_{ref}$) to investigate the distance effect respective to the normal shock. The impact of size effect is also studied by reducing the height to 0.23 $\delta_{ref}$ (33% reduction) which allows three devices to fit in the domain and thus called RV3. The devices described above all have the same spacing from the centerline of one device to the next which is 7.5 h. In the next two designs, lateral spacing between the adjacent devices and their interior gap, as well as their height are varied in efforts to maximize the development of the vortex pairs with minimal losses. In particular, RV1 (shown in FIG. 30*d*) has an interior gap of 4.57 h at the trailing edge and 15 h spanwise spacing. RV1B is a similar concept to RV1 but the height is increased by 50% (0.52 $\delta_{ref}$) which restricted the interior gap to 2.5 h while the lateral spacing is 10 h.

In order to conduct numerical studies on the various designs of micro-vortex generators in Table 5 in a reasonable time, a course grid (CG) was employed. This study was intended to select the optimal device in an efficient manner. The course grid (CG) spacing in the streamwise direction was increased two times that of the baseline grid (Δx+=28, Δz+=6.5 and Δy+=1 (first grid point off the wall) with a stretching ratio of r=1.15) and the spanwise spacing is expanded by four times while keeping the transverse spacing the same; Δx+=56, Δz+=26 and Δy+=1 (first grid point off the wall) with the same stretching ratio of r=1.15. To investigate the equilibrium of the incoming boundary layer with this grid, the mean streamwise velocity and the streamwise Reynolds stress profiles are compared with the baseline grid results, shown in FIGS. 31*a* and 31*b*, respectively. As expected, the mean streamwise velocity profile for the CG case over-predicted the U+ at the boundary layer edge, i.e. under-predicted the wall shear stress when compared to the baseline grid and DNS solutions. Furthermore, the turbulent structures predicted with the CG yielded an over-prediction of the Reynolds stress profile. However, the 8-fold speed-up allowed by the CG was important to investigate all the cases of Table 5 in a reasonable amount of time.

Figure 39:
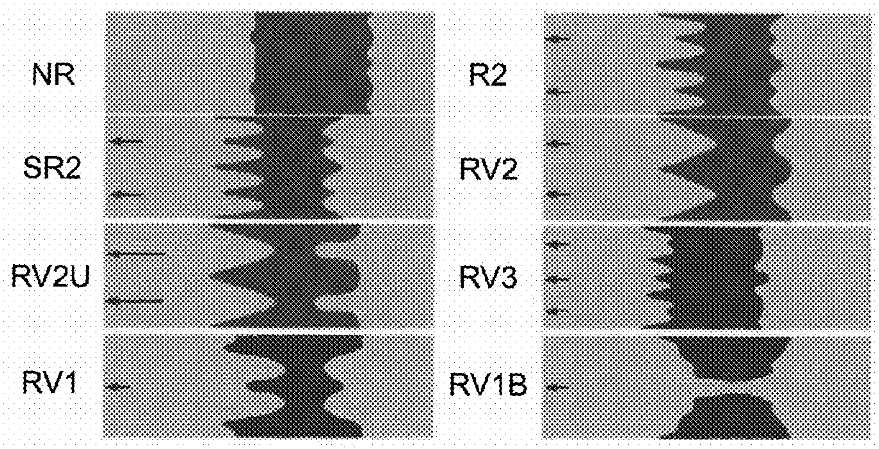
FIG. 39 shows time-averaged spandwise CG LES in the vicinity of the normal shock (x=−14.9 $\delta_{ref}$ to 2.1 $\delta_{ref}$) showing flow separation (negative wall shear stress) as the dark regions.

FIG. 39 shows the flow separation regions induced by the normal shock for the solid wall case with no ramp (NR) and various types of μVGs. Reductions in the separation area are evident in comparison to NR for all devices. However, the local streamwise separation length varied in the spanwise direction significantly. Generally, the streamwise vorticity yields downwash in certain regions which help reduce the flow separation just outboard of the devices where this impact is seen more in the upstream part of the separation bubble than in the downstream part. It is interesting that the micro-ramp and split-ramp cases (R2 and SR2) exhibit quite similar flow separation topologies. In particular, it can be seen that a longer separation length occurred just downstream of the device centerline (shown by the red arrows). This may be attributed to wake effects and upwash. In contrast, the rampedvane cases (except RV1) showed a reduced separation length downstream of the device centerline. This indicates that the jet of flow between the device wings help counteract the deleterious wake and upwash effects.

To investigate the effect of device streamwise location with respect to the shock interaction, one may compare RV2 and RV2U. These two cases do not show a strong difference, although the upstream case tends to produce a pattern that is more three-dimensional while the downstream case has a smaller separation area (quantified in Table 6). This indicates that the streamwise location has only a minor impact of flow control.

In an effort to further reduce the flow separation, especially downstream of the leading edge gap, multiple smaller ramped-vanes were placed by reducing their size by 33% (h=0.23 δ allowing three devices; RV3). However, the resulting impact by the smaller device weakened the three dimensional pattern of the flow separation, though still better than the NR case. The larger ramped-vane (h=0.34 δ) in the previous case yielded better flow control than these smaller devices. Since the jet effects from the gap at the trailing edge of the ramped-vanes was found to be beneficial, a case with an increased trailing edge gap (4.57 h) was studied to see whether this led to further reductions in flow separation.

Comparing RV2 and RV1, the flow penetration reduces the overall separation region downstream of the device centerline as was desired. However, the separation length still persisted at the device centerline indicating that the extended trailing edge gap ($g_{TE}$=4.57 h) was excessive.

Yet another case was developed in the present experiments, namely, RV1B. This particular device had a larger size (δ/h=0.52), and a wide trailing edge gap ($g_{TE}$=2.5 h) but with a moderate leading edge gap ($g_{LE}$=1.5 h) which is shown in Table 5. Fully attached flow downstream of the device centerline and reasonable separation length downstream of the leading edge gap was achieved. However the separation length downstream of the leading edge gap extended much further than NR increasing the total area of separation where RV1B resulted in a significant reduction. The fully attached flow through the separated region is important since they limit the separation bubble movement which contributes to the stability of the shock position.

Figure 40:
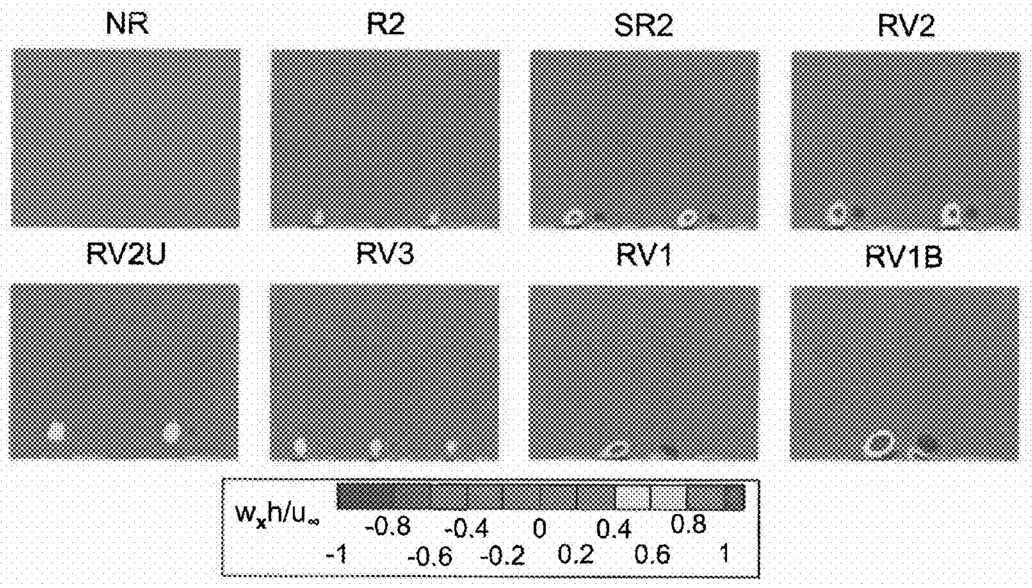
FIG. 40 shows spanwise view of streamwise vorticity at x=−12.3 $\delta_{ref}$ (just upstream of the shock interaction) based on time-averaged CG LES results for various devices.

FIG. 40 shows cross-cut views of the streamwise vorticity at x=5 h, where the primary core strengths can be easily compared. A significant difference in the vorticity strength can be observed between R2 and SR2 where the latter allows stronger vortices. In both cases, vortices are developed via flow spilling over the two sweep edges similar to a backward facing step. However, in the SR2 case, the increased gap distance allows the vortices to maintain their integrity and strength for longer periods. For the ramped vanes, the increased entrance width at the leading edge allows increased flow towards the device which creates a stronger vortex. The vorticity magnitude for RV2U is reduced compared to RV2, which can be attributed to its position being further upstream so that more decay occurs. The vorticity strength of RV3 is also smaller than RV2, and in this case can be attributed to a smaller device height which reduces the net amount of flow spilling over the edge and thus a less intense vortex. In contrast, the RV1B case yields larger vortices which can be attributed to a larger device height. However, some of this effect is due to an increased trailing edge gap which allows the vortices to be more distinct and closer to the wall, as can be noted by comparing RV2 and RV1.

Figure 41:
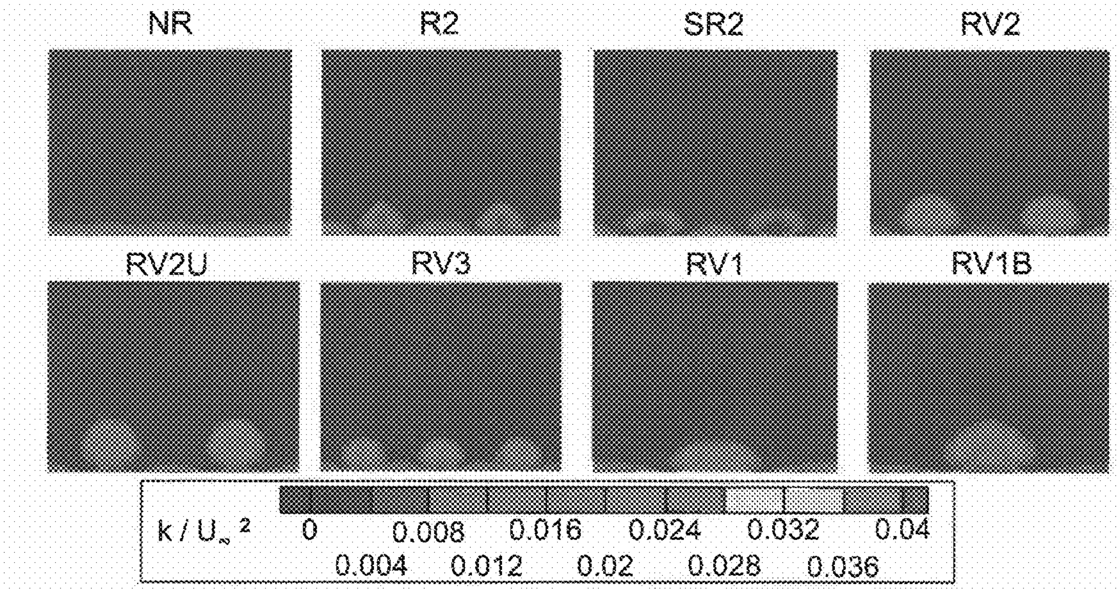
FIG. 41 shows spanwise view of turbulent kinetic energy for various devices based on time-averaged CG LES results.

FIG. 41 shows the effect of the vortex generators on the turbulent kinetic energy. In the case of R2, the regions of high turbulence is moved upwards downstream of the device centerline, due to flow upwash. A similar effect is seen for SR2 case but the turbulent kinetic energy magnitude is also reduced which may be attributed to high speed fluid influx through the trailing edge gap which stabilizes the wake flow of the device. For RV2 and RV2U cases, increase in turbulence is observed which is caused by the sweep angle of the interior side walls and the small trailing edge gap (1.5 h) at the exit. Similarly, the turbulence was higher for RV3 at the primary cores than that for the ramp types despite its smaller physical size. On the other hand, the turbulence energy is lower for RV1 and RV1B than the previous ramped vane. This is attributed to the wide trailing edge gap that allowed the vortices to stay closer to the wall which damps the vorticity magnitude.

Referring to FIG. 42, to assess the performance of the previous test cases, a spanwise average of the streamwise velocity, turbulent kinetic energy and the root mean square (RMS) of the pressure fluctuation at MP are shown. The streamwise velocity profiles in FIG. 41*a* reveals that, overall, the no-ramp case (NR) had the fullest boundary layer at Y/L=0.05 as compared to all the devices except for RV1B. This indicates that device wake can be significant and turns out to be the most severe for RV3. This is somewhat surprising given that RV3 is the smallest device investigated, which indicates that detrimental wake effects over-whelmed the benefits from the increased mixing by streamwise vortices. The second worst device in this respect was SR2 indicating that the trailing edge gap produced more wake losses than benefits. In contrast to these two cases, RV1B had the fullest velocity profile at Y/L=0.05 indicating that its streamwise vortices more than counteracted the wake deficits. This is attributed to a strong and large vortex core for this case as shown in FIG. 40.

Overall, a strong correlation was found with the pressure fluctuation RMS and the turbulent kinetic energy. For the turbulent kinetic energy profiles shown in FIG. 42*b*, the RV3 produced a higher turbulent energy than any of the other cases and the NR case, while RV1B produced the least turbulence, which is taken to be a beneficial aspect.

Figure 38A:
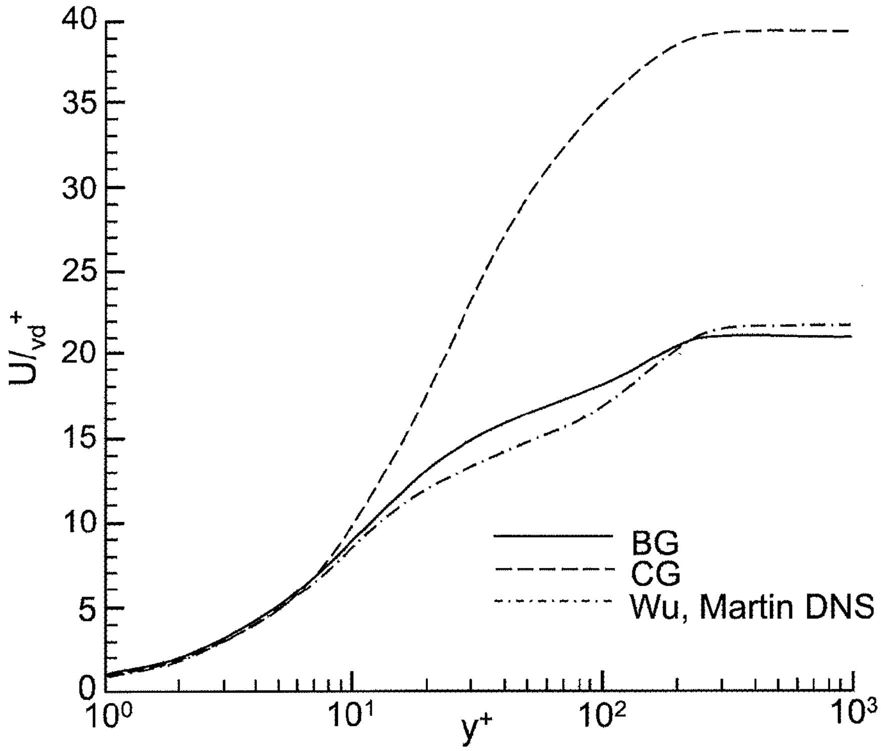
FIG. 38 shows LES predictions with coarse (CG) and baseline-resolution (BG) for of a) mean stream wise velocity, b) Reynolds stress.
Figure 38B:
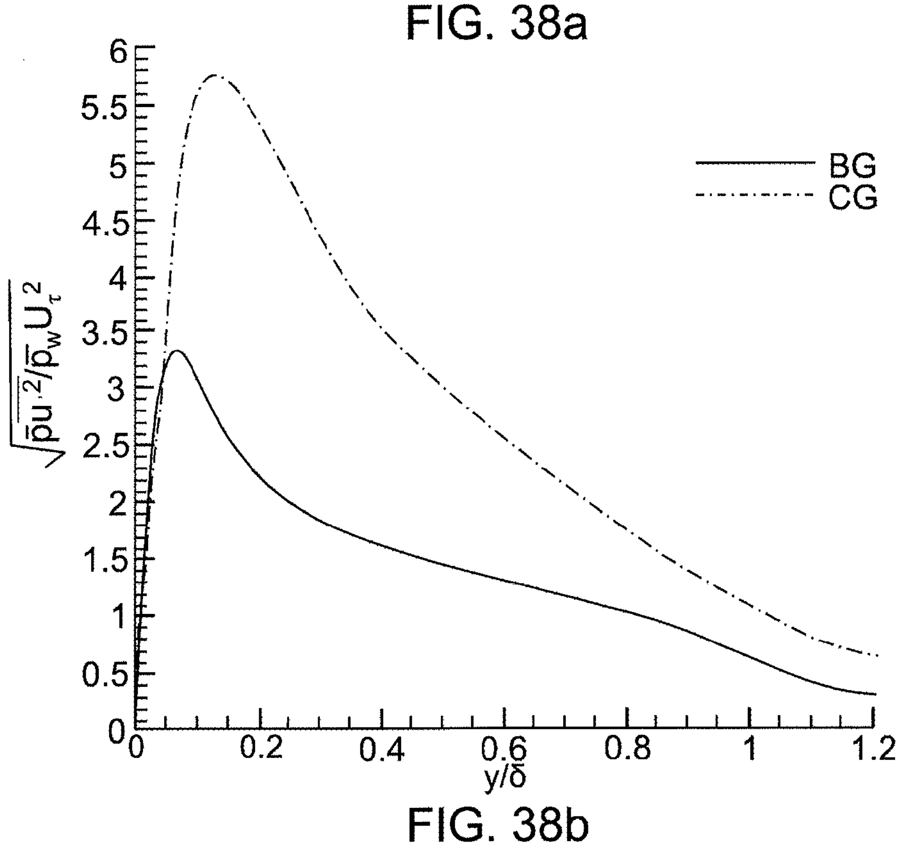

Notably, the RV2 and RV2U allowed reduced turbulence compared to the NR case. This can be attributed to the influence of the devices on the static pressure fluctuations shown in FIG. 42*c*. In particular, RV1B has a much lower PRMS in the boundary layer but also above the boundary layer at Y/L>0.5. The latter aspect indicates that the normal shock oscillations (which dominated in this region) are substantially reduced by the presence of the device. In contrast, RV3 has the highest pressure fluctuations throughout which will drive unsteadiness in the boundary layer yielding higher kinetic energy. It is not clear how these pressure fluctuations are influenced by the device, but perhaps the jet effect for the ramped vane cases and strong streamwise vorticity tends to stabilize the flow. Another possibility is that the increased three-dimensionality of the separation regions as shown in FIG. 38 for cases RV2, RV2U, RV1 and RV1B help limit the separation bubble unsteadiness.

Figure 42A:
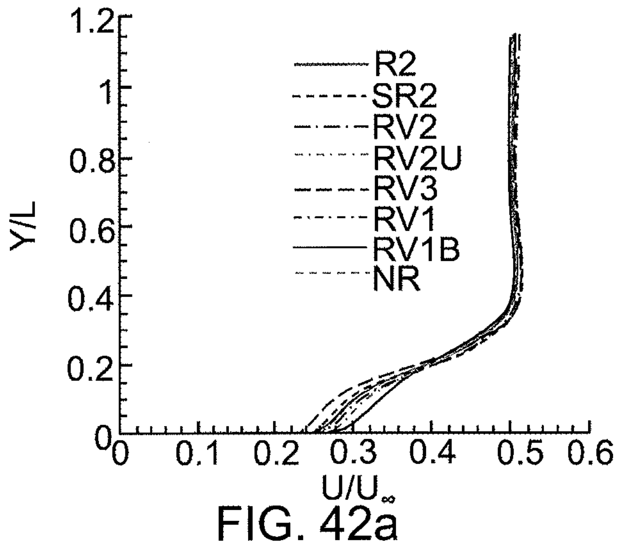
FIG. 42 shows spatially and time-averaged profiles at MP for various devices for: a) streamwise velocity b) turbulent kinetic energy, and c) pressure RMS fluctuations.
Figure 42B:
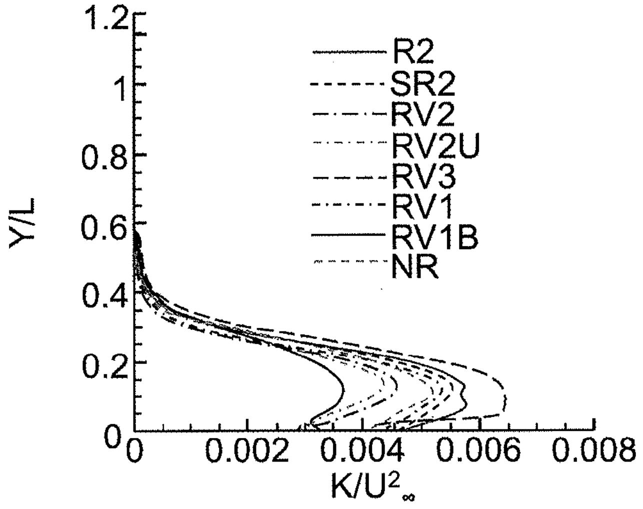
Figure 42C:
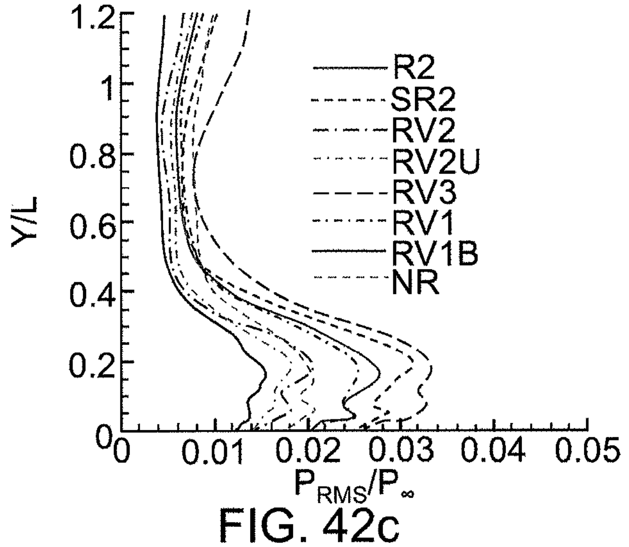
Figure 43A:
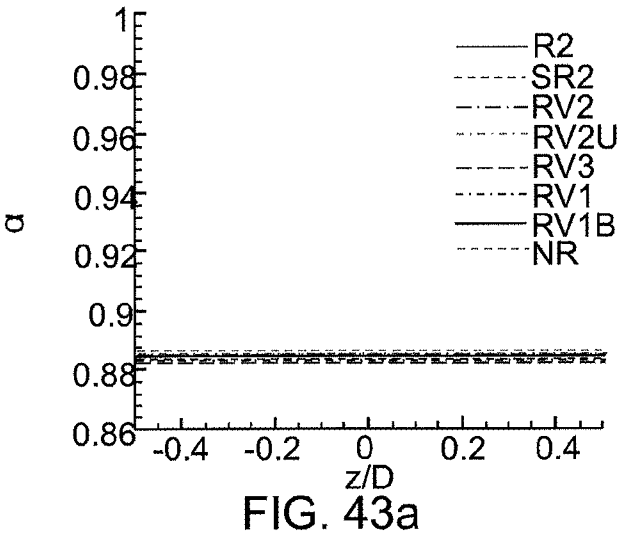
FIG. 43 shows spanwise distribution of stagnation pressure recovery, displacement thickness and incompressible shape factor for various vortex generators at MP.
Figure 43B:
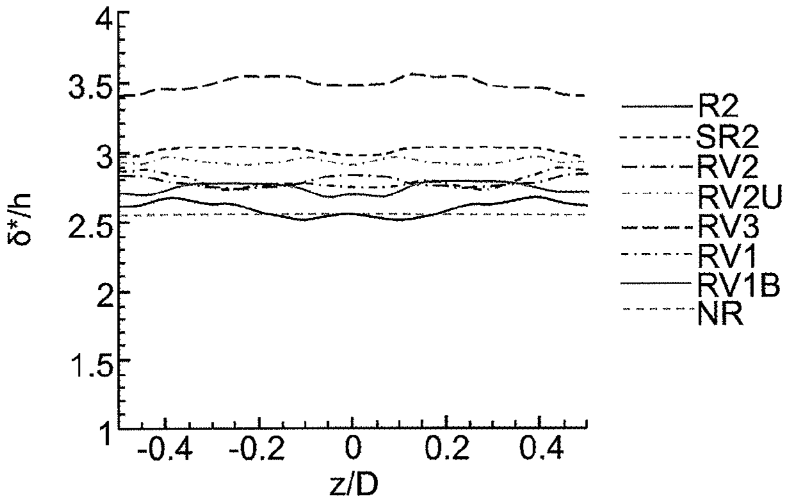

Referring to FIG. 43, the impact of the micro-vortex generators at MP were further investigated by studying stagnation pressure recovery factor, α, displacement thickness, δ*, momentum thickness, θ, and the incompressible shape factor. The stagnation pressure recovery factor with the device in FIG. 43*a* shows lower value than that for the solid wall case. However the differences are almost negligible from the NR case which indicates that the parasitic drags caused by the device are small. However, large variations were seen in the displacement thickness (FIG. 43*b*) as the mean velocity profiles were diverse as previously shown in FIG. 42*a*. Again, RV3 and SR2 gave significantly higher values than the NR case which comes from the distortions in the velocity profiles near the wall (FIG. 42). The displacement thickness for R2, on the other hand, was generally lower than most of the ramped vane types (RV2, RV2U and RV1), which was due to the weak vorticity generated by the device (shown in FIG. 40) causing less disturbance to the boundary layer. Similar to the previous results, RV1B gave the lowest overall displacement thickness compared to other devices due to a fuller boundary layer profile near the wall indicating higher shear stress. However, the overall displacement thicknesses were greater with the flow control device than that for NR (shown in Table 6) since they introduce disturbance to the boundary layer and the shock region.

Figure 43C:
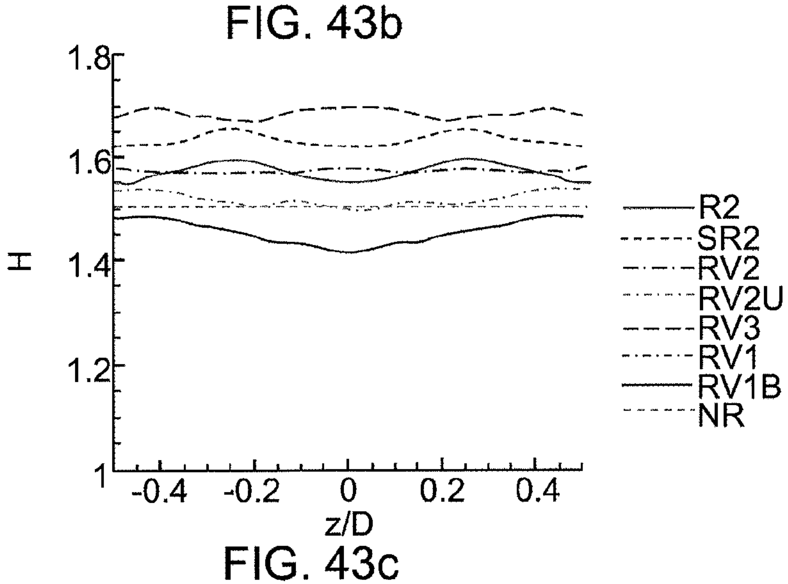

The incompressible shape factors in FIG. 43*c* are the indicators of flow uniformity where values close to unity would be an ideal case. Similar the previous results, RV3 and SR2 gave higher values compared to other devices. This may be due to the disturbance in the boundary layer as seen in FIG. 41*a* which is due to wake of the device causing instability of the shock as discussed earlier. The shape factors were decreased for R2, RV2 and RV2U compared to the previous two cases which could be related to the increased flow penetration at the shock region along the device centerline (FIG. 39) that limit the shock movement. As the flow penetrates further in the shock region along the device centerline, as in the case for RV1 and RV1B, the shape factor decreases especially near the center, where the average for RV1B is lower than the NR case shown in Table 6.

Based on the above low-resolution μVG study, RV1B gave the best performance in improving the boundary layer health such as seen in the reductions in turbulent kinetic energy, pressure fluctuation RMS and the incompressible shape factor compared to the solid wall case, which is summarized in Table 6. In addition, RV1B yielded the thinnest average displacement thickness while the pressure recovery coefficient was nearly equal to the NR case. Furthermore, the fully attached flow through the shock region downstream of the device trailing edge may have improved stability of the shock position by increasing the separation bubble three-dimensionality.

In general, the μVGs reduced the total separation area compared to the solid wall case where spanwise variations in the separation length existed in the coarse resolution study. The jet effects from the ramped-vanes, such as RV2, RV2U, significantly reduced the flow separation length downstream of the device centerline while the length persisted for the ramp types due to the up-wash effects. To maximize the jet effect, a larger ramped vane with a wider trailing edge gap, RV1B, was developed which yielded a fully attached flow through the centerline of the separation region. The resulting mean streamwise velocity profile at the measuring plane was fuller with the RV1B compared to all the other devices and NR. In addition, this device yielded the most reductions of turbulent kinetic energy and the pressure fluctuation. Additional benefits include negligible drag as evidenced by the nearly equal stagnation pressure coefficient with that of NR while the reductions of The present invention has been described with reference to specific embodiments, which are provided only for exemplification and are not to be construed as limiting the scope of the invention as defined by the following claims.

What is claimed is:

1. A vortex generator for generating streamwise vorticity in a boundary layer comprising:

a first ramp-vane element with a front end and a back end, a ramp surface extending between the front end and the back end, and a pair of vertical surfaces extending between the front end and the back end adjacent the ramp surface;

a second ramp-vane element with a front end and a back end, a ramp surface extending between the front end and the back end, and a pair of vertical surfaces extending between the front end and the back end adjacent the ramp surface; and a flow channel between the first ramp-vane element and the second ramp-vane element, wherein the back ends of the first and second ramp-vane elements have a height greater than a height of the front ends, and the front ends of the ramp-vane elements have a width greater than a width of the back ends, and wherein a distance between the back ends of the first and second ramp-vane elements is smaller than a distance between the front ends of the first and second ramp-vane elements.

2. A vortex generator for generating streamwise vorticity in a boundary layer comprising:

a first ramp element with a front end and a back end, a ramp surface extending between the front end and the back end, and a pair of vertical surfaces extending between the front end and the back end adjacent the ramp surface;

a second ramp element with a front end and a back end, a ramp surface extending between the front end and the back end, and a pair of vertical surfaces extending between the front end and the back end adjacent the ramp surface; and a flow channel between the first ramp element and the second ramp element, wherein the back ends of the ramp elements have a height greater than a height of the front ends, and the front ends of the ramp elements have a width greater than a width of the back ends, and wherein a distance between the back ends of the first and second ramp elements is smaller than a distance between the front ends of the first and second ramp elements.

3. The vortex generator according to claim 2, wherein each of the ramp elements define a centerline, the ramp elements being oriented such that the centerlines are non-parallel.

4. The vortex generator according to claim 2, wherein the height of the ramp elements at the back ends is approximately less than or equal to a thickness of the boundary layer.

5. The vortex generator according to claim 2, wherein the height of the ramp elements at the back ends is approximately equal to the width of the flow channel.

6. The vortex generator according to claim 2 further comprising a series of first ramp elements and second ramp elements arranged in an array along a surface of an object.

7. The vortex generator according to claim 2, wherein a width of the ramp elements at the front ends is the same as a height of the ramp elements.

8. The vortex generator according to claim 2, wherein an aspect ratio of a length to the width of the ramp elements is 1.7.

9. The vortex generator according to claim 2, wherein the flow channel has a first width adjacent to the front ends and a second width adjacent to the back ends, the first width being larger than the second width.

10. The vortex generator according to claim 2, wherein the back ends of the first and second ramp elements point toward an extension of a centerline of the flow channel.

11. The vortex generator according to claim 2, wherein a length of the ramp elements is 6.57 times a height of the ramp elements.

12. The vortex generator according to claim 2, wherein the first ramp element and the second ramp element are arranged asymmetrically relative to a centerline of the flow channel between the first and second ramp elements.

13. The vortex generator according to claim 12, wherein the first ramp element defines an angle of 16° relative to the centerline and the second ramp element defines an angle of 24° relative to the centerline.

* * * * *